United States Patent

Suzuki et al.

(10) Patent No.: US 10,977,472 B2
(45) Date of Patent: Apr. 13, 2021

(54) DETECTION DEVICE

(71) Applicant: Japan Display Inc., Tokyo (JP)

(72) Inventors: Yuji Suzuki, Tokyo (JP); Toshinori Uehara, Tokyo (JP); Hayato Kurasawa, Tokyo (JP)

(73) Assignee: Japan Display Inc., Tokyo (JP)

(*) Notice: Subject to any disclaimer, the term of this patent is extended or adjusted under 35 U.S.C. 154(b) by 33 days.

(21) Appl. No.: 16/139,337

(22) Filed: Sep. 24, 2018

(65) Prior Publication Data

US 2019/0102006 A1    Apr. 4, 2019

(30) Foreign Application Priority Data

Sep. 29, 2017 (JP) .............................. JP2017-192028

(51) Int. Cl.
*G06K 9/00* (2006.01)
*G01D 5/24* (2006.01)

(52) U.S. Cl.
CPC ............. *G06K 9/0002* (2013.01); *G01D 5/24* (2013.01); *G06F 2203/04112* (2013.01)

(58) Field of Classification Search
CPC .... G06F 3/044; H03K 17/962; H03K 17/955; H03K 17/9645; G01D 5/24; G01D 17/9645; G06K 17/9645
See application file for complete search history.

(56) References Cited

U.S. PATENT DOCUMENTS

| | | | |
|---|---|---|---|
| 8,766,950 B1* | 7/2014 | Morein | G06F 3/0416 345/173 |
| 10,043,049 B2* | 8/2018 | Lundahl | G06K 9/0002 |
| 10,073,574 B2* | 9/2018 | Otagaki | G06F 3/0445 |
| 10,614,202 B2* | 4/2020 | Song | G06F 3/041 |
| 10,754,938 B2* | 8/2020 | Jin | H04L 9/3231 |
| 2004/0247163 A1 | 12/2004 | Hara | |
| 2008/0007679 A1* | 1/2008 | Ochiai | G02F 1/134363 349/114 |
| 2012/0050180 A1* | 3/2012 | King | G06F 3/0416 345/173 |
| 2013/0076485 A1* | 3/2013 | Mullins | G06F 21/32 340/5.83 |
| 2013/0092520 A1* | 4/2013 | Lee | G06F 3/0412 200/600 |
| 2013/0211757 A1* | 8/2013 | Miyamoto | G06F 3/0416 702/65 |
| 2013/0231046 A1* | 9/2013 | Pope | G06K 9/00013 455/41.1 |

(Continued)

FOREIGN PATENT DOCUMENTS

| | | |
|---|---|---|
| JP | 2004-317353 A | 11/2004 |
| JP | 2017182542 A | 10/2017 |
| JP | 2017188106 A | 10/2017 |

*Primary Examiner* — William Lu
(74) *Attorney, Agent, or Firm* — K&L Gates LLP

(57) ABSTRACT

According to an aspect, a detection device includes: an insulating substrate including a plurality of detection electrodes; a transmission conductor disposed adjacent to the detection electrodes; a drive signal generator coupled to the transmission conductor; and a detector coupled to the detection electrodes. The drive signal generator generates a detection drive signal and supplies the detection drive signal to the transmission conductor. The detector detects a detection signal corresponding to a change in capacitance in the detection electrodes.

16 Claims, 53 Drawing Sheets

(56) References Cited

U.S. PATENT DOCUMENTS

| | | | |
|---|---|---|---|
| 2014/0062933 A1* | 3/2014 | Coulson | G06F 3/044 345/174 |
| 2014/0333328 A1* | 11/2014 | Nelson | G06F 3/044 324/663 |
| 2015/0177298 A1* | 6/2015 | Sugiura | G01B 7/003 324/658 |
| 2016/0139579 A1* | 5/2016 | Hirota | G05B 19/042 700/275 |
| 2016/0148034 A1* | 5/2016 | Kremin | G06K 9/0002 382/124 |
| 2017/0068838 A1* | 3/2017 | Kravets | G06F 3/044 |
| 2017/0090619 A1* | 3/2017 | Yousefpor | G06F 3/044 |
| 2017/0123566 A1* | 5/2017 | Noguchi | G06F 3/0412 |
| 2017/0285847 A1 | 10/2017 | Uehara | |
| 2017/0285865 A1 | 10/2017 | Uehara | |
| 2017/0308200 A1* | 10/2017 | Mugiraneza | H03K 17/962 |
| 2018/0314380 A1* | 11/2018 | Uehara | G06F 3/0416 |
| 2018/0332242 A1* | 11/2018 | Inoguchi | H04L 63/0861 |
| 2019/0056903 A1* | 2/2019 | Otsuka | G09G 5/00 |
| 2019/0286281 A1* | 9/2019 | Aoki | G06F 3/041 |

* cited by examiner

FIG.17

| SGL(m) | | SGL(m+1) | | SGL(m+2) | | SGL(m+3) | |
|---|---|---|---|---|---|---|---|
| $Td_0^+$ | $Td_0^-$ | $Td_0^+$ | $Td_0^-$ | $Td_0^+$ | $Td_0^-$ | $Td_0^+$ | $Td_0^-$ |
| $Td_1^+$ | $Td_1^-$ | $Td_1^+$ | $Td_1^-$ | $Td_1^+$ | $Td_1^-$ | $Td_1^+$ | $Td_1^-$ |
| $Td_2^+$ | $Td_2^-$ | $Td_2^+$ | $Td_2^-$ | $Td_2^+$ | $Td_2^-$ | $Td_2^+$ | $Td_2^-$ |
| $Td_3^+$ | $Td_3^-$ | $Td_3^+$ | $Td_3^-$ | $Td_3^+$ | $Td_3^-$ | $Td_3^+$ | $Td_3^-$ |

DATA OUTPUT ORDER →

DETECTION DEVICE

CROSS-REFERENCE TO RELATED APPLICATIONS

This application claims priority from Japanese Application No. 2017-192028, filed on Sep. 29, 2017, the contents of which are incorporated by reference herein in its entirety.

BACKGROUND

1. Technical Field

The present invention relates to a detection device and an electronic apparatus.

2. Description of the Related Art

It is well known that there are capacitance detection devices that detect the ridges and valleys on the surface of a finger to detect the pattern of a fingerprint (refer to Japanese Patent Application Laid-open Publication No. 2004-317353, for example).

Capacitance detection devices are expected to increase the detection sensitivity.

SUMMARY

According to an aspect, a detection device includes: an insulating substrate including a plurality of detection electrodes; a transmission conductor disposed adjacent to the detection electrodes; a drive signal generator coupled to the transmission conductor; and a detector coupled to the detection electrodes. The drive signal generator generates a detection drive signal and supplies the detection drive signal to the transmission conductor. The detector detects a detection signal corresponding to a change in capacitance in the detection electrodes.

BRIEF DESCRIPTION OF THE DRAWINGS

FIG. 17 is a diagram of an example of the execution order of code division multiplex drive (output order of data);

DETAILED DESCRIPTION

Figure 1:
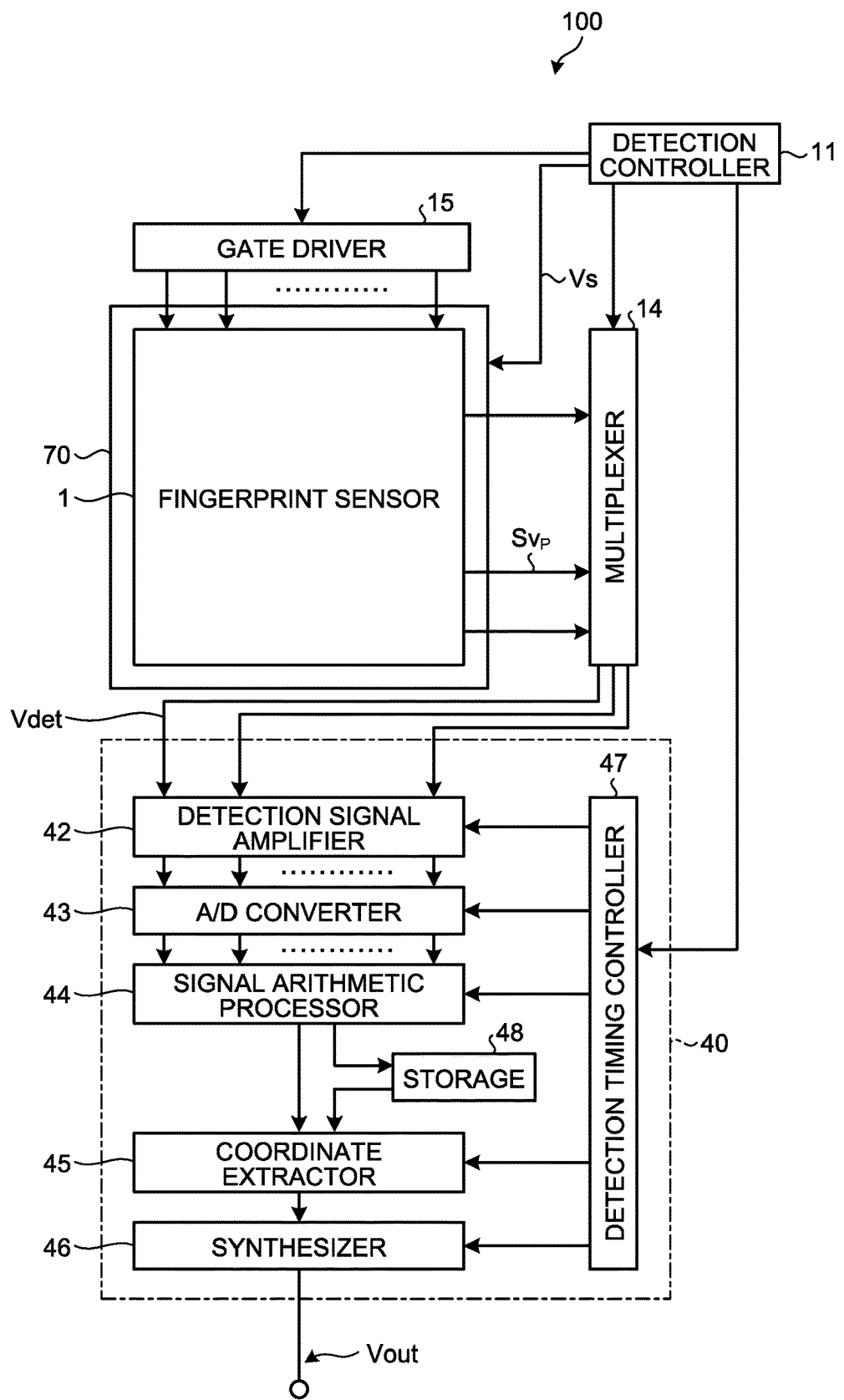
FIG. 1 is a block diagram of an exemplary configuration of a fingerprint detection device according to a first embodiment of the present invention.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the invention. To simplify the explanation, the drawings may possibly illustrate the width, the thickness, the shape, and other elements of each component more schematically than the actual aspect. These elements, however, are given by way of example only and are not intended to limit interpretation of the present invention. In the present specification and the figures, components similar to those previously described with reference to previous figures are denoted by the same reference numerals, and detailed explanation thereof may be appropriately omitted.

In this disclosure, when an element is described as being "on" another element, the element can be directly on the other element, or there can be one or more elements between the element and the other element.

First Embodiment

Figure 2:
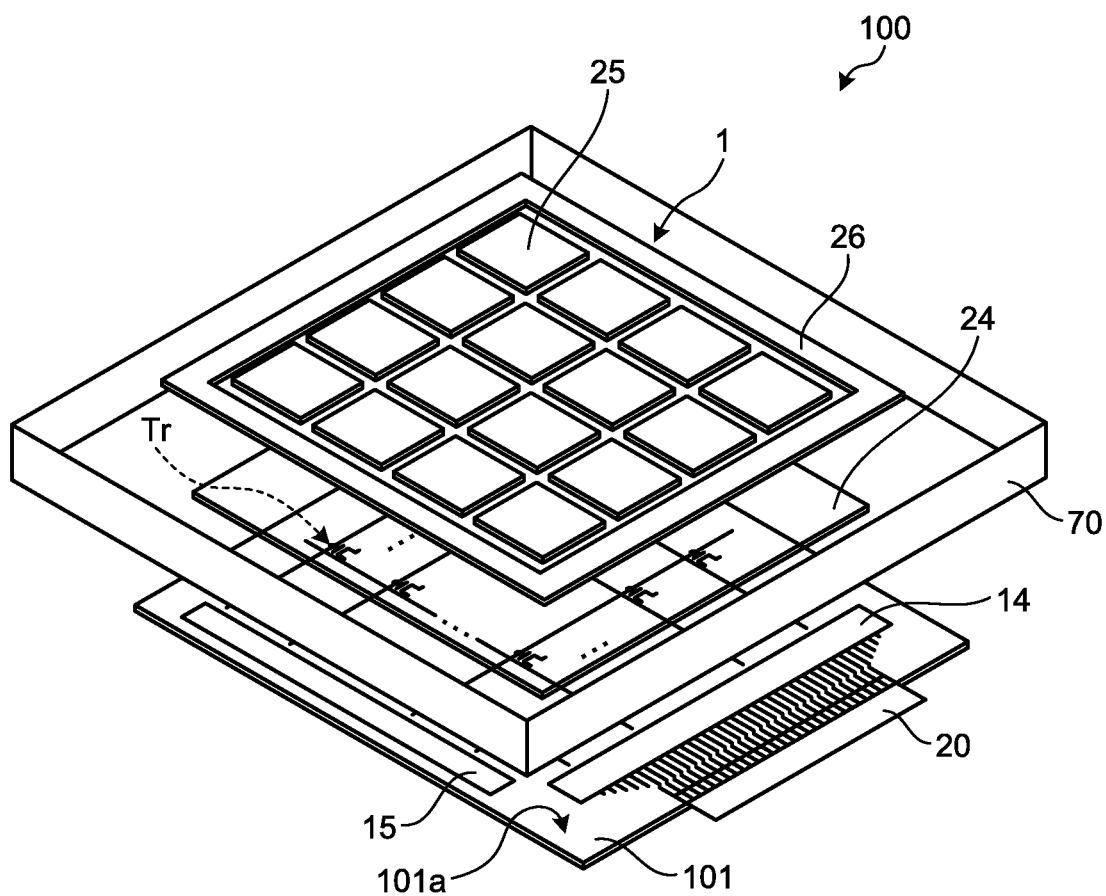
FIG. 2 is a schematic diagram of an exemplary configuration of the fingerprint detection device.
Figure 3:
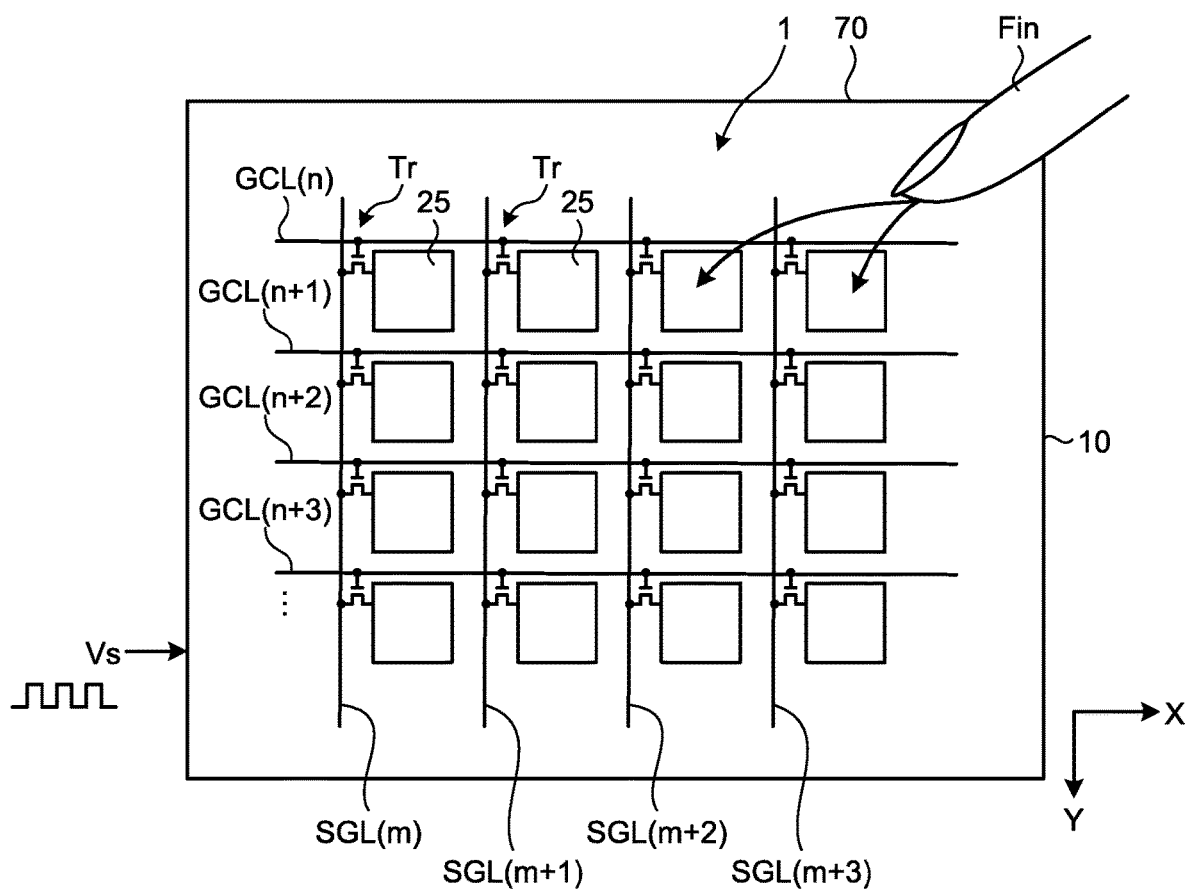
FIG. 3 is a schematic diagram of an exemplary configuration of a fingerprint sensor included in the fingerprint detection device.

FIG. 1 is a block diagram of an exemplary configuration of a fingerprint detection device according to a first embodiment of the present invention. FIG. 2 is a schematic diagram of an exemplary configuration of the fingerprint detection device. FIG. 3 is a schematic diagram of an exemplary configuration of a fingerprint sensor included in the fingerprint detection device. As illustrated in FIG. 1, a detection device 100 includes a fingerprint sensor 1, a detection controller 11, a multiplexer 14, a gate driver 15, a detector 40, and a transmission conductor 70.

As illustrated in FIGS. 2 and 3, the fingerprint sensor 1 includes an insulating base 101, a shield layer 24, a plurality of detection electrodes 25, a plurality of thin-film transistors Tr, gate lines GCL, and data lines SGL. The shield layer 24 is provided on a first surface 101a of the base 101. The detection electrodes 25 are provided on the shield layer 24. The gate lines GCL are coupled to gates of the respective thin-film transistors Tr. The data lines SGL are coupled to sources of the respective thin-film transistors Tr. The base 101 is made of glass, for example. The thin-film transistors Tr, the gate lines GCL, and the data lines SGL are provided between the first surface 101a of the base 101 and the shield layer 24, for example.

The multiplexer 14 and the gate driver 15 are provided on the first surface 101a of the base 101. The data lines SGL are coupled to the multiplexer 14. The gate lines GCL are coupled to the gate driver 15. The shield layer 24 is coupled to a fixed potential (e.g., a ground potential). This configuration prevents the electric potential of the detection electrodes 25 from affecting the data lines SGL and other components and becoming noise. The shield layer 24 may be in a floating state where its electric potential is not fixed.

As illustrated in FIG. 2, a capacitance detection conductor 26 and the transmission conductor 70 are disposed around the fingerprint sensor 1. The capacitance detection conductor 26 is an electrode that detects proximity of an external object (e.g., a finger) to the fingerprint sensor 1. If a finger comes closer to the capacitance detection conductor 26, for example, capacitance is generated between the capacitance detection conductor 26 and the finger, thereby increasing the capacitance value of the capacitance detection conductor 26. The detection device 100 detects a change in the capacitance value of the capacitance detection conductor 26, thereby detecting proximity of an external object (e.g., a finger) to the fingerprint sensor 1.

The transmission conductor 70 transmits drive signals Vs to the outside of the transmission conductor 70. In the detection device 100, for example, the capacitance detection conductor 26 is disposed outside the fingerprint sensor 1, and the transmission conductor 70 is disposed outside the capacitance detection conductor 26. In other words, the capacitance detection conductor 26 is disposed between the fingerprint sensor 1 and the transmission conductor 70. The detection electrodes 25, the capacitance detection conductor 26, and the transmission conductor 70 are disposed separately from one another.

The detection controller 11 controls the operations of the fingerprint sensor 1, the multiplexer 14, the gate driver 15, and the detector 40. The detection controller 11 supplies the detection drive signals Vs to the transmission conductor 70. The gate driver 15 supplies scanning signals to the gate lines GCL based on signals supplied from the detection controller 11, thereby selecting the detection electrodes 25 (refer to FIG. 12, which will be described later). The selected detection electrodes 25 are coupled to the multiplexer 14 via the data lines SGL. The multiplexer 14 couples the data lines SGL to the detector 40 based on signals supplied from the detection controller 11.

As illustrated in FIG. 3, for example, the fingerprint sensor 1 includes the detection electrodes 25, gate lines GCL(n), GCL(n+1), . . . , and data lines SGL(m), SGL(m+1), . . . , where n and m are integers equal to or larger than 1. The detection electrodes 25 are arrayed in a row direction (X-direction) and a column direction (Y-direction). In other words, the detection electrodes 25 are disposed in a matrix in the row direction and the column direction. The gate lines GCL(n), GCL(n+1), . . . are wiring that turns on and off the thin-film transistors Tr. The gate lines GCL(n), GCL(n+1), . . . are arrayed in the column direction (Y-direction) and extend in the row-direction (X-direction). The data lines SGL(m), SGL(m+1), . . . are wiring that outputs detection signals $Sv_p$. The data lines SGL(m), SGL(m+1), . . . are arrayed in the row-direction (X-direction) and extend in the column direction (Y-direction). In the following description, the gate lines GCL(n), GCL(n+1), . . . are simply referred to as the gate lines GCL when they need not be distinguished from one another. The data lines SGL(m), SGL(m+1), . . . are simply referred to as the data lines SGL when they need not be distinguished from one another.

The gate driver 15 selects predetermined gate lines (e.g., GCL(n) and GCL(n+2)) out of the gate lines GCL based on the signals supplied from the detection controller 11. The gate driver 15 applies a predetermined voltage to the selected gate lines GCL(n) and GCL(n+2). As a result, the detection electrodes 25 belonging to the n-th row and the detection electrodes 25 belonging to the (n+2)-th row are coupled to the multiplexer 14 via the data lines SGL(m), SGL(m+1), . . . . The multiplexer 14 selects a data line SGL (e.g., SGL(m)) out of the data lines SGL based on the signals supplied from the detection controller 11. The multiplexer 14 couples the selected data line SGL(m) to the detector 40. As a result, the detection electrode 25 in the n-th row and the m-th column and the detection electrode 25 in the (n+2)-th row and the m-th column supply the detection signals $Sv_p$ to the detector 40.

The detector 40 is a circuit that detects the shape and the fingerprint of a finger. The detector 40 detects unevenness on the surface of a finger or the like in contact with or in proximity to the fingerprint sensor 1 based on the signals supplied from the detection controller 11 and the detection signals $Sv_p$ output from the multiplexer 14, thereby detecting the shape and the fingerprint of a finger. The detector 40 includes a detection signal amplifier 42, an analog/digital (A/D) converter 43, a signal arithmetic processor 44, a coordinate extractor 45, a synthesizer 46, a detection timing controller 47, and a storage 48. The detection timing controller 47 controls the detection signal amplifier 42, the A/D converter 43, the signal arithmetic processor 44, the coordinate extractor 45, and the synthesizer 46 such that they operate synchronously with one another based on clock signals supplied from the detection controller 11.

The detection signals $Sv_p$ are supplied from the fingerprint sensor 1 to the detection signal amplifier 42 of the detector 40. The detection signal amplifier 42 amplifies the detection signals $Sv_p$. The A/D converter 43 converts analog signals output from the detection signal amplifier 42 into digital signals.

The signal arithmetic processor 44 is a logic circuit that determines whether a finger is in contact with or in proximity to the fingerprint sensor 1 based on the output signals from the A/D converter 43. The signal arithmetic processor 44 performs processing of extracting a signal of difference (absolute value |ΔV|) between the detection signals caused by a finger. The signal arithmetic processor 44 compares the absolute value |ΔV| with a predetermined threshold voltage. If the absolute value |ΔV| is lower than the threshold voltage, the signal arithmetic processor 44 determines that a finger is in a non-contact state. By contrast, if the absolute value |ΔV| is equal to or higher than the threshold voltage, the signal arithmetic processor 44 determines that a finger is in a contact or proximity state. The detector 40 thus can detect contact or proximity of a finger.

The signal arithmetic processor 44 receives the detection signals $Sv_p$ from the detection electrodes 25 and performs arithmetic processing on the detection signals $Sv_p$ based on a predetermined code, which will be described later. The detection signals $Sv_p$ resulting from the arithmetic processing are temporarily stored in the storage 48. The signal arithmetic processor 44 receives the detection signals $Sv_p$ that have been stored in the storage 48 and performs decoding on the detection signals $Sv_p$ based on the predetermined code. The predetermined code is stored in advance in the storage 48, for example. The detection controller 11 and the signal arithmetic processor 44 can read the predetermined code stored in the storage 48 at any desired timing. The storage 48 may be a random access memory (RAM), a read only memory (ROM), or a register circuit, for example.

The coordinate extractor 45 is a logic circuit that calculates, if the signal arithmetic processor 44 detects contact or proximity of a finger, the detection coordinates of the finger. The coordinate extractor 45 calculates the detection coordinates based on the detection signals resulting from decoding and outputs the obtained detection coordinates to the synthesizer 46. The synthesizer 46 combines the detection coordinates output from the coordinate extractor 45 to generate two-dimensional information indicating the shape and the fingerprint of a finger in contact with or in proximity to the fingerprint sensor 1. The synthesizer 46 outputs the two-dimensional information as output Vout from the detector 40. Alternatively, the synthesizer 46 may generate an image based on the two-dimensional information and output the image information as the output Vout.

Figure 4:
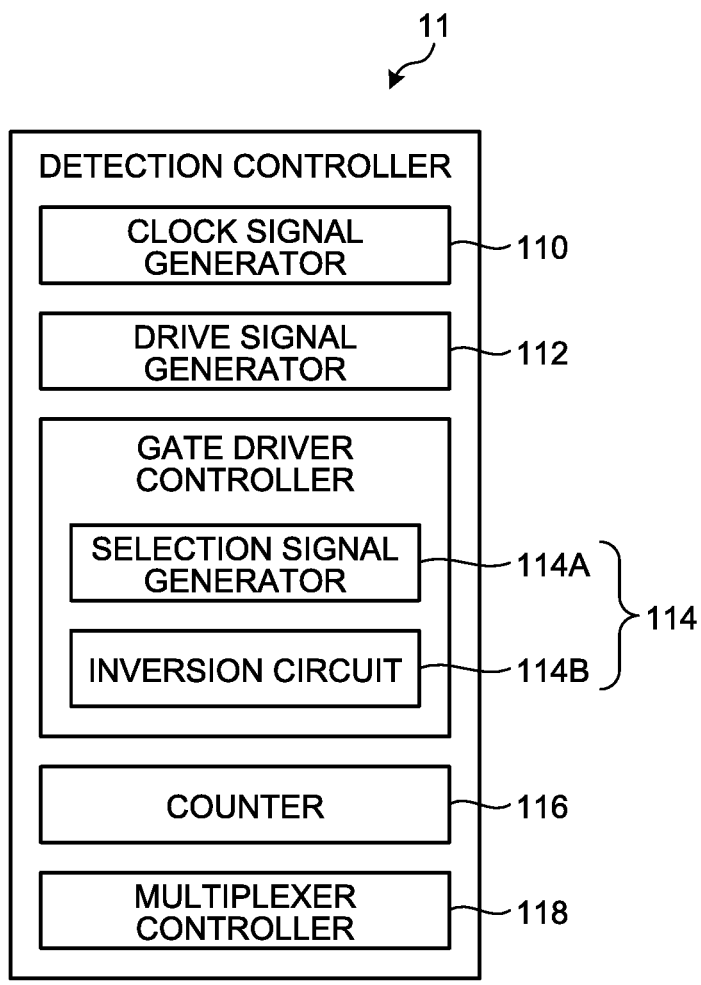
FIG. 4 is a block diagram of an exemplary configuration of a detection controller included in the fingerprint detection device.

FIG. 4 is a block diagram of an exemplary configuration of the detection controller included in the fingerprint detection device. As illustrated in FIG. 4, the detection controller 11 includes a clock signal generator 110, a drive signal generator 112, a gate driver controller 114, a counter 116, and a multiplexer controller 118. The gate driver controller 114 includes a selection signal generator 114A and an inversion circuit 114B. The selection signal generator 114A generates first selection signals $Vgcl^+$ (refer to FIG. 12, which will be described later). The inversion circuit 114B generates second selection signals $Vgcl^-$ (refer to FIG. 12, which will be described later) by inverting the high level part and the low level part of the first selection signals $Vgcl^+$.

The clock signal generator 110 generates clock signals. The clock signals are supplied to the counter 116 of the detection controller 11 and the detection timing controller 47 of the detector 40, for example.

The counter 116 counts the pulse number of the clock signals generated by the clock signal generator 110. Based on the measurement value of the pulse number, the counter 116 generates first timing control signals for controlling the timing to select the gate lines GCL and supplies them to the gate driver controller 114. Based on the first timing control signals supplied from the counter 116, the gate driver controller 114 generates selection signals (e.g., the first selection signals $Vgcl^+$ and the second selection signals $Vgcl^-$ illustrated in FIG. 12, which will be described later) for selecting the detection electrodes 25 (refer to FIG. 3). The gate driver controller 114 supplies the selection signals to the gate driver 15. Based on the selection signals supplied from the gate driver controller 114, the gate driver 15 supplies the scanning signals to a gate line GCL. As a result, a gate line GCL is selected out of the gate lines GCL. The detection electrodes 25 coupled to the selected gate line GCL are coupled to the respective data lines SGL.

Based on the measurement value of the pulses of the clock signals, the counter 116 generates second timing control signals for controlling the timing to select the data lines SGL. The counter 116 supplies the generated second timing control signals to the multiplexer controller 118. Based on the second timing control signals supplied from the counter 116, the multiplexer controller 118 transmits signals to the multiplexer 14, thereby operating switches in the multiplexer 14. As a result, a data line SGL is selected out of the data lines SGL. The selected data line SGL is coupled to the detector 40 via the multiplexer 14.

The drive signal generator 112 generates the detection drive signals Vs and supplies them to the transmission conductor 70.

Figure 5:
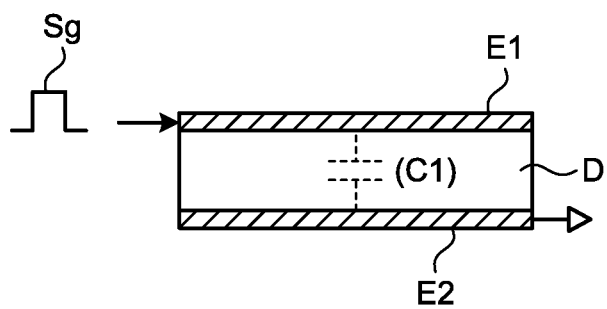
FIG. 5 is a diagram for explaining the basic principle of mutual capacitance detection.
Figure 6:
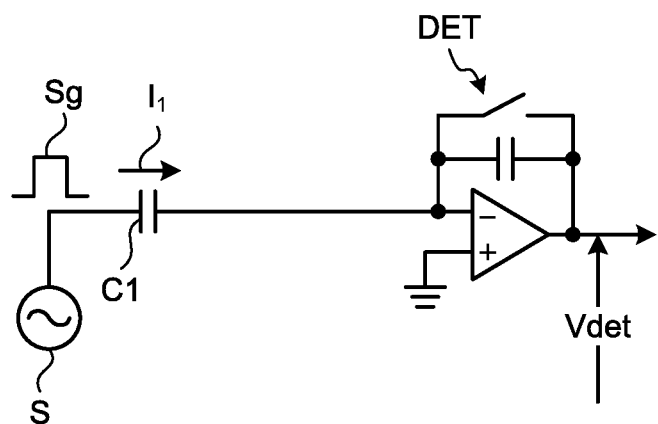
FIG. 6 is a diagram of an example of an equivalent circuit for explaining the basic principle of mutual capacitance detection.
Figure 7:
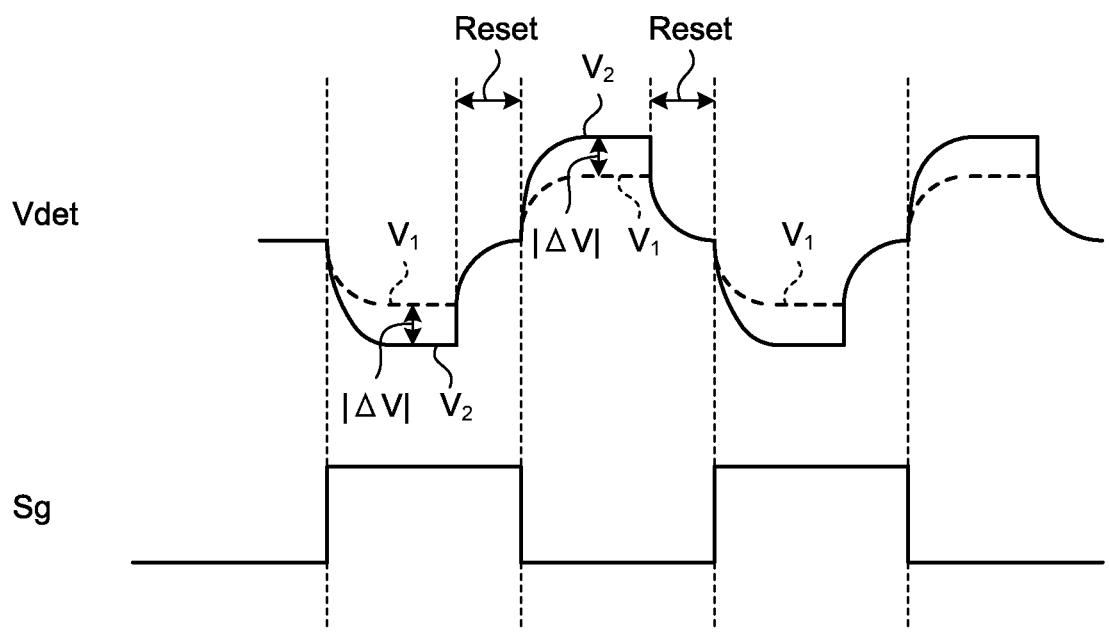
FIG. 7 is a diagram of an example of waveforms of a drive signal and a detection signal in mutual capacitance detection.
Figure 8:
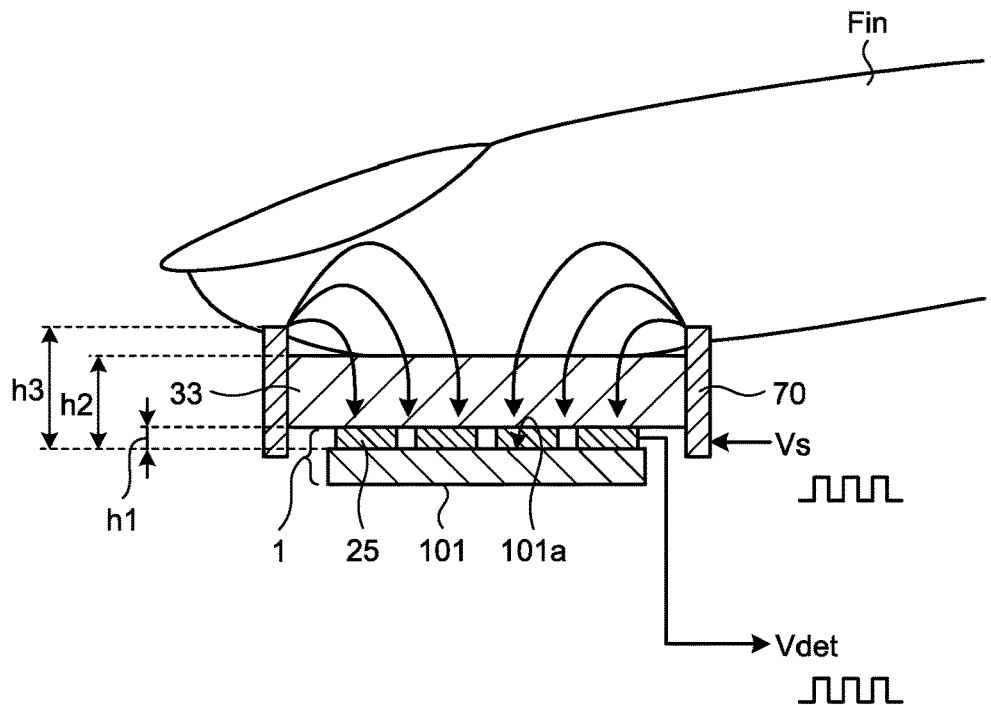
FIG. 8 is a diagram schematically illustrating a state where AC rectangular waves travel from a transmission conductor to detection electrodes via a finger.

The fingerprint sensor 1 illustrated in FIGS. 1 to 3 operates based on the basic principle of capacitance detection. The following describes the basic principle of detection performed by the fingerprint sensor 1 with reference to FIGS. 5 to 8. FIG. 5 is a diagram for explaining the basic principle of mutual capacitance detection. FIG. 6 is a diagram of an example of an equivalent circuit for explaining the basic principle of mutual capacitance detection. FIG. 7 is a diagram of an example of waveforms of a drive signal and a detection signal in mutual capacitance detection. FIG. 8 is a diagram schematically illustrating a state where AC rectangular waves travel from the transmission conductor to the detection electrodes via a finger. A drive electrode E1 illustrated in FIG. 5 corresponds to the transmission conductor 70 illustrated in FIG. 8. A detection electrode E2 illustrated in FIG. 5 corresponds to the detection electrode 25 illustrated in FIG. 8.

As illustrated in FIG. 5, for example, a capacitance element C1 includes a pair of electrodes, that is, the drive electrode E1 and the detection electrode E2 facing each other with a dielectric D interposed therebetween. As illustrated in FIG. 6, a first end of the capacitance element C1 is coupled to an alternating-current (AC) signal source (drive signal source) S, and a second end thereof is coupled to a voltage detector DET. The voltage detector DET is an integration circuit included in the detector 40 illustrated in FIG. 1, for example.

When the AC signal source S applies an AC rectangular wave Sg at a predetermined frequency (e.g., a frequency of the order of several kilohertz to several hundred kilohertz) to the drive electrode E1 (first end of the capacitance element C1), an output waveform (detection signal Vdet) illustrated in FIG. 7 appears via the voltage detector DET coupled to the detection electrode E2 (second end of the capacitance element C1). The AC rectangular wave Sg corresponds to the drive signal Vs output from the detection controller 11 illustrated in FIG. 1.

If a finger is neither in contact with nor in proximity to the fingerprint sensor 1 (non-contact state), an electric current corresponding to the capacitance value of the capacitance element C1 flows in association with charge and discharge of the capacitance element C1. The voltage detector DET illustrated in FIG. 6 converts fluctuations in an electric current $I_1$ depending on the AC rectangular wave Sg into fluctuations in the voltage (waveform $V_1$ indicated by the dotted line (refer to FIG. 7)).

By contrast, if a finger is in contact with or in proximity to the fingerprint sensor 1 (contact state), a finger Fin is in contact with the transmission conductor 70 (corresponding to the drive electrode E1) as illustrated in FIG. 8. The drive signals Vs (corresponding to the AC rectangular wave Sg) supplied from the detection controller 11 to the transmission conductor 70 affect the detection electrodes 25 (corresponding to the detection electrode E2) via the finger Fin and an insulating protective layer (e.g., an insulating resin) 33 provided to protect the fingerprint sensor 1. In other words, the finger Fin acts as part of the drive electrode E1. In the contact state, the distance between the drive electrode E1 and the detection electrode E2 is substantially reduced. As a result, the capacitance element C1 illustrated in FIG. 5 acts as a capacitance element having a capacitance value larger than that in the non-contact state. As illustrated in FIG. 7, the voltage detector DET converts fluctuations in the electric current $I_1$ depending on the AC rectangular wave Sg into fluctuations in the voltage (waveform $V_2$ indicated by the solid line).

In this case, the waveform $V_2$ has amplitude larger than that of the waveform $V_1$. The absolute value $|\Delta V|$ of the voltage difference between the waveform $V_1$ and the waveform $V_2$ varies depending on an effect of an external object, such as a finger, in contact with or in proximity to the fingerprint sensor 1 from the outside. To accurately detect the absolute value $|\Delta V|$ of the voltage difference between the waveform $V_1$ and the waveform $V_2$, the voltage detector DET preferably performs operations having a period Reset for resetting charge and discharge of a capacitor based on the frequency of the AC rectangular wave Sg by switching in the circuit.

The detector 40 compares the absolute value $|\Delta V|$ with a predetermined threshold voltage. If the absolute value $|\Delta V|$ is lower than the threshold voltage, the detector 40 determines that a finger is in the non-contact state. By contrast, if the absolute value $|\Delta V|$ is equal to or higher than the threshold voltage, the detector 40 determines that a finger is in the contact or proximity state. If it is determined that a finger is in the contact or proximity state, the detector 40 detects capacitance changes caused by unevenness on the surface of the finger based on the difference in the absolute value $|\Delta V|$.

Figure 9:
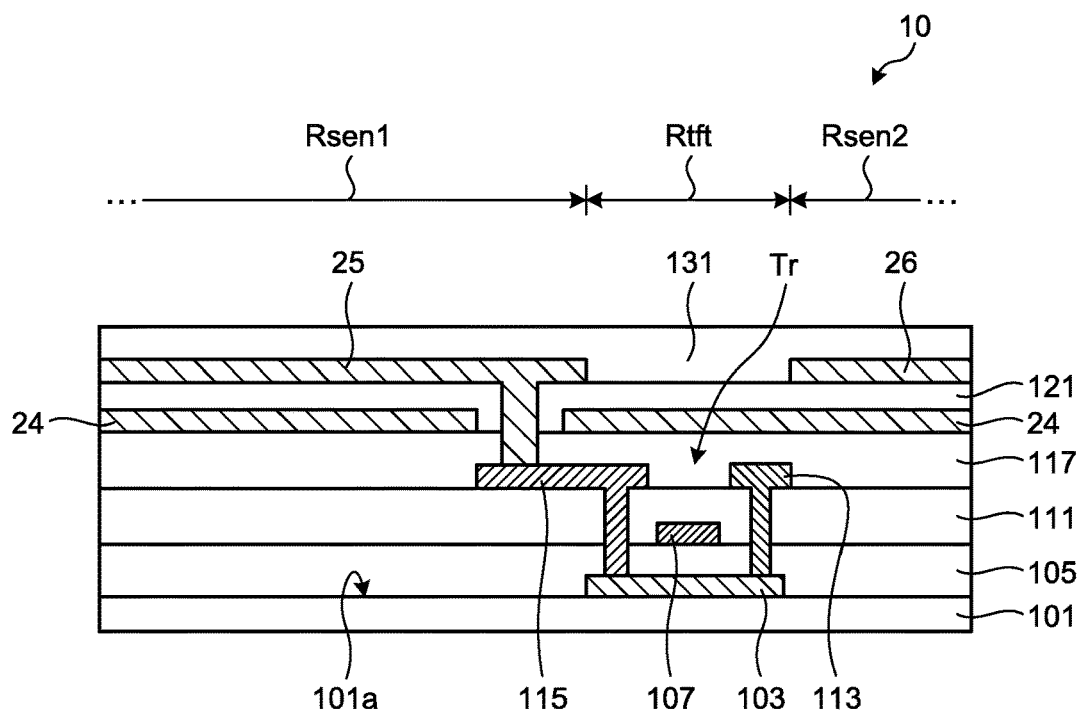
FIG. 9 is a sectional view of an exemplary configuration of an insulating substrate.

FIG. 9 is a sectional view of an exemplary configuration of an insulating substrate. FIG. 9 is a view of part of a section along line A11-A12 in FIG. 10, which will be described later. The fingerprint sensor 1 is provided on an insulating substrate 10. As illustrated in FIG. 9, the insulating substrate 10 includes the base 101 made of glass, for example, a semiconductor layer 103, a first interlayer insulating film 105, a gate electrode 107, a wiring layer 109, a second interlayer insulating film 111, a source electrode 113, a drain electrode 115, a third interlayer insulating film 117, the shield layer 24, a fourth interlayer insulating film 121, the detection electrode 25, the capacitance detection conductor 26, and a passivation film 131.

As illustrated in FIG. 9, the insulating substrate 10 has a first detection region Rsen1, a transistor region Rtft, and a second detection region Rsen2. The first detection region Rsen1 is provided with the detection electrodes 25. The transistor region Rtft is provided with the thin-film transistors Tr. The second detection region Rsen2 is provided with the capacitance detection conductor 26.

The semiconductor layer 103 is provided on the first surface 101a of the base 101 in the transistor region Rtft. The first interlayer insulating film 105 is provided on the base 101 and covers the semiconductor layer 103. The upper surface of the first interlayer insulating film 105 is flattened.

The gate electrode 107 is provided on the first interlayer insulating film 105 in the transistor region Rtft. The second interlayer insulating film 111 is provided on the first interlayer insulating film 105 and covers the gate electrode 107. The upper surface of the second interlayer insulating film 111 is flattened.

Through holes are formed in the second interlayer insulating film 111 and the first interlayer insulating film 105 in the transistor region Rtft. The bottom surface of the through holes corresponds to the semiconductor layer 103. The source electrode 113 and the drain electrode 115 are provided on the second interlayer insulating film 111 in the transistor region Rtft. The source electrode 113 and the drain electrode 115 extend in the through holes formed in the second interlayer insulating film 111 and the first interlayer insulating film 105 in the transistor region Rtft. With this configuration, the source electrode 113 and the drain electrode 115 are coupled to the semiconductor layer 103.

The third interlayer insulating film 117 is provided on the second interlayer insulating film 111 and covers the source electrode 113 and the drain electrode 115. The upper surface of the third interlayer insulating film 117 is flattened. The shield layer 24 is provided on the third interlayer insulating film 117. The fourth interlayer insulating film 121 is provided on the third interlayer insulating film 117 and covers the shield layer 24. The upper surface of the fourth interlayer insulating film 121 is flattened. A through hole is formed in the fourth interlayer insulating film 121 and the third interlayer insulating film 117. The bottom surface of the through hole corresponds to the drain electrode 115. The detection electrode 25 is provided on the fourth interlayer insulating film 121 in the first detection region Rsen1. The detection electrode 25 extends in the through hole formed in the fourth interlayer insulating film 121 and the third interlayer insulating film 117. With this configuration, the detection electrode 25 is coupled to the drain electrodes 115. The capacitance detection conductor 26 is provided on the fourth interlayer insulating film 121 in the second detection region Rsen2. The passivation film 131 is provided on the fourth interlayer insulating film 121 and covers the detection electrode 25 and the capacitance detection conductor 26.

The following describes an example of materials of the films provided on the base 101. Examples of the first interlayer insulating film 105 include, but are not limited to, a silicon oxide film, a silicon nitride film, a silicon oxynitride film, etc. The first interlayer insulating film 105 is not necessarily a single layer and may be a multilayered film. The first interlayer insulating film 105, for example, may be a multilayered film in which a silicon nitride film is formed on a silicon oxide film. Similarly, examples of the second interlayer insulating film 111, the third interlayer insulating film 117, and the fourth interlayer insulating film 121 include, but are not limited to, a silicon oxide film, a silicon nitride film, a silicon oxynitride film, etc. The second interlayer insulating film 111, the third interlayer insulating film 117, and the fourth interlayer insulating film 121 are not necessarily single layers and may be multilayered films.

Examples of the semiconductor layer 103 include, but are not limited to, a polysilicon film, an oxide semiconductor film, etc. The gate electrode 107 is made of aluminum (Al), copper (Cu), silver (Ag), or molybdenum (Mo) or is an alloy film of these metals. The source electrode 113 and the drain electrode 115 are titanium-aluminum (TiAl) films, which are made of an alloy of titanium and aluminum. The shield layer 24, the detection electrodes 25, and the capacitance detection conductor 26 are conductive films that allow visible light to pass therethrough. The property of allowing visible light to pass therethrough is hereinafter referred to as translucency. Examples of a translucent conductive film include, but are not limited to, an indium tin oxide (ITO) film. The passivation film 131 is an insulating film. The passivation film 131 is a film made of an inorganic material, such as a silicon nitride film, or a resin film.

Figure 10:
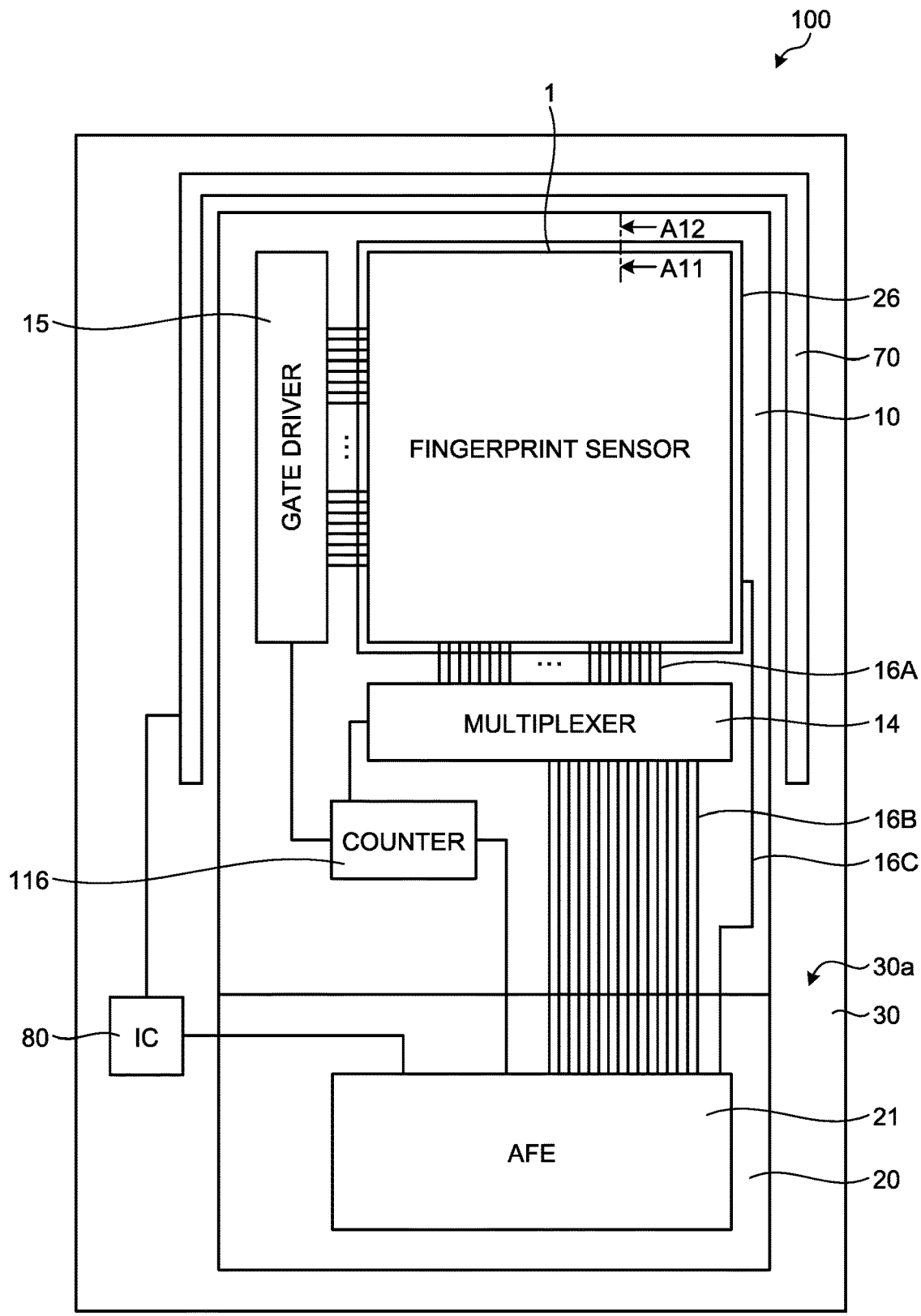
FIG. 10 is a plan view of an exemplary configuration of the fingerprint detection device.

FIG. 10 is a plan view of an exemplary configuration of the fingerprint detection device. As illustrated in FIG. 10, the detection device 100 includes the insulating substrate 10, a first circuit substrate 20, and a second circuit substrate 30. The insulating substrate 10 and the first circuit substrate 20 are disposed on a first surface 30a of the second circuit substrate 30. The first circuit substrate 20 is a flexible substrate. The second circuit substrate 30 is a rigid substrate, such as a printed circuit board (PCB). The first circuit substrate 20 couples the insulating substrate 10 and the second circuit substrate 30.

As illustrated in FIG. 10, the insulating substrate 10 is provided with the fingerprint sensor 1, the multiplexer 14, the gate driver 15, and the counter 116. The counter 116 couples the multiplexer 14 and the gate driver 15 via wiring. The fingerprint sensor 1 is coupled to the input side of the multiplexer 14 via a plurality of wiring 16A.

The first circuit substrate 20 is provided with an analog front end (hereinafter, referred to as an AFE) 21. The output side of the multiplexer 14 is coupled to a plurality of channels of the AFE 21 via a plurality of wiring 16B. The capacitance detection conductor 26 is coupled to one channel of the AFE 21 via wiring 16C. The counter 116 is coupled to the AFE 21 via wiring.

At least part of the functions of the detection controller 11 illustrated in FIG. 1 and at least part of the functions of the detector 40 are included in an integrated circuit (IC) element 80. Out of the various functions of the detector 40 illustrated in FIG. 1, the functions of the signal arithmetic processor 44, the coordinate extractor 45, the synthesizer 46, the detection timing controller 47, and the storage 48, for example, are included in the IC element 80. Out of the various functions of the detection controller 11 illustrated in FIG. 4, the functions of the clock signal generator 110, the drive signal generator 112, the gate driver controller 114, and the multiplexer controller 118 are included in the IC element 80. At least part of the functions of the detector 40 illustrated in FIG. 1 are included in the AFE 21. Out of the various functions of the detector 40 illustrated in FIG. 1, the functions of the detection signal amplifier 42 and the A/D converter 43, for example, are included in the AFE 21.

At least part of the functions of the detection controller 11 illustrated in FIG. 1 may be included in the gate driver 15. The functions of the selection signal generator 114A and the inversion circuit 114B included in the gate driver controller 114, for example, may be included in the gate driver 15. At least part of the functions of the detection controller 11 illustrated in FIG. 1 or at least part of the functions of the detector 40 may be included in an IC element or a central processing unit (CPU), which is not illustrated, provided separately from the IC element 80. The insulating substrate 10 may include an integrated circuit, which is not illustrated. In this case, at least part of the functions of the detection controller 11 illustrated in FIG. 1 and at least part of the functions of the detector 40 may be included in the integrated circuit provided to the insulating substrate 10. The functions of the signal arithmetic processor 44 out of the various functions of the detector 40, for example, may be included in the integrated circuit provided to the insulating substrate 10. The counter 116 may be included in the IC element 80 or the integrated circuit provided to the insulating substrate 10.

The transmission conductor 70 and the IC element 80 are provided on the first surface 30a of the second circuit substrate 30. The IC element 80 is coupled to the transmission conductor 70 via wiring. The IC element 80 is also coupled to the AFE 21 via wiring. The transmission conductor 70 may have a ring shape surrounding the fingerprint sensor 1. Alternatively, the transmission conductor 70 may have a shape lacking a part of a ring surrounding the fingerprint sensor 1 as illustrated in FIG. 10. The transmission conductor 70, for example, may have a shape lacking one side of four sides of a rectangular ring surrounding the fingerprint sensor 1. This configuration can prevent the transmission conductor 70 from overlapping the wiring 16A that couple the fingerprint sensor 1 and the multiplexer 14, for example. Alternatively, this configuration can prevent the transmission conductor 70 from overlapping the wiring 16B that couple the multiplexer 14 and the AFE 21. Consequently, this configuration can prevent the drive signals Vs supplied to the transmission conductor 70 from affecting the wiring 16A or the wiring 16B and becoming noise.

Figure 11:
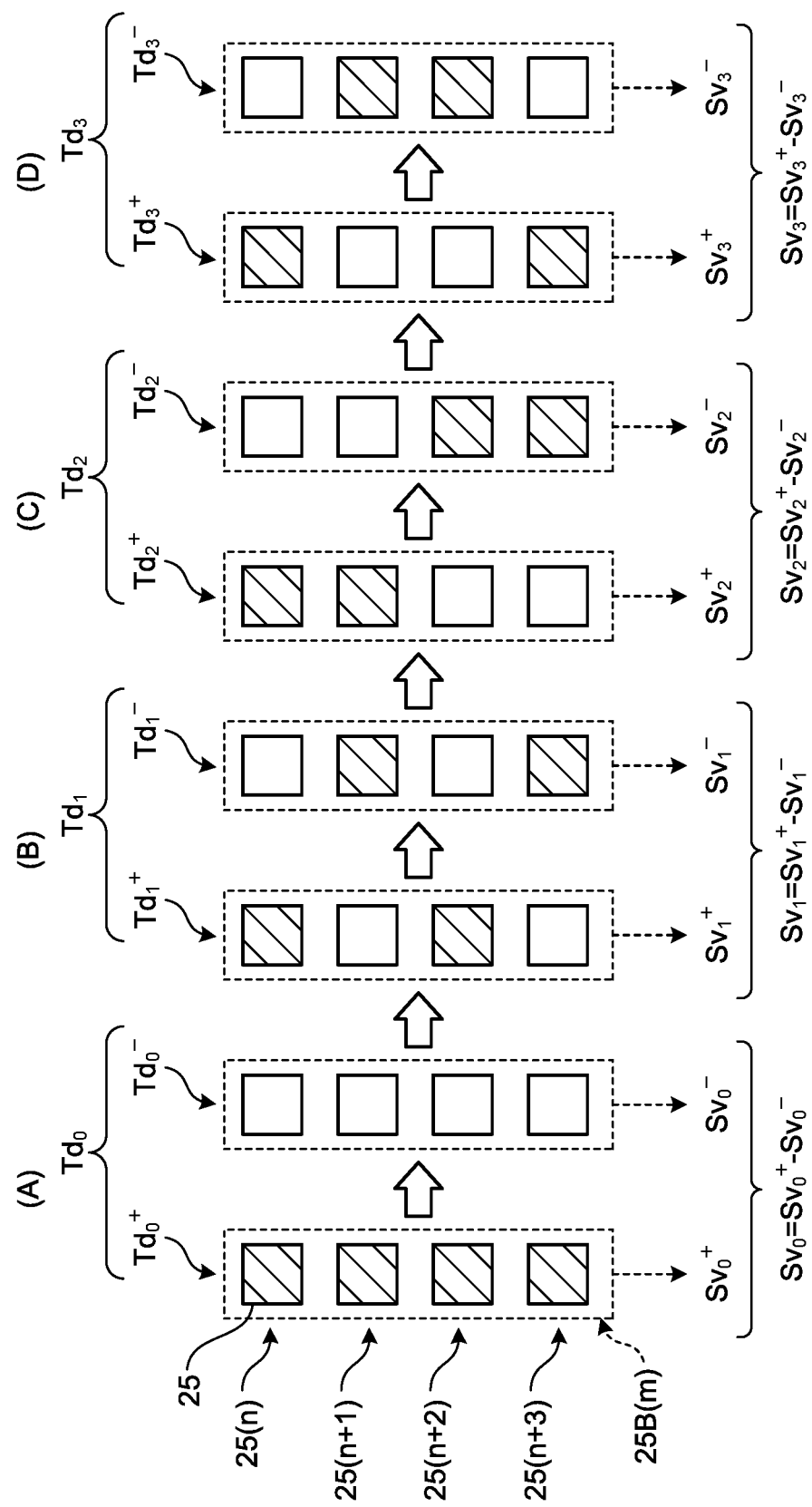
FIG. 11 is a diagram of selection patterns of the detection electrodes by code division multiplex drive.
Figure 12:
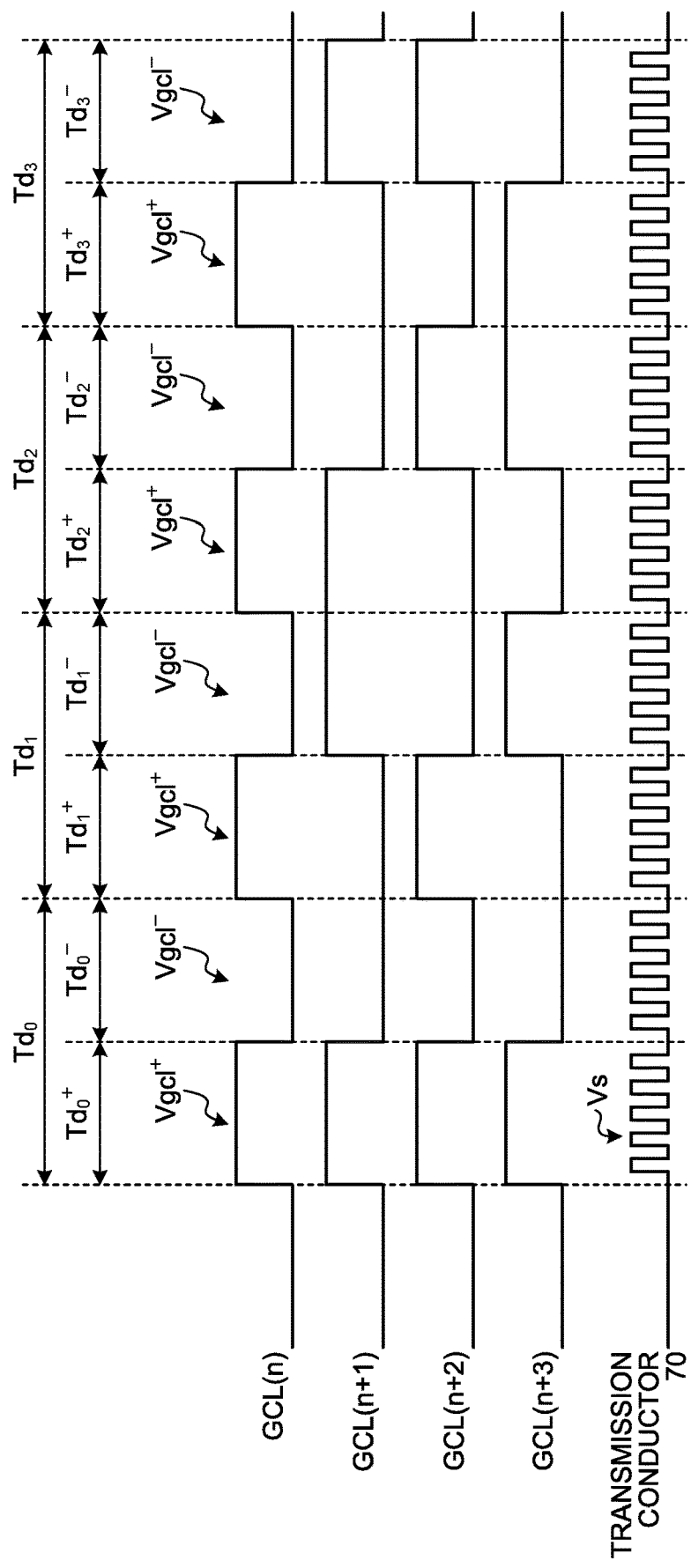
FIG. 12 is a timing waveform chart of an exemplary operation performed by the detection device according to the first embodiment.

The following describes the method for detecting a fingerprint performed by the detection device 100. The detection device 100 performs code division multiplex drive on detection electrode blocks 25B each including a plurality of detection electrodes 25, thereby detecting a fingerprint. FIG. 11 is a diagram of selection patterns of the detection electrodes by code division multiplex drive. Pattern (A) of FIG. 11 indicates a selection pattern of the detection electrodes 25 in a first detection operation $Td_0$. Pattern (B) of FIG. 11 indicates a selection pattern of the detection electrodes 25 in a second detection operation $Td_1$. Pattern (C) of FIG. 11 indicates a selection pattern of the detection electrodes 25 in a third detection operation $Td_2$. Pattern (D) of FIG. 11 indicates a selection pattern of the detection electrodes 25 in a fourth detection operation $Td_3$. FIG. 12 is a timing waveform chart of an exemplary operation performed by the detection device according to the first embodiment.

The following describes code division multiplex drive performed on one detection electrode block 25B(m) first. As illustrated in FIG. 11, the detection electrode block 25B(m) includes four detection electrode 25 arrayed in the column direction (Y-direction). The four detection electrodes 25 are coupled to the common data line SGL(m) (refer to FIG. 3) via their respective thin-film transistors Tr. The gate driver 15 supplies the scanning signals to the gate lines GCL corresponding to the selected detection electrodes 25 in the detection electrode block 25B(m), thereby turning on the thin-film transistors Tr. As a result, the selected detection electrodes 25 are coupled to the data line SGL(m), and the detection signal $Sv_p$ is output from the data line SGL(m) to the multiplexer 14.

The relation between the detection signal $Sv_p$ output from the data line SGL(m) and the detection signals $Si_q$ output from the respective detection electrodes 25 is expressed by Expression (1). As indicated by Expression (1), the value obtained by integrating the detection signals $Si_q$ of the selected detection electrodes 25 is output as the detection signal $Sv_p$. In other words, the detection signal $SV_p$ is expressed by the sum of the signal values $Si_q$ output from the selected detection electrodes 25. The detection signals $Si_q$ output from the detection electrodes 25 correspond to the detection signals Vdet in the basic principle of mutual capacitance touch detection described above.

$$Sv_p = \sum_{q=0}^{Q-1} H_v si_q \quad (1)$$

The detection signal $Sv_p$ is calculated by performing arithmetic processing on the signals output from the detection electrodes 25 selected from the detection electrode block 25B(m) based on the predetermined code. The predetermined code is defined by a square matrix $H_v$ in Expression (2), for example. The square matrix $H_v$ is a Hadamard matrix the elements of which are either "1" or "−1" and certain two different rows of which are an orthogonal matrix. In the detection electrode block 25B(m), for example, the detection electrodes 25 are selected based on plus and minus signs of the Hadamard matrix. Consequently, the phase of the signal output from the detection electrode block 25B(m) (that is, the signals output from the selected detection electrodes 25) is determined by the plus and minus signs of the Hadamard matrix.

$$H_v = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (2)$$

The order of the square matrix $H_v$ is equal to the number of detection electrodes 25 included in the detection electrode block 25B(m), that is, four in the example illustrated in FIG. 11.

As illustrated in (A) to (D) of FIG. 11, the following describes an example of code division multiplex drive by dividing it into four detection operations, that is, the first detection operation $Td_0$, the second detection operation $Td_1$, the third detection operation $Td_2$, and the fourth detection operation $Td_3$. The first detection operation $Td_0$, the second detection operation $Td_1$, the third detection operation $Td_2$, and the fourth detection operation $Td_3$ include plus sign selection operations $Td_0^+$, $Td_1^+$, $Td_2^+$, and $Td_3^+$, and minus sign selection operations $Td_0^-$, $Td_1^-$, $Td_2^-$, and $Td_3^-$, respectively. In the following description, the plus sign selection operations $Td_0^+$, $Td_1^+$, $Td_2^+$, and $Td_3^+$ are simply referred to as the plus sign selection operation $Td^+$ when they need not be distinguished from one another. Similarly, the minus sign selection operations $Td_0^-$, $Td_1^-$, $Td_2^-$, and $Td_3^-$ are simply referred to as the minus sign selection operation $Td^-$ when they need not be distinguished from one another. The plus sign selection operation corresponds to a "first selection operation" according to this disclosure. The minus sign selection operation corresponds to a "second selection operation" according to this disclosure.

As illustrated in FIG. 12, the plus sign selection operation $Td_p^+$ and the minus sign selection operation $Td_p^-$ are successively performed. In addition, the plus sign selection operation $Td_p^+$ and the minus sign selection operation $Td_p^-$ are alternately performed. In the plus sign selection operation $Td^+$ performed in a first period, the detection controller 11 (refer to FIG. 1) according to this embodiment selects the detection electrodes 25 serving as a first selection target based on the first selection signals Vgcl$^+$ corresponding to the elements "1" of the square matrix $H_v$. The detection controller 11 also selects the detection electrodes 25 serving as a second selection target not included in the detection electrodes 25 serving as the first selection target out of the detection electrodes 25. The detection controller 11 supplies the first selection signals Vgcl$^+$ to the gate driver 15 (refer to FIG. 1). The gate driver 15 supplies the scanning signals based on the first selection signals Vgcl$^+$ to the gate lines GCL (refer to FIG. 3).

As a result, the detection electrodes 25 serving as the first selection target are in a coupled state to the detector 40 (refer to FIG. 1), and the detection electrodes 25 serving as the second selection target are in a non-coupled state to the detector 40. In the coupled state, the selected detection electrodes 25 are coupled to the detector 40 via the data line SGL and the multiplexer 14 (refer to FIG. 1). In the non-coupled state, the selected detection electrodes 25 are not coupled to the detector 40. To distinguish the first selection target from the second selection target, the detection electrodes 25 serving as the first selection target are hatched in (A) to (D) of FIG. 11.

A first detection signal $Sv_p^+$ (p=0, 1, 2, and 3) is output from the detection electrodes 25 to the detector 40 via one data line SGL and the multiplexer 14. The first detection signal $Sv_p^+$ is obtained by integrating the detection signals output from the detection electrodes 25 serving as the first selection target selected based on the first selection signals Vgcl$^+$. As described above, the first selection signal corresponds to the element "1" of the square matrix $H_v$.

In the minus sign selection operation $Td^-$ performed in a second period different from the first period, the detection controller 11 selects the detection electrodes 25 serving as the first selection target based on the second selection signals Vgcl$^-$ corresponding to the elements "−1" of the square matrix $H_v$. The detection controller 11 also selects the detection electrodes 25 serving as the second selection target not included in the detection electrodes 25 serving as the first selection target out of the detection electrodes 25. The detection controller 11 supplies the second selection signals Vgcl$^-$ to the gate driver 15 (refer to FIG. 1). The gate driver 15 supplies, to the gate lines GCL (refer to FIG. 3), the scanning signals based on the second selection signals Vgcl$^-$. As a result, the detection electrodes 25 serving as the first selection target are in the coupled state, and the detection electrodes 25 serving as the second selection target are in the non-coupled state. The detection electrodes 25 serving as the first selection target in the plus sign selection operation $Td^+$ correspond to the detection electrodes 25 serving as the second selection target in the minus sign selection operation $Td^-$. In other words, the minus sign selection operation $Td^-$ is an operation of inverting the selection pattern of the detection electrodes 25 selected in the plus sign selection operation $Td^+$.

A second detection signal $Sv_p^-$ (p=0, 1, 2, and 3) is output from the detection electrodes 25 to the detector 40 via one data line SGL and the multiplexer 14. The second detection signal $Sv_p^-$ is obtained by integrating the detection signals output from the detection electrodes 25 serving as the first selection target selected based on the second selection signals. As described above, the second selection signals correspond to the elements "−1" of the square matrix $H_v$.

The signal arithmetic processor 44 (refer to FIG. 1) of the detector 40 calculates the difference between the first detection signal $Sv_p^+$ and the second detection signal $Sv_p^-$. The signal arithmetic processor 44 thus calculates the detection signal $Sv_p$, that is, $Sv_p=Sv_p^+-Sv_p^-$. The signal arithmetic processor 44 outputs the detection signal $Sv_p$ to the storage 48 to temporarily store it in the storage 48.

If the order of the square matrix is four, four detection signals ($Sv_0$, $Sv_1$, $Sv_2$, and $Sv_3$) are obtained from one detection electrode block 25B as indicated by Expression (3). In this case, the detection signals ($Sv_0$, $Sv_1$, $Sv_2$, and $Sv_3$) are calculated from the four first detection signals $Sv_0^+$, $Sv_1^+$, $Sv_2^+$, and $Sv_3^+$ and the four second detection signals $Sv_0^-$, $Sv_1^-$, $Sv_2^-$, and $Sv_3^-$, respectively.

$$\begin{pmatrix} Sv_0 \\ Sv_1 \\ Sv_2 \\ Sv_3 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Si_0 \\ Si_1 \\ Si_2 \\ Si_3 \end{pmatrix} \quad (3)$$

In the following description, let us assume a case where the detection signals $Si_q$ are expressed by: ($Si_0$, $Si_1$, $Si_2$, $Si_3$)=(1, 7, 3, 2), for example. The detection signal $Si_0$ is output from a detection electrode 25(n). The detection signal $Si_1$ is output from a detection electrode 25(n+1). The detection signal $Si_2$ is output from a detection electrode 25(n+2). The detection signal $Si_3$ is output from a detection electrode 25(n+3). In the fingerprint sensor 1, one detection electrode block 25B outputs one detection signal $Sv_p$ obtained by integrating the detection signals $Si_0$, $Si_1$, $Si_2$, and $Si_3$. The detector 40 calculates the individual detection signal $Si_q$ by the arithmetic processing described below.

As illustrated in (A) of FIG. 11, in the plus sign selection operation $Td_0^+$ of the first detection operation $Td_0$, the detection controller 11 (refer to FIG. 1) selects four detection electrodes 25(n), 25(n+1), 25(n+2), and 25(n+3) as the first selection target corresponding to the elements "1" in the first row of the square matrix $H_v$. As a result, the detection electrodes 25(n), 25(n+1), 25(n+2), and 25(n+3) are brought into the coupled state. The detection controller 11 selects no detection electrode 25 as the second selection target. The detection controller 11 supplies the drive signals Vs to the transmission conductor 70, whereby the detection electrode block 25B(m) outputs the first detection signal $Sv_0^+$. The first detection signal $Sv_0^+$ has a value of a signal obtained by integrating the detection signals $Si_q$ output from the detection electrodes 25 serving as the first selection target in the plus sign selection operation $Td_0^+$. The first detection signal $Sv_0^+$ is calculated by Expression (3): $Sv_0^+=1\times1+1\times7+1\times3+1\times2=13$.

In the minus sign selection operation $Td_0^-$ of the first detection operation $Td_0$, the detection controller 11 selects no detection electrode 25 as the first selection target corresponding to an element "−1" because an element "−1" is not present in the first row of the square matrix $H_v$. The detection controller 11 selects the four detection electrodes 25(n), 25(n+1), 25(n+2), and 25(n+3) as the second selection target. The detection controller 11 supplies the drive signals Vs to the transmission conductor 70, whereby the detection electrode block 25B(m) outputs the second detection signal $Sv_0^-$. The second detection signal $Sv_0^-$ has a value of a signal obtained by integrating the detection signals $Si_q$ output from the detection electrodes 25 serving as the first selection target in the minus sign selection operation $Td_0^-$. As described above, the detection controller 11 selects no detection electrode 25 as the first selection target in the minus sign selection operation $Td_0^-$. Consequently, the second detection signal $Sv_0^-$ is calculated by: $Sv_0^-=0\times1+0\times7+0\times3+0\times2=0$. A third detection signal $Sv_0$, which is the difference between the first detection signal $Sv_0^+$ and the second detection signal $Sv_0^-$, is calculated by: $Sv_0=Sv_0^+-Sv_0^-=13-0=13$.

As illustrated in (B) of FIG. 11, in the plus sign selection operation $Td_1^+$ of the second detection operation $Td_1$, the detection controller 11 selects the detection electrodes 25(n) and 25(n+2) as the first selection target corresponding to the elements "1" in the second row of the square matrix $H_v$. As a result, the detection electrodes 25(n) and 25(n+2) are brought into the coupled state. The detection controller 11 selects the detection electrodes 25(n+1) and 25(n+3) as the second selection target. The detection electrode block 25B(m) outputs the first detection signal $Sv_1^+$. The first detection signal $Sv_1^+$ has a value of a signal obtained by integrating the detection signals $Si_q$ output from the detection electrodes 25 serving as the first selection target in the plus sign selection operation $Td_1^+$. The first detection signal $Sv_1^+$ is calculated by Expression (3): $Sv_1^+=1\times1+0\times7+1\times3+0\times2=4$.

In the minus sign selection operation $Td_1^-$ of the second detection operation $Td_1$, the detection controller 11 selects the detection electrodes 25(n+1) and 25(n+3) as the first selection 15 target corresponding to the elements "−1" in the second row of the square matrix $H_v$. As a result, the detection electrodes 25(n+1) and 25(n+3) are brought into the coupled state. The detection controller 11 selects the detection electrodes 25(n) and 25(n+2) as the second selection target. As a result, the detection electrodes 25(n) and 25(n+2) are brought into the non-coupled state. The detection controller 11 supplies the drive signals Vs to the transmission conductor 70, whereby the detection electrode block 25B(m) outputs the second detection signal $Sv_1^-$. The second detection signal $Sv_1^-$ has a value of a signal obtained by integrating the detection signals $Si_q$ output from the detection electrodes 25 serving as the first selection target in the minus sign selection operation $Td_1^-$. Consequently, the second detection signal $Sv_1^-$ is calculated by: $Sv_1^-=0\times1+1\times7+0\times3+1\times2=9$. A third detection signal $Sv_1$, which is the difference between the first detection signal $Sv_1^+$ and the second detection signal $Sv_1^-$, is calculated by: $Sv_1=Sv_1^+-Sv_1^-=4-9=-5$.

As illustrated in (C) of FIG. 11, in the plus sign selection operation $Td_2^+$ of the third detection operation $Td_2$, the detection controller 11 selects the detection electrodes 25(n) and 25(n+1) as the first selection target corresponding to the elements "1" in the third row of the square matrix $H_v$. As a result, the detection electrodes $25(n)$ and $25(n+1)$ are brought into the coupled state. The detection controller 11 selects the detection electrodes $25(n+2)$ and $25(n+3)$ as the second selection target. As a result, the detection electrodes $25(n+2)$ and $25(n+3)$ are brought into the non-coupled state. The detection controller 11 supplies the drive signals Vs to the transmission conductor 70, whereby the detection electrode block 25B(m) outputs the first detection signal $Sv_2^+$. The first detection signal $Sv_2^+$ is calculated by Expression (3): $Sv_2^+=1\times1+1\times7+0\times3+0\times2=8$.

In the minus sign selection operation $Td_2^-$ of the third detection operation $Td_2$, the detection controller 11 selects the detection electrodes $25(n+2)$ and $25(n+3)$ as the first selection target corresponding to the elements "−1" in the third row of the square matrix $H_v$. As a result, the detection electrodes $25(n+2)$ and $25(n+3)$ are brought into the coupled state. The detection controller 11 selects the detection electrodes $25(n)$ and $25(n+1)$ as the second selection target. As a result, the detection electrodes $25(n)$ and $25(n+1)$ are brought into the non-coupled state. The detection controller 11 supplies the drive signals Vs to the transmission conductor 70, whereby the detection electrode block 25B(m) outputs the second detection signal $Sv_2^-$. The second detection signal $Sv_2^-$ is calculated by: $Sv_2^-=0\times1+0\times7+1\times3+1\times2=5$. A third detection signal $Sv_2$, which is the difference between the first detection signal $Sv_2^+$ and the second detection signal $Sv_2^-$, is calculated by: $Sv_2=Sv_2^+-Sv_2^-=8-5=3$.

As illustrated in (D) of FIG. 11, in the plus sign selection operation $Td_3^+$ of the fourth detection operation $Td_3$, the detection controller 11 selects the detection electrodes $25(n)$ and $25(n+3)$ as the first selection target corresponding to the elements "1" in the fourth row of the square matrix $H_v$. As a result, the detection electrodes $25(n)$ and $25(n+3)$ are brought into the coupled state. The detection controller 11 selects the detection electrodes $25(n+1)$ and $25(n+2)$ as the second selection target. As a result, the detection electrodes $25(n+1)$ and $25(n+2)$ are brought into the non-coupled state. The detection controller 11 supplies the drive signals Vs to the transmission conductor 70, whereby the detection electrode block 25B(m) outputs the first detection signal $Sv_3^+$. The first detection signal $Sv_3^+$ is calculated by Expression (3): $Sv_3^+=1\times1+0\times7+0\times3+1\times2=3$.

In the minus sign selection operation $Td_3^-$ of the fourth detection operation $Td_3$, the detection controller 11 selects the detection electrodes $25(n+1)$ and $25(n+2)$ as the first selection target corresponding to the elements "−1" in the fourth row of the square matrix $H_v$. As a result, the detection electrodes $25(n+1)$ and $25(n+2)$ are brought into the coupled state. The detection controller 11 selects the detection electrodes $25(n)$ and $25(n+3)$ as the second selection target. As a result, the detection electrodes $25(n)$ and $25(n+3)$ are brought into the non-coupled state.

The detection controller 11 supplies the drive signals Vs to the transmission conductor 70, whereby the detection electrode block 25B(m) outputs the second detection signal $Sv_3^-$. The second detection signal $Sv_3^-$ is calculated by: $Sv_3^-=0\times1+1\times7+1\times3+0\times2=10$. A third detection signal $Sv_3$, which is the difference between the first detection signal $Sv_3^+$ and the second detection signal $Sv_3^-$, is calculated by: $Sv_3=Sv_3^+-Sv_3^-=3-10=-7$.

The signal arithmetic processor 44 sequentially calculates the detection signals Sv from the first detection signals $Sv^+$ and the second detection signals $Sv^-$. The signal arithmetic processor 44 sequentially outputs the four detection signals $(Sv_0, Sv_1, Sv_2, Sv_3)=(13, -5, 3, -7)$ to the storage 48. The signal arithmetic processor 44 may store the four first detection signals $Sv_0^+$, $Sv_1^+$, $Sv_2^+$, and $Sv_3^+$ and the four second detection signals $Sv_0^-$, $Sv_2^-$, and $Sv_3^-$ in the storage 48 and then calculate the four detection signals $Sv_0$, $Sv_1$, $Sv_2$, and $Sv_3$ after performing detection in all the periods.

The signal arithmetic processor 44 decodes the four detection signals $(Sv_0, Sv_1, Sv_2, Sv_3)=(13, -5, 3, -7)$ using Expression (4). Based on Expression (4), the signal arithmetic processor 44 calculates detection signals $(Si_0d, Si_1d, Si_2d, Si_3d)=(4, 28, 12, 8)$ resulting from decoding.

$$\begin{pmatrix} Si_0d \\ Si_1d \\ Si_2d \\ Si_3d \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Sv_0 \\ Sv_1 \\ Sv_2 \\ Sv_3 \end{pmatrix} \quad (4)$$

The detection signal $Si_0d$ resulting from decoding is allocated to the detection electrode $25(n)$. The detection signal $Si_1d$ resulting from decoding is allocated to the detection electrode $25(n+1)$. The detection signal $Si_2d$ resulting from decoding is allocated to the detection electrode $25(n+2)$. The detection signal $Si_3d$ resulting from decoding is allocated to the detection electrode $25(n+3)$. Contact or proximity of a finger changes the values of the detection signals $Si_0d$, $Si_1d$, $Si_2d$, and $Si_3d$, which result from decoding, of the detection electrodes 25 disposed at the contact or proximity position.

With the code division multiplex drive described above, the signal arithmetic processor 44 performs decoding using Expression (4) on the partial detection signal values $(Si_0, Si_1, Si_2, Si_3)=(1, 7, 3, 2)$, thereby calculating the detection signals $(Si_0d, Si_1d, Si_2d, Si_3d)=(4, 28, 12, 8)$ resulting from decoding. As is clear from comparison between the detection signals $(Si_0, Si_1, Si_2, Si_3)=(1, 7, 3, 2)$ and the detection signals $(Si_0d, Si_1d, Si_2d, Si_3d)=(4, 28, 12, 8)$ resulting from decoding, the detection signal $Si_qd$ resulting from decoding has signal intensity of four times the signal intensity of the detection signal $Si_q$. In other words, the detection device 100 can provide signal intensity of four times the signal intensity obtained in time division multiplex drive without raising the voltage of the drive signals Vs. The third detection signal $Sv_p$ is calculated as the difference between the first detection signal $Sv_p^+$ and the second detection signal $Sv_p^-$. When noise enters from the outside, a noise component in the first detection signal $Sv_p^+$ and that in the second detection signal $Sv_p^-$ are cancelled. Consequently, the detection device 100 can increase the noise resistance.

The detection controller 11 according to this embodiment switches the state of the detection electrodes 25 serving as the first selection target selected based on the predetermined code and the state of the detection electrodes 25 serving as the second selection target not included in the first selection target between the coupled state and the non-coupled state. The detector 40 performs decoding on the detection signals output from the detection electrodes 25 in each of the different selection patterns of the detection electrodes 25.

FIG. 12 is a timing waveform chart of an exemplary operation performed by the detector according to the first embodiment. As illustrated in FIG. 12, the plus sign selection operation $Td_p^+$ and the minus sign selection operation $Td_p^-$ are successively performed. In addition, the plus sign selection operation $Td_p^+$ and the minus sign selection operation $Td_p^-$ are alternately performed. The plus sign selection operation $Td_0^+$, the minus sign selection operation $Td_0^-$, the plus sign selection operation $Td_1^+$, the minus sign selection operation $Td_1^-$, the plus sign selection operation $Td_2^+$, the minus sign selection operation $Td_2^-$, the plus sign selection operation $Td_3^+$, and the minus sign selection operation $Td_3^-$ are successively performed in this order on one detection electrode block 25B(m) (refer to FIG. 11), for example. The plus sign selection operation $Td^+$ and the minus sign selection operation $Td^-$ are performed at different timings. Consequently, this operation can suppress capacitive coupling between the detection electrodes and provide satisfactory detection sensitivity.

The following describes code division multiplex drive performed on a plurality of detection electrode blocks 25B (m), 25B(m+1), 25B(m+2), and 25B(m+3). FIGS. 13A to 16B are diagrams of selection patterns of the detection electrodes by code division multiplex drive performed on a plurality of detection electrode blocks. FIGS. 13A, 14A, 15A and 16A indicate the selection patterns of the detection electrodes 25 in the plus sign selection operations $Td_0^+$, $Td_1^+$, $Td_2^+$, and $Td_3^+$. FIGS. 13B, 14B, 15B, and 16B indicate the selection patterns of the detection electrodes 25 in the minus sign selection operations $Td_0^-$, $Td_1^-$, $Td_2^-$, and $Td_3^-$. FIG. 17 is a diagram of an example of the execution order of code division multiplex drive (output order of data).

As illustrated in FIGS. 13A to 16B, the four detection electrode blocks 25B(m), 25B(m+1), 25B(m+2), and 25B (m+3) each include the four detection electrodes 25(n), 25(n+1), 25(n+2), and 25(n+3) arrayed in the column direction. The four detection electrode blocks 25B(m), 25B(m+1), 25B(m+2), and 25B(m+3) are arrayed at regular intervals in the row direction.

The four detection electrodes 25 included in the detection electrode block 25B(m) are coupled to the data line SGL(m) via their respective thin-film transistors Tr. The four detection electrodes 25 included in the detection electrode block 25B(m+1) are coupled to the data line SGL(m+1) via their respective thin-film transistors Tr. Similarly, the four detection electrodes 25 included in the detection electrode block 25B(m+2) are coupled to the data line SGL(m+2), and the four detection electrodes 25 included in the detection electrode block 25B(m+3) are coupled to the data line SGL(m+3). In the following description, the detection electrode blocks 25B(m), 25B(m+1), 25B(m+2), and 25B(m+3) are simply referred to as the detection electrode blocks 25B when they need not be distinguished from one another.

The multiplexer 14 includes four switches SW(m), SW(m+1), SW(m+2), and SW(m+3), for example. The switch SW(m) couples the data line SGL(m) to the detector 40 and uncouples the data line SGL(m) from the detector 40. The switch SW(m+1) couples the data line SGL(m+1) to the detector 40 and uncouples the data line SGL(m+1) from the detector 40. Similarly, the switch SW(m+2) couples and uncouples the data line SGL(m+2) to and from the detector 40, and the switch SW(m+3) couples and uncouples the data line SGL(m+3) to and from the detector 40. In the following description, the switches SW(m), SW(m+1), SW(m+2), and SW(m+3) are simply referred to as the switches SW when they need not be distinguished from one another.

The detection device 100 performs the plus sign selection operation $Td_0^+$ and the minus sign selection operation $Td_0^-$ of the first detection operation $Td_0$, the plus sign selection operation $Td_1^+$ and the minus sign selection operation $Td_1^-$ of the second detection operation $Td_1$, the plus sign selection operation $Td_2^+$ and the minus sign selection operation $Td_2^-$ of the third detection operation $Td_2$, and the plus sign selection operation $Td_3^+$ and the minus sign selection operation $Td_3^-$ of the fourth detection operation $Td_3$ on each of the detection electrode blocks 25B.

The execution order of the plus sign selection operations $Td_0^+$, $Td_1^+$, $Td_2^+$, and $Td_3^+$ and the minus sign selection operations $Td_0^-$, $Td_1^-$, $Td_2^-$, and $Td_3^-$ performed on each of the detection electrode blocks 25B is not limited. These operations are preferably performed in the order indicated by the arrow in FIG. 17, for example.

Figure 13A:
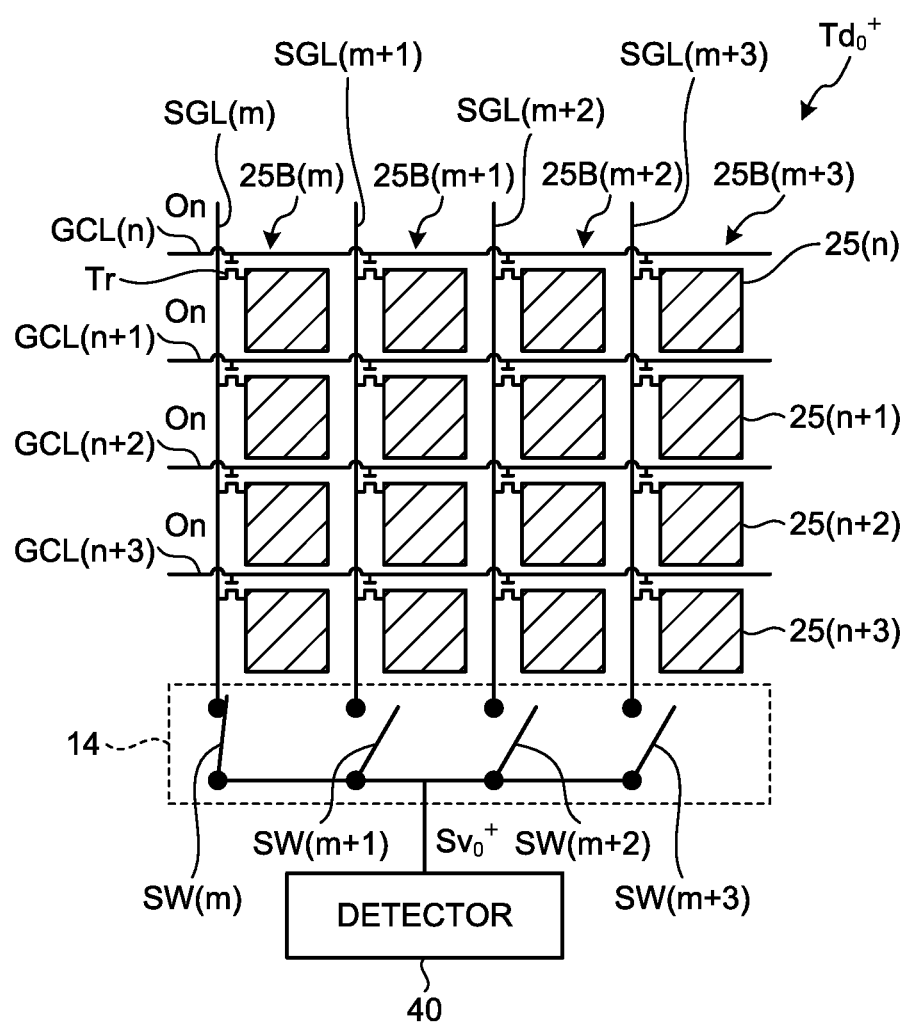
FIGS. 13A and 13B are diagrams of a selection pattern of the detection electrodes by code division multiplex drive performed on a plurality of detection electrode blocks.
Figure 13B:
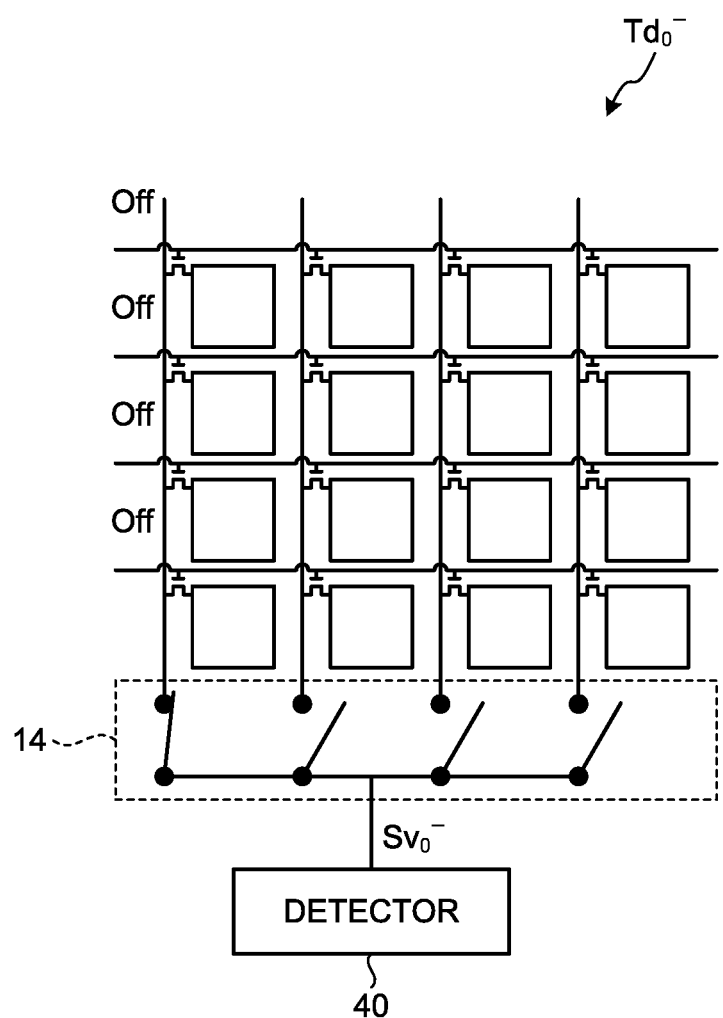

The detection device 100, for example, sequentially performs the first detection operation $Td_0$ on the detection electrode blocks 25B. Specifically, as illustrated in FIG. 13A, the multiplexer 14 turns on the switch SW(m) and turns off the switches SW(m+1), SW(m+2), and SW(m+3) based on the signals supplied from the multiplexer controller 118 (refer to FIG. 4). As a result, the data line SGL(m) coupled to the detection electrode block 25B(m) out of the four data lines SGL is coupled to the detector 40, and the other data lines SGL are not coupled to the detector 40. In this state, the gate driver 15 (refer to FIG. 1) performs the plus sign selection operation $Td_0^+$ of the first detection operation $Td_0$ as illustrated in FIG. 13A based on the first selection signals Vgcl$^+$ supplied from the gate driver controller 114 (refer to FIG. 4). Subsequently, the gate driver 15 performs the minus sign selection operation $Td_0^-$ of the first detection operation $Td_0$ as illustrated in FIG. 13B based on the second selection signals Vgcl$^-$ supplied from the gate driver controller 114. The process of the plus sign selection operation $Td_0^+$ and the minus sign selection operation $Td_0^-$ of the first detection operation $Td_0$ is the same as that described with reference to (A) of FIG. 11. As a result, the data line SGL(m) outputs the first detection signal $Sv_0^+$ and then outputs the second detection signal $Sv_0^-$.

Subsequently, the multiplexer 14 turns on the switch SW(m+1) and turns off the switches SW(m), SW(m+2), and SW(m+3) based on the signals supplied from the multiplexer controller 118. As a result, the data line SGL(m+1) coupled to the detection electrode block 25B(m+1) is coupled to the detector 40, and the other data lines SGL are not coupled to the detector 40. In this state, the gate driver 15 performs the plus sign selection operation $Td_0^+$ of the first detection operation $Td_0$ based on the first selection signals Vgcl$^+$ supplied from the gate driver controller 114. Subsequently, the gate driver 15 performs the minus sign selection operation $Td_0^-$ of the first detection operation $Td_0$ based on the second selection signals Vgcl$^-$ supplied from the gate driver controller 114. As a result, the data line SGL(m+1) outputs the first detection signal $Sv_0^+$ and then outputs the second detection signal $Sv_0^-$.

Subsequently, the multiplexer 14 turns on the switch SW(m+2) and turns off the switches SW(m), SW(m+1), and SW(m+3) based on the signals supplied from the multiplexer controller 118. As a result, the data line SGL(m+2) coupled to the detection electrode block 25B(m+2) is coupled to the detector 40, and the other data lines SGL are not coupled to the detector 40. In this state, the gate driver 15 performs the plus sign selection operation $Td_0^+$ of the first detection operation $Td_0$ based on the first selection signals Vgcl$^+$ supplied from the gate driver controller 114. Subsequently, the gate driver 15 performs the minus sign selection operation $Td_0^-$ of the first detection operation $Td_0$ based on the second selection signals Vgcl$^-$ supplied from the gate driver controller 114. As a result, the data line SGL(m+2) outputs the first detection signal $Sv_0^+$ and then outputs the second detection signal $Sv_0^-$.

Subsequently, the multiplexer 14 turns on the switch SW(m+3) and turns off the switches SW(m), SW(m+1), and SW(m+2) based on the signals supplied from the multiplexer controller 118. As a result, the data line SGL(m+3) coupled to the detection electrode block 25B(m+3) is coupled to the detector 40, and the other data lines SGL are not coupled to the detector 40. In this state, the gate driver 15 performs the plus sign selection operation $Td_0^+$ of the first detection operation $Td_0$ based on the first selection signals $Vgcl^+$ supplied from the gate driver controller 114. Subsequently, the gate driver 15 performs the minus sign selection operation $Td_0^-$ of the first detection operation $Td_0$ based on the second selection signals $Vgcl^-$ supplied from the gate driver controller 114. As a result, the data line SGL(m+3) outputs the first detection signal $Sv_0^+$ and then outputs the second detection signal $Sv_0^-$.

Figure 14A:
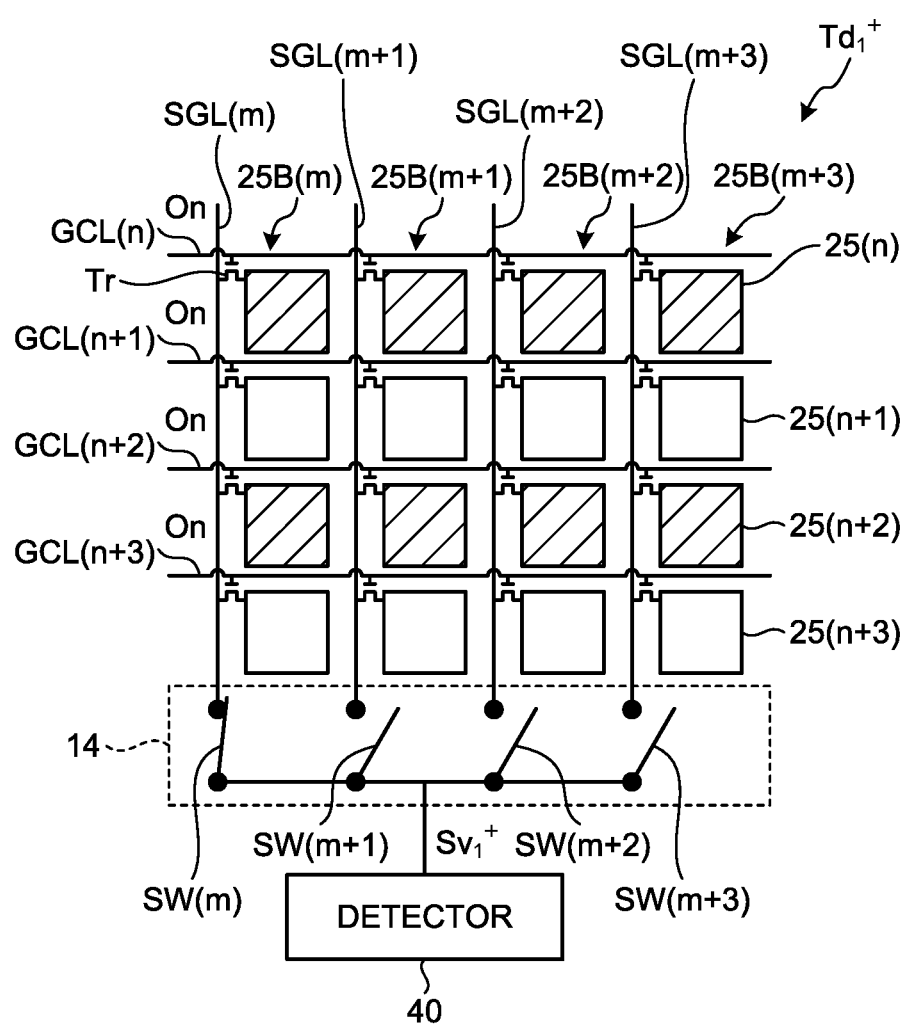
FIGS. 14A and 14B are diagrams of a selection pattern of the detection electrodes by code division multiplex drive performed on the detection electrode blocks.
Figure 14B:
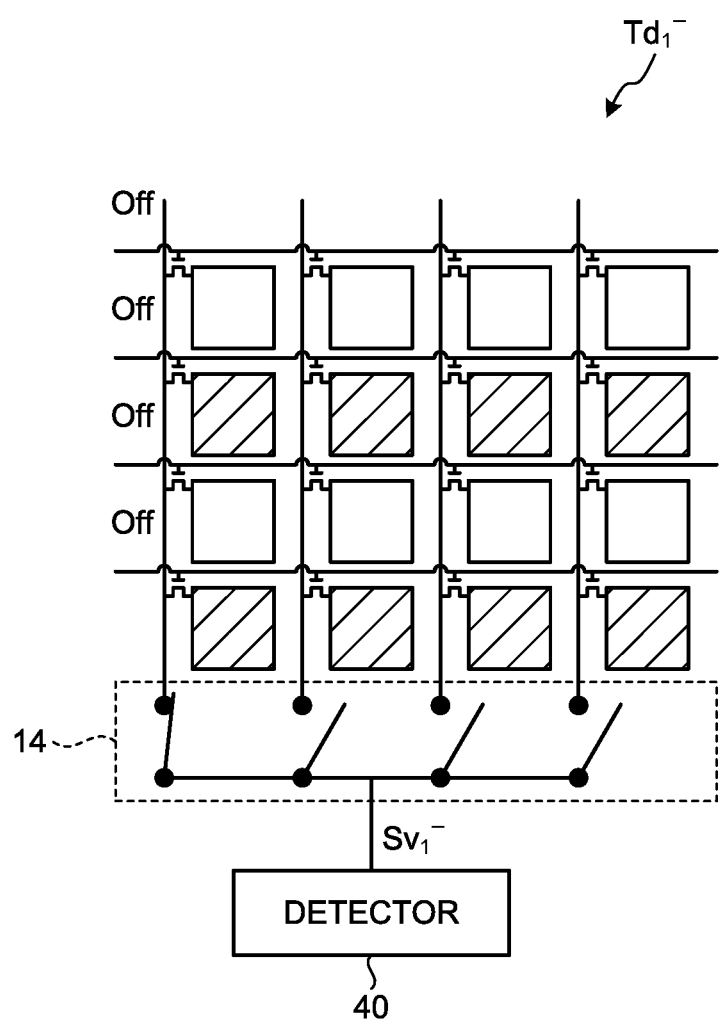

Subsequently, the detection device 100 sequentially performs the second detection operation $Td_1$ on the detection electrode blocks 25B. Specifically, as illustrated in FIG. 14A, the multiplexer 14 turns on the switch SW(m) and turns off the switches SW(m+1), SW(m+2), and SW(m+3) based on the signals supplied from the multiplexer controller 118. As a result, the data line SGL(m) coupled to the detection electrode block 25B(m) is coupled to the detector 40, and the other data lines SGL are not coupled to the detector 40. In this state, the gate driver 15 performs the plus sign selection operation $Td_1^+$ of the second detection operation $Td_1$ as illustrated in FIG. 14A based on the first selection signals $Vgcl^+$. Subsequently, the gate driver 15 performs the minus sign selection operation $Td_1^-$ of the second detection operation $Td_1$ as illustrated in FIG. 14B based on the second selection signals $Vgcl^-$. The process of the plus sign selection operation $Td_1^+$ and the minus sign selection operation $Td_1^-$ of the second detection operation $Td_1$ is the same as that described with reference to (B) of FIG. 11. As a result, the data line SGL(m) outputs the first detection signal $Sv_1^+$ and then outputs the second detection signal $Sv_1^-$.

Subsequently, the multiplexer 14 turns on the switch SW(m+1) and turns off the switches SW(m), SW(m+2), and SW(m+3) based on the signals supplied from the multiplexer controller 118. As a result, the data line SGL(m+1) coupled to the detection electrode block 25B(m+1) is coupled to the detector 40, and the other data lines SGL are not coupled to the detector 40. In this state, the gate driver 15 performs the plus sign selection operation $Td_1^+$ of the second detection operation $Td_1$ based on the first selection signals $Vgcl^+$. Subsequently, the gate driver 15 performs the minus sign selection operation $Td_1^-$ of the second detection operation $Td_1$ based on the second selection signals $Vgcl^-$. As a result, the data line SGL(m+1) outputs the first detection signal $Sv_1^+$ and then outputs the second detection signal $Sv_1^-$.

Subsequently, the multiplexer 14 turns on the switch SW(m+2) and turns off the switches SW(m), SW(m+1), and SW(m+3) based on the signals supplied from the multiplexer controller 118. As a result, the data line SGL(m+2) coupled to the detection electrode block 25B(m+2) is coupled to the detector 40, and the other data lines SGL are not coupled to the detector 40. In this state, the gate driver 15 performs the plus sign selection operation $Td_1^+$ of the second detection operation $Td_1$ based on the first selection signals $Vgcl^+$. Subsequently, the gate driver 15 performs the minus sign selection operation $Td_1^-$ of the second detection operation $Td_1$ based on the second selection signals $Vgcl^-$. As a result, the data line SGL(m+2) outputs the first detection signal $Sv_1^+$ and then outputs the second detection signal $Sv_1^-$.

Subsequently, the multiplexer 14 turns on the switch SW(m+3) and turns off the switches SW(m), SW(m+1), and SW(m+2) based on the signals supplied from the multiplexer controller 118. As a result, the data line SGL(m+3) coupled to the detection electrode block 25B(m+3) is coupled to the detector 40, and the other data lines SGL are not coupled to the detector 40. In this state, the gate driver 15 performs the plus sign selection operation $Td_1^+$ of the second detection operation $Td_1$ based on the first selection signals $Vgcl^+$. Subsequently, the gate driver 15 performs the minus sign selection operation $Td_1^-$ of the second detection operation $Td_1$ based on the second selection signals $Vgcl^-$. As a result, the data line SGL(m+3) outputs the first detection signal $Sv_1^+$ and then outputs the second detection signal $Sv_1^-$.

Figure 15A:
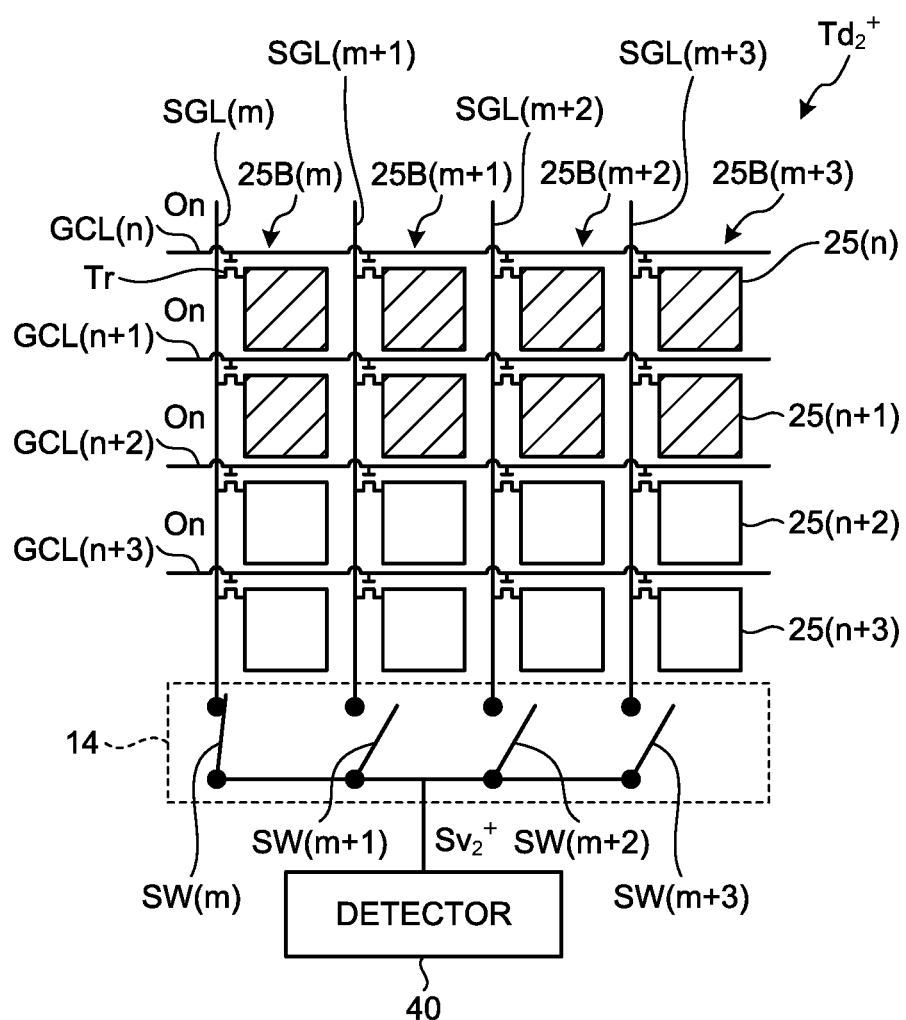
FIGS. 15A and 15B are diagrams of a selection pattern of the detection electrodes by code division multiplex drive performed on the detection electrode blocks.
Figure 15B:
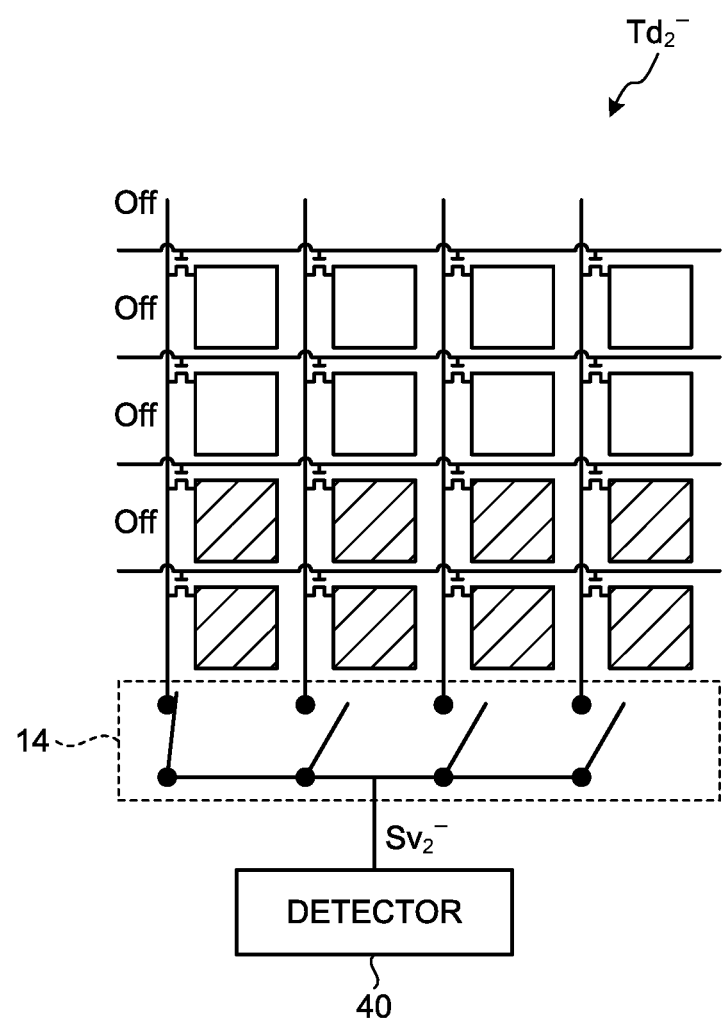

Subsequently, the detection device 100 sequentially performs the third detection operation $Td_2$ on the detection electrode blocks 25B. Specifically, as illustrated in FIG. 15A, the multiplexer 14 turns on the switch SW(m) and turns off the switches SW(m+1), SW(m+2), and SW(m+3). As a result, the data line SGL(m) is coupled to the detector 40, and the other data lines SGL are not coupled to the detector 40. In this state, the gate driver 15 performs the plus sign selection operation $Td_2^+$ of the third detection operation $Td_2$ as illustrated in FIG. 15A and then performs the minus sign selection operation $Td_2^-$ of the third detection operation $Td_2$ as illustrated in FIG. 15B. The process of the plus sign selection operation $Td_2^+$ and the minus sign selection operation $Td_2^-$ of the third detection operation $Td_2$ is the same as that described with reference to (C) of FIG. 11. As a result, the data line SGL(m) outputs the first detection signal $Sv_2^+$ and then outputs the second detection signal $Sv_2^-$.

Also in the third detection operation $Td_2$, similarly to the first detection operation $Td_0$ and the second detection operation $Td_1$, the multiplexer 14 turns on and off the switches SW, thereby coupling the data lines SGL(m), SGL(m+1), SGL(m+2), and SGL(m+3) one by one to the detector 40. The gate driver 15 performs the plus sign selection operation $Td_2^+$ of the third detection operation $Td_2$ and then performs the minus sign selection operation $Td_2^-$ of the third detection operation $Td_2$ on the detection electrode block 25B coupled to the detector 40 via the data line SGL. As a result, the data line SGL outputs the first detection signal $Sv_2^+$ and then outputs the second detection signal $Sv_2^-$ to the detector 40.

Figure 16A:
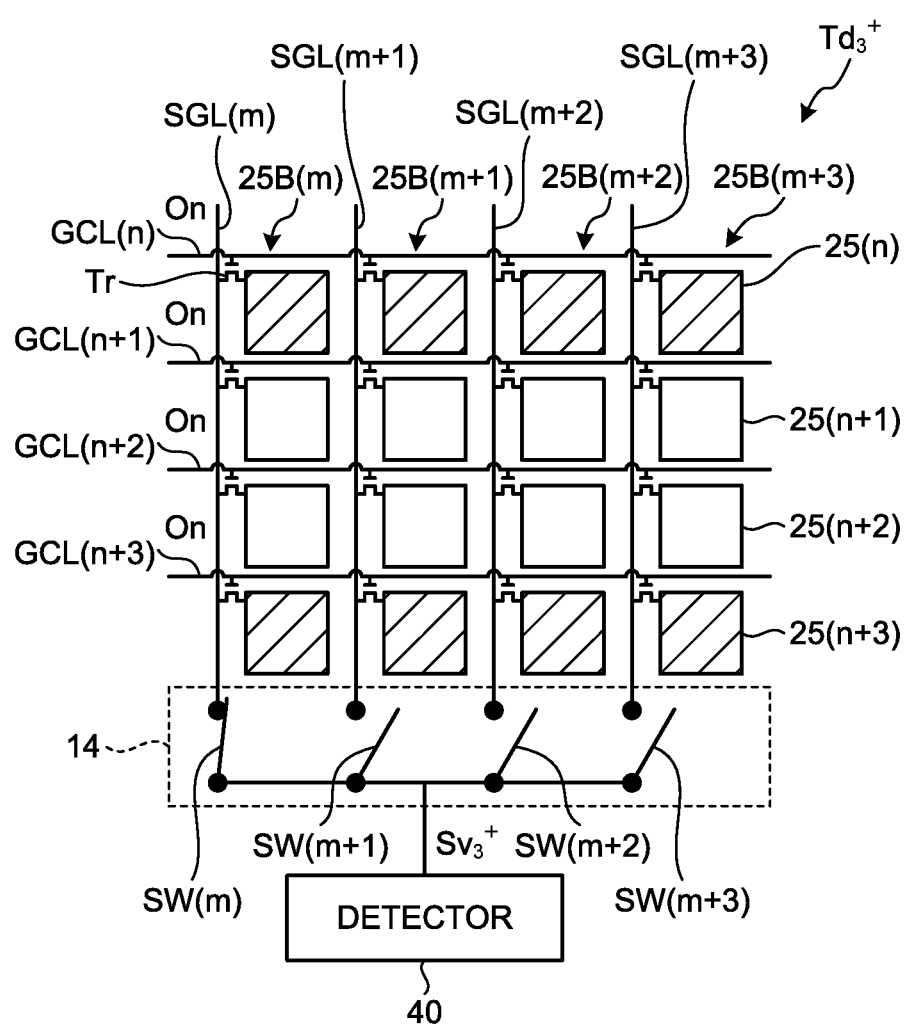
FIGS. 16A and 16B are diagrams of a selection pattern of the detection electrodes by code division multiplex drive performed on the detection electrode blocks.
Figure 16B:
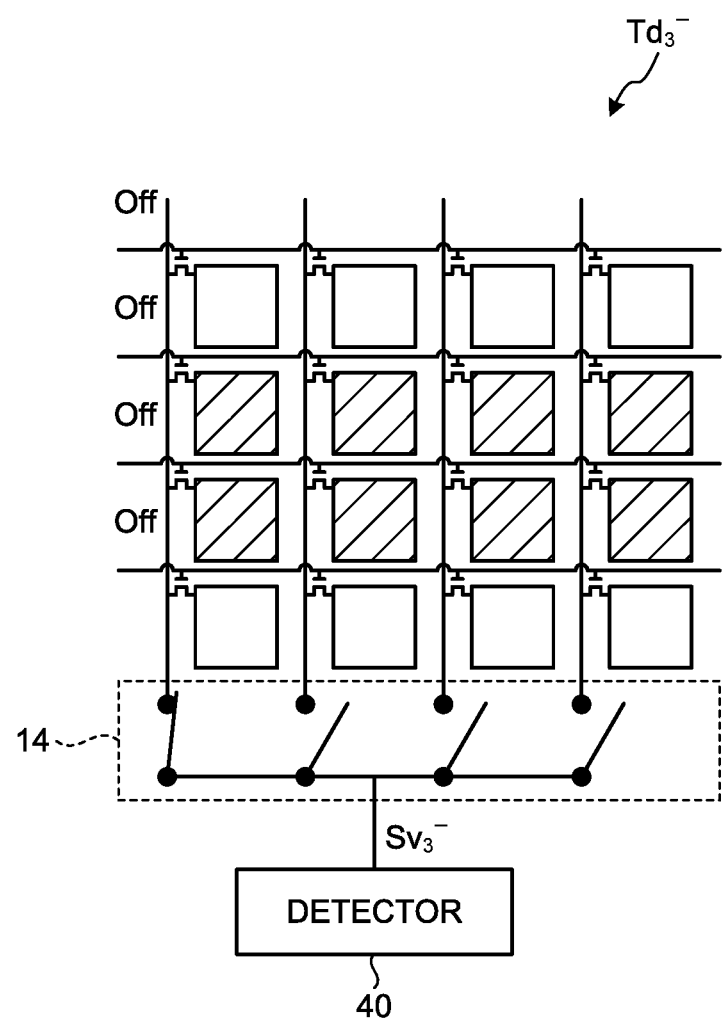

Subsequently, the detection device 100 sequentially performs the fourth detection operation $Td_3$ on the detection electrode blocks 25B. Specifically, as illustrated in FIG. 16A, the multiplexer 14 turns on the switch SW(m) and turns off the switches SW(m+1), SW(m+2), and SW(m+3). As a result, the data line SGL(m) is coupled to the detector 40, and the other data lines SGL are not coupled to the detector 40. In this state, the gate driver 15 performs the plus sign selection operation $Td_3^+$ of the fourth detection operation $Td_3$ as illustrated in FIG. 16A and then performs the minus sign selection operation $Td_3^-$ of the fourth detection operation $Td_3$ as illustrated in FIG. 16B. The process of the plus sign selection operation $Td_3^+$ and the minus sign selection operation $Td_3^-$ of the fourth detection operation $Td_3$ is the same as that described with reference to (D) of FIG. 11. As a result, the data line SGL(m) outputs the first detection signal $Sv_3^+$ and then outputs the second detection signal $Sv_3^-$.

Also in the fourth detection operation $Td_3$, similarly to the first detection operation $Td_1$ and the second detection operation $Td_2$, the multiplexer 14 turns on and off the switches SW, thereby coupling the data lines SGL(m), SGL(m+1), and SGL(m+2) one by one to the detector 40. The gate driver 15 performs the plus sign selection operation $Td_3^+$ of the fourth detection operation $Td_3$ and then performs the minus sign selection operation $Td_3^-$ of the fourth detection operation $Td_3$ on the detection electrode block 25B coupled to the detector 40 via the data line SGL. As a result, the data line SGL outputs the first detection signal $Sv_3^+$ and then outputs the second detection signal $Sv_3^-$ to the detector 40.

The signal arithmetic processor 44 (refer to FIG. 1) calculates third detection signals ($Sv_0$, $Sv_1$, $Sv_2$, and $Sv_3$) for each of the detection electrode blocks 25B. The third detection signal $Sv_0$ is calculated from the first detection signal $Sv_0^+$ and the second detection signal $Sv_0^-$. The third detection signal $Sv_1$ is calculated from the first detection signal $Sv_1^+$ and the second detection signal $Sv_1^-$. The third detection signal $Sv_2$ is calculated from the first detection signal $Sv_2^+$ and the second detection signal $Sv_2^-$. The third detection signal $Sv_3$ is calculated from the first detection signal $Sv_3^+$ and the second detection signal $Sv_3^-$. The signal arithmetic processor 44 outputs, to the storage 48, the third detection signals ($Sv_0$, $Sv_1$, $Sv_2$, and $Sv_3$) for each of the detection electrode blocks 25B. The signal arithmetic processor 44 decodes the third detection signals ($Sv_0$, $Sv_1$, $Sv_2$, and $Sv_3$) for each of the detection electrode blocks 25B using Expression (4).

In each of the detection electrode blocks 25B, the detection signal $Si_0d$ resulting from decoding is allocated to the detection electrode 25(n). The detection signal $Si_1d$ resulting from decoding is allocated to the detection electrode 25(n+1). The detection signal $Si_2d$ resulting from decoding is allocated to the detection electrode 25(n+2). The detection signal $Si_3d$ resulting from decoding is allocated to the detection electrode 25(n+3). In each of the detection electrode blocks 25B, contact or proximity of a finger changes the values of the detection signals $Si_0d$, $Si_1d$, $Si_2d$, and $Si_3d$ resulting from decoding of the detection electrodes 25 disposed at the contact or proximity position.

In each of the detection electrode blocks 25B, the coordinate extractor 45 can calculate the coordinates of the detection electrodes 25 with or to which a finger is in contact or in proximity out of the detection electrodes 25 based on the detection signals $Si_0d$, $Si_1d$, $Si_2d$, and $Si_3d$ resulting from decoding. The coordinate extractor 45 outputs the detection coordinates to the synthesizer 46. The synthesizer 46 combines the detection signals $Si_0d$, $Si_1d$, $Si_2d$, and $Si_3d$ resulting from decoding to generate two-dimensional information indicating the shape of the object in contact with or in proximity to the detection device 100. The synthesizer 46 outputs the two-dimensional information as the output Vout from the detector 40. Alternatively, the synthesizer 46 may generate an image based on the two-dimensional information and output the image information as the output Vout. The detector 40 may output the coordinates output from the coordinate extractor 45, as the output Vout. The detector 40 does not necessarily include the coordinate extractor 45 or the synthesizer 46. In this case, the detector 40 may output the detection signals $Si_0d$, $Si_1d$, $Si_2d$, and $Si_3d$ resulting from decoding, as the output Vout.

Figure 18:
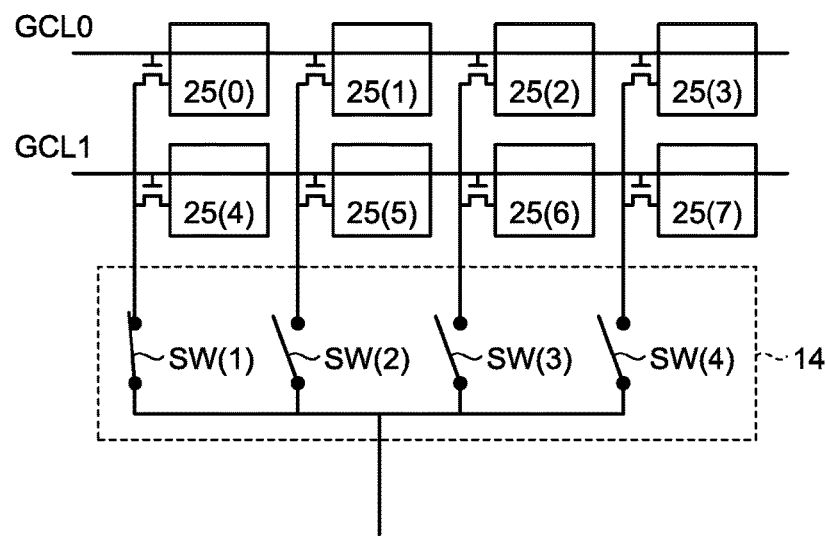
FIG. 18 is a schematic diagram for explaining the order of detection performed on the detection electrodes.
Figure 19:
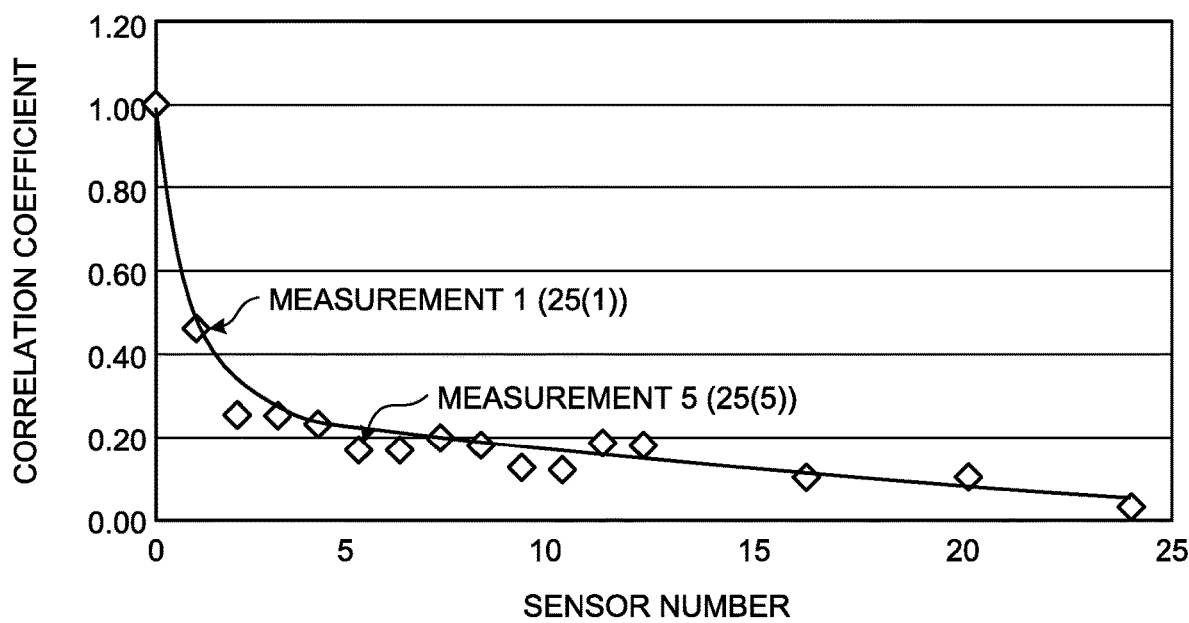
FIG. 19 is a graph schematically illustrating the relation between a sensor number and a correlation coefficient.
Figure 20:
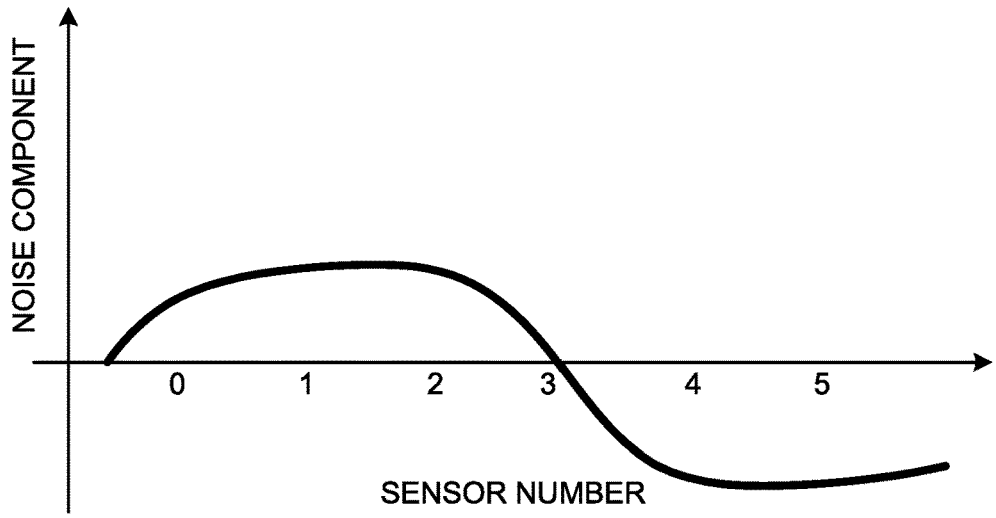
FIG. 20 is a diagram schematically illustrating periodic fluctuations of noise.

The following describes the relation between an effect of noise and a detection timing with reference to FIGS. 18 to 20. FIG. 18 is a schematic diagram for explaining the order of detection performed on the detection electrodes. FIG. 19 is a graph schematically illustrating the relation between a sensor number and a correlation coefficient. FIG. 20 is a diagram schematically illustrating periodic fluctuations of noise. FIGS. 18 to 20 illustrate the relation between the effect of noise and the detection timing in a detection device having the same configuration as that of this embodiment. FIGS. 18 to 20 are drawings for explaining how the effect of noise changes.

As illustrated in FIG. 18, the detection electrodes 25 are selected in the order of the detection electrodes 25(0), 25(1), 25(2), . . . , and 25(7), to perform the detection operation. Specifically, a gate line GCL(0) is selected first. The multiplexer 14 turns on the switches one by one in the order of the switches SW(1), SW(2), SW(3), and SW(4). Only one of the switches SW(1), SW(2), SW(3), and SW(4) is turned on at a time, and the other switches are turned off. A transmission conductor, which is not illustrated, is disposed around the detection electrodes 25(0), 25(1), 25(2), . . . , and 25(7). The transmission conductor is supplied with the drive signals Vs. As a result, detection is performed on the detection electrodes 25(0), 25(1), 25(2), and 25(3) in order.

Subsequently, a gate line GCL(1) is selected. The multiplexer 14 turns on the switches one by one in the order of the switches SW(1), SW(2), SW(3), and SW(4). In a manner similar to the selection of the gate line GCL(0), only one of the switches SW(1), SW(2), SW(3), and SW(4) is turned on at a time, and the other switches are turned off. As a result, detection is performed on the detection electrodes 25(4), 25(5), 25(6), and 25(7) in order. The order of detection illustrated in FIG. 18 is an example, and the order of detection according to this embodiment is not limited thereto.

The horizontal axis in FIGS. 19 and 20 indicates the sensor number corresponding to the measurement order of the detection electrodes 25. The vertical axis in FIG. 19 indicates the correlation coefficients of the detection signals output from the respective detection electrodes 25. The vertical axis in FIG. 20 indicates the magnitude of a noise component. When noise enters the detector 40, an error occurs in the detection signals of the detection electrodes 25. As illustrated in FIG. 19, the correlation coefficients of the detection signals of the detection electrodes 25 tend to decrease as the sensor number increases. In other words, the error component caused by noise increases with the lapse of time. The error caused by an effect of noise increases between the detection signal of the detection electrode 25(1) measured first and the detection signal of the detection electrode 25(5) measured fifth, for example. This is because the noise component fluctuating on a cycle longer than an interval of measurement of data is dominant in the detection device as illustrated in FIG. 20.

For this reason, the detection device 100 preferably performs the plus sign selection operation $Td^+$ and the minus sign selection operation $Td^-$ alternately like $Td_0^+$, $Td_0^-$, $Td_1^+$, $Td_1^-$, . . . as illustrated in FIG. 17. This mechanism shortens the interval between the detection time for the first detection signal $Sv_p^+$ and the detection time for the second detection signal $Sv_p^-$, thereby reducing the difference between the noise component included in the first detection signal $Sv_p^+$ and that included in the second detection signal $Sv_p^-$. The third detection signal $Sv_p$ is calculated as the difference between the first detection signal $Sv_p^+$ and the second detection signal $Sv_p^-$ by: $Sv_p = Sv_p^+ - Sv_p^-$. Consequently, the noise component included in the first detection signal $Sv_p^+$ and that included in the second detection signal $Sv_p^-$ are cancelled in the third detection signal $Sv_p$.

As described above, the detection device 100 according to the first embodiment includes the insulating substrate 10, the transmission conductor 70, the drive signal generator 112, and the detector 40. The insulating substrate 10 includes a plurality of detection electrodes 25. The transmission conductor 70 is disposed adjacent to the detection electrodes 25. The drive signal generator 112 is coupled to the transmission conductor 70. The detector 40 is coupled to the detection electrodes 25. The drive signal generator 112 supplies the detection drive signals Vs to the transmission conductor 70. The detector 40 detects the third detection signals $Sv_p$ corresponding to changes in capacitance in the detection electrodes 25. With this configuration, the drive signals Vs can be transmitted from the transmission conductor 70 to the detection electrodes 25 through the finger Fin or the like. The detection device of this embodiment can make unevenness on the surface of the finger more likely to be reflected on capacitance changes in the detection electrodes 25 than a case where the drive signals Vs are transmitted not through the finger Fin, thereby increasing the detection sensitivity to a fingerprint. Consequently, the detection device 100 can increase the detection sensitivity to an external object (e.g., the finger Fin).

The insulating substrate 10 includes the base 101. The detection electrodes 25 are disposed on the first surface 101a of the base 101. As illustrated in FIG. 8, for example, a height h3 of the transmission conductor 70 from the first surface 101a is higher than a height h1 of the detection electrodes 25 from the first surface 101a. As illustrated in FIG. 8, for example, the height h3 of the transmission conductor 70 from the first surface 101a is higher than a height h2 of the insulating resin 33 from the first surface 101a. This configuration facilitates natural contact of the finger Fin with the transmission conductor 70 when the finger Fin comes closer to the detection electrodes 25.

The detection electrodes 25 are arrayed in a first direction and a second direction intersecting the first direction. The first direction is the row direction, and the second direction is the column direction, for example. This configuration can increase the resolution for detecting the shape and the fingerprint of a finger.

The detection device 100 includes a coupling circuit that couples the detection electrodes 25 to the detector 40 and uncouples the detection electrodes 25 from the detector 40. The coupling circuit is the detection controller 11, the multiplexer 14, and the gate driver 15, for example. The coupling circuit performs the plus sign selection operation $Td^+$. In the plus sign selection operation $Td^+$, the coupling circuit causes the detection electrodes 25 serving as the first selection target out of the detection electrodes 25 to be coupled to the detector 40 and causes the detection electrodes 25 serving as the second selection target, which are not included in the first selection target, to be uncoupled from the detector 40. The coupling circuit performs the minus sign selection operation $Td^-$ at a timing different from that of the plus sign selection operation $Td^+$. In the minus sign selection operation $Td^-$, the coupling circuit causes the detection electrodes 25 serving as the first selection target in the plus sign selection operation $Td^+$ to be uncoupled from the detector 40 and causes the detection electrodes 25 serving as the second selection target in the plus sign selection operation $Td^+$ to be coupled to the detector 40. The detection device 100 thus can detect a fingerprint by code division multiplex drive. Consequently, the detection device 100 can provide the signal intensity higher than that obtained in time division multiplex drive without raising the voltage of the drive signals Vs. The plus sign selection operation $Td^+$ and the minus sign selection operation $Td^-$ are performed at different timings. Consequently, the detection device 100 can suppress capacitive coupling between the detection electrodes 25 and provide satisfactory detection sensitivity.

In the plus sign selection operation $Td^+$, the detection electrodes 25 serving as the first selection target output the first detection signal $Sv_p^+$ to the detector 40. In the minus sign selection operation $Td^-$, the detection electrodes 25 serving as the second selection target in the plus sign selection operation $Td^+$ output the second detection signal $Sv_p^-$ to the detector 40. The detector 40 calculates the difference between the first detection signal $Sv_p^+$ and the second detection signal $Sv_p^-$. The third detection signal $Sv_p$ is calculated as the difference between the first detection signal $Sv_p^+$ and the second detection signal $Sv_p^-$. When noise enters from the outside, the noise component in the first detection signal $Sv_p^+$ and that in the second detection signal $Sv_p^-$ are cancelled. Consequently, the detection device 100 can increase the noise resistance.

The coupling circuit selects the detection electrodes 25 serving as the first selection target and the detection electrodes 25 serving as the second selection target based on the plus and minus signs of a Hadamard matrix. This mechanism facilitates coding and decoding the detection signals $Si_q$ output from the detection electrodes 25.

The detector 40 calculates the third detection signal $Sv_p$ output from the detection electrodes 25 based on the first detection signal $Sv_p^+$ and the second detection signal $Sv_p^-$. The first detection signal $Sv_p^+$ is obtained by integrating the detection signals output from the detection electrodes 25 serving as the first selection target. The second detection signal $Sv_p^-$ is obtained by integrating the detection signals output from the detection electrodes 25 serving as the second selection target. The third detection signal $Sv_p$ is calculated as the difference between the first detection signal $Sv_p^+$ and the second detection signal $Sv_p^-$, for example. The detector 40 decodes the third detection signal $Sv_p$, thereby calculating the detection signals output from the respective detection electrodes 25. The detector 40 performs decoding based on the detection signal obtained by integrating the detection signals from the respective detection electrodes 25. Consequently, the detection device 100 can provide the signal intensity higher than that obtained in time division multiplex drive without raising the voltage of the signal values at respective nodes.

The coupling circuit performs the plus sign selection operation $Td^+$ and the minus sign selection operation $Td^-$ successively. This mechanism shortens the interval between the detection time for the first detection signal $Sv_p^+$ and the detection time for the second detection signal $Sv_p^-$, thereby reducing the difference between the noise component included in the first detection signal $Sv_p^+$ and that included in the second detection signal $Sv_p^-$. Consequently, the detection device 100 can increase the noise resistance.

The detection device 100 includes the capacitance detection conductor 26 disposed adjacent to the detection electrodes 25. With this configuration, the detection device 100 can detect proximity of the finger Fin or the like to the detection electrodes 25 by detecting changes in the capacitance value of the capacitance detection conductor 26. After detecting changes in the capacitance value of the capacitance detection conductor 26, the detection device 100 supplies the drive signals Vs to the transmission conductor 70 to start fingerprint detection using the detection electrodes 25. The following describes an example of the detection.

Figure 21:
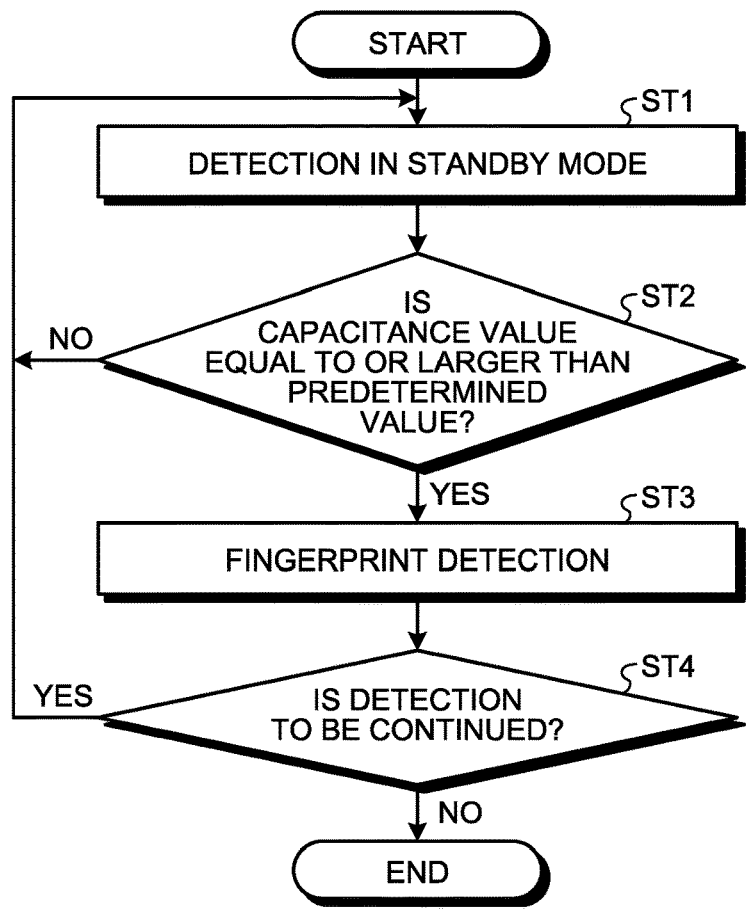
FIG. 21 is a flowchart of an example of a detection process performed by the detection device according to the first embodiment.

FIG. 21 is a flowchart of an example of a detection process performed by the detection device according to the first embodiment. The detection device 100 (refer to FIG. 1) detects the capacitance value of the capacitance detection conductor 26 (refer to FIG. 3) (Step ST1). Subsequently, the detection device 100 compares the capacitance value of the capacitance detection conductor 26 with a predetermined value (Step ST2). When the finger Fin (refer to FIG. 3) comes closer to the capacitance detection conductor 26, for example, capacitance is generated between the capacitance detection conductor 26 and the finger Fin, thereby increasing the capacitance value of the capacitance detection conductor 26. If the capacitance value of the capacitance detection conductor 26 is equal to or larger than the predetermined value (Yes at Step ST2), the detection device 100 starts fingerprint detection performed by the fingerprint sensor 1 (refer to FIG. 3) (Step ST3).

If the capacitance value of the capacitance detection conductor 26 is equal to or larger than the preset value, for example, the detection controller 11 supplies the drive signals Vs to the transmission conductor 70. As described with reference to FIGS. 13A to 17, the detection controller 11 transmits signals to the gate driver 15 and the multiplexer 14 to perform fingerprint detection by code division multiplex drive. By contrast, if the capacitance value of the capacitance detection conductor 26 is smaller than the predetermined value (No at Step ST2), the detection controller 11 supplies no drive signal Vs to the transmission conductor 70. If the capacitance value of the capacitance detection conductor 26 is smaller than the predetermined value, the step of the detection process is returned to Step ST1. After performing fingerprint detection at Step ST3, the detection device 100 stops fingerprint detection performed by the fingerprint sensor 1. Subsequently, the detection device 100 determines whether to continue the detection (Step ST4). If the detection device 100 determines to continue the detection (Yes at Step ST4), the step of the detection process is returned to Step ST1. By contrast, if the detection device 100 determines to finish the detection (No at Step ST4), the process illustrated in FIG. 21 is finished.

The detection device 100 includes the first circuit substrate 20 and the AFE 21. The first circuit substrate 20 is coupled to the insulating substrate 10. The AFE 21 is provided on the first circuit substrate 20. The detection electrodes 25 are coupled to the AFE 21 via the multiplexer 14. The capacitance detection conductor 26 is coupled to the AFE 21 not via the multiplexer 14. With this configuration, the multiplexer 14 need not be operated at Step ST1 (standby mode) illustrated in FIG. 21. Consequently, the detection device 100 can reduce power consumption in the standby mode.

The capacitance of the capacitance detection conductor 26 is smaller than that of the transmission conductor 70. This configuration can reduce loss of electric power in association with charge of the capacitance detection conductor compared with a case where the transmission conductor 70 is used as the capacitance detection conductor. Consequently, the detection device 100 can reduce power consumption in the standby mode.

The capacitance detection conductor 26 is disposed between the detection electrodes 25 and the transmission conductor 70. With this configuration, the capacitance detection conductor 26 has an area smaller than that of the transmission conductor 70. This configuration facilitates reduction in capacitance of the capacitance detection conductor 26.

While the first embodiment describes a case where the number of detection electrodes 25 included in the detection electrode block 25B(m) is four, the configuration is not limited thereto. The number of detection electrodes 25 may be two, three, or five or more. In this case, the order of the square matrix $H_v$ also varies depending on the number of detection electrodes 25. The number of detection electrodes 25 included in a single detection electrode block 25B(m) may be 16, for example. In this case, the order of the square matrix $H_v$ is 16. A square matrix A in Expression (5) can be used as the square matrix $H_v$ of order 16. The square matrix A in expression (5) is a Hadamard matrix of order 16 and is a square matrix the elements of which are either "1" or "−1" and certain two different rows of which are an orthogonal matrix.

$$A = \begin{pmatrix}
1 & 1 & 1 & 1 & 1 & 1 & 1 & 1 & 1 & 1 & 1 & 1 & 1 & 1 & 1 & 1 \\
1 & -1 & 1 & -1 & 1 & -1 & 1 & -1 & 1 & -1 & 1 & -1 & 1 & -1 & 1 & -1 \\
1 & 1 & -1 & -1 & 1 & 1 & -1 & -1 & 1 & 1 & -1 & -1 & 1 & 1 & -1 & -1 \\
1 & -1 & -1 & 1 & 1 & -1 & -1 & 1 & 1 & -1 & -1 & 1 & 1 & -1 & -1 & 1 \\
1 & 1 & 1 & 1 & -1 & -1 & -1 & -1 & 1 & 1 & 1 & 1 & -1 & -1 & -1 & -1 \\
1 & -1 & 1 & -1 & -1 & 1 & -1 & 1 & 1 & -1 & 1 & -1 & -1 & 1 & -1 & 1 \\
1 & 1 & -1 & -1 & -1 & -1 & 1 & 1 & 1 & 1 & -1 & -1 & -1 & -1 & 1 & 1 \\
1 & -1 & -1 & 1 & -1 & 1 & 1 & -1 & 1 & -1 & -1 & 1 & -1 & 1 & 1 & -1 \\
1 & 1 & 1 & 1 & 1 & 1 & 1 & 1 & -1 & -1 & -1 & -1 & -1 & -1 & -1 & -1 \\
1 & -1 & 1 & -1 & 1 & -1 & 1 & -1 & -1 & 1 & -1 & 1 & -1 & 1 & -1 & 1 \\
1 & 1 & -1 & -1 & 1 & 1 & -1 & -1 & -1 & -1 & 1 & 1 & -1 & -1 & 1 & 1 \\
1 & -1 & -1 & 1 & 1 & -1 & -1 & 1 & -1 & 1 & 1 & -1 & -1 & 1 & 1 & -1 \\
1 & 1 & 1 & 1 & -1 & -1 & -1 & -1 & -1 & -1 & -1 & -1 & 1 & 1 & 1 & 1 \\
1 & -1 & 1 & -1 & -1 & 1 & -1 & 1 & -1 & 1 & -1 & 1 & 1 & -1 & 1 & -1 \\
1 & 1 & -1 & -1 & -1 & -1 & 1 & 1 & -1 & -1 & 1 & 1 & 1 & 1 & -1 & -1 \\
1 & -1 & -1 & 1 & -1 & 1 & 1 & -1 & -1 & 1 & 1 & -1 & 1 & -1 & -1 & 1
\end{pmatrix} \quad (5)$$

The first embodiment describes a case where the detection device 100 detects the shape and the fingerprint of the finger Fin. The detection device 100, however, does not necessarily detect the finger Fin. The detection device 100 may detect not the finger Fin but a palm. Furthermore, the detection device 100 may detect both of the finger Fin and a palm. The detection device detects capacitance changes caused by unevenness on a palm, thereby detecting the shape and the palm print of the palm.

Second Embodiment

The first embodiment describes an exemplary operation performed when code division multiplex drive is employed to detect a fingerprint in the second direction $D_y$. A second embodiment of the present invention describes an exemplary operation performed when code division multiplex drive is employed to detect a fingerprint in the first direction $D_x$ and the second direction $D_y$. The configuration of a detection device of this embodiment is the same as that of the first embodiment except that the detection device of this embodiment has the following mechanism.

FIGS. 22A to 22D are diagrams for explaining an example of selection patterns of first electrodes selected as a selection target in a first detection operation and a second detection operation according to the second embodiment. FIGS. 23A to 23D are diagrams for explaining an example of selection patterns of the first electrodes selected as a selection target in a third detection operation and a fourth detection operation. FIGS. 24A to 24D are diagrams for explaining an example of selection patterns of the first electrodes selected as a selection target in a fifth detection operation and a sixth detection operation. FIGS. 25A to 25D are diagrams for explaining an example of selection patterns of the first electrodes selected as a selection target in a seventh detection operation and an eighth detection operation. FIGS. 26A to 26D are diagrams for explaining an example of selection patterns of the first electrodes selected as a selection target in a ninth detection operation and a tenth detection operation. FIGS. 27A to 27D are diagrams for explaining an example of selection patterns of the first electrodes selected as a selection target in an eleventh detection operation and a twelfth detection operation. FIGS. 28A to 28D are diagrams for explaining an example of selection patterns of the first electrodes selected as a selection target in a thirteenth detection operation and a fourteenth detection operation. FIGS. 29A to 29D are diagrams for explaining an example of selection patterns of the first electrodes selected as a selection target in a fifteenth detection operation and a sixteenth detection operation.

Figure 22A:
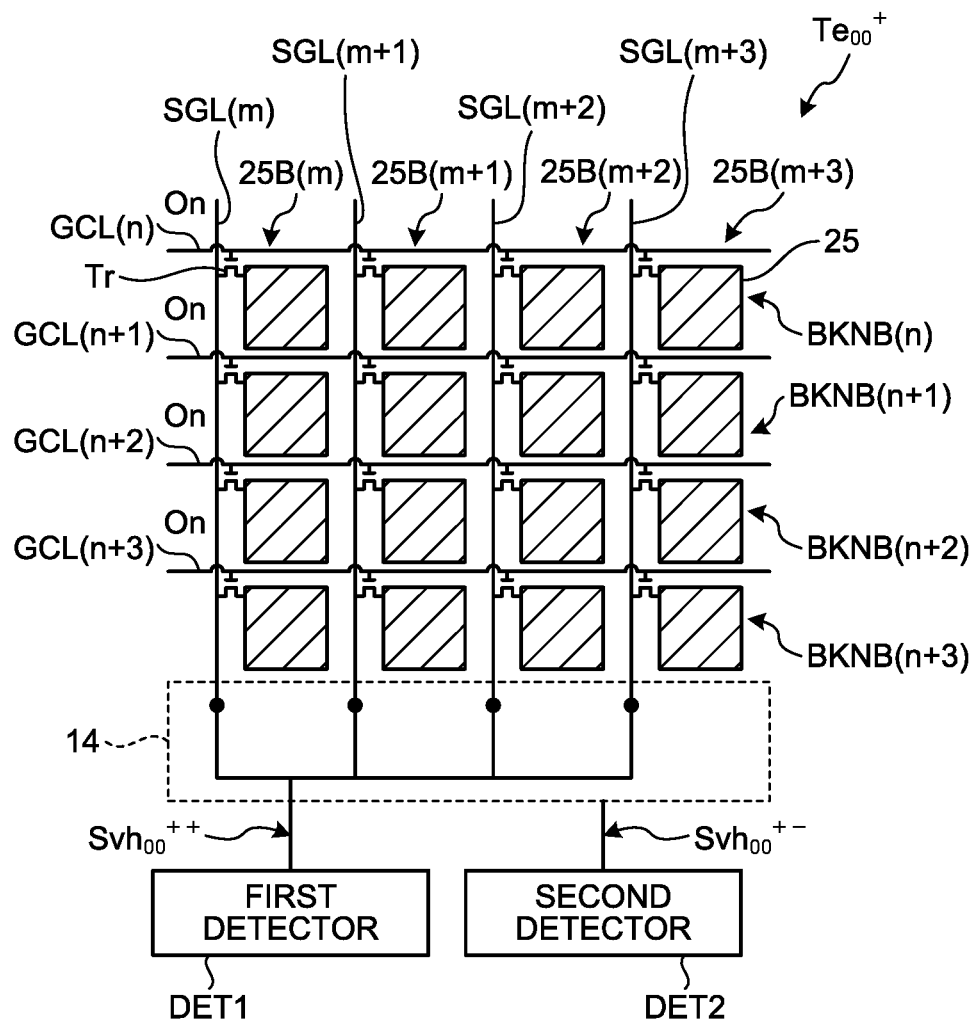
FIGS. 22A to 22D are diagrams for explaining an example of selection patterns of first electrodes selected as a selection target in a first detection operation and a second detection operation according to a second embodiment of the present invention.
Figure 22B:
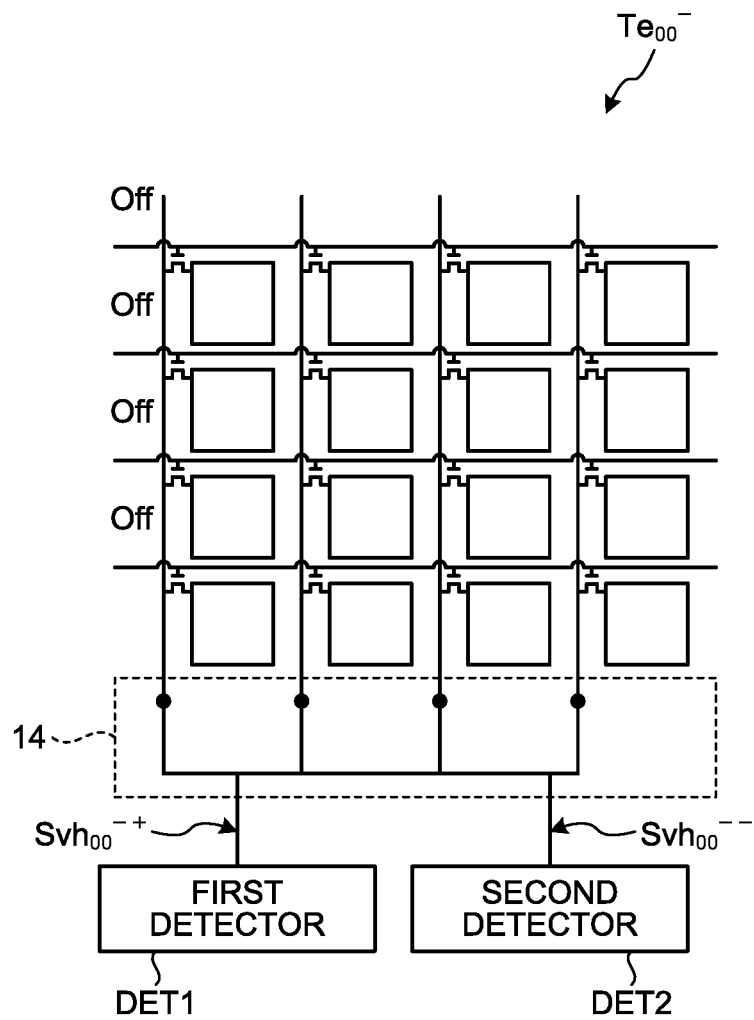
Figure 22B:
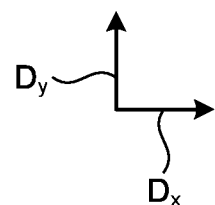
Figure 22C:
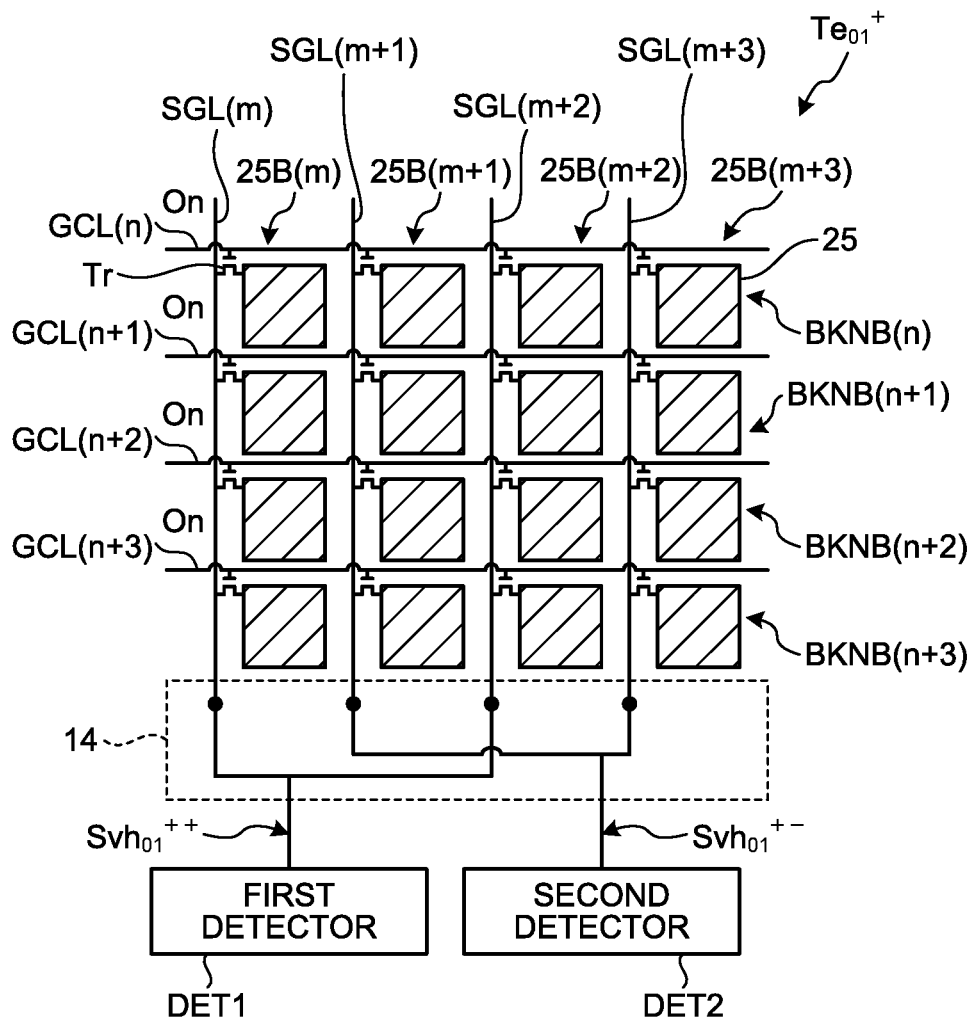
Figure 22C:
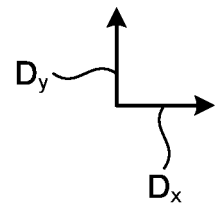
Figure 22D:
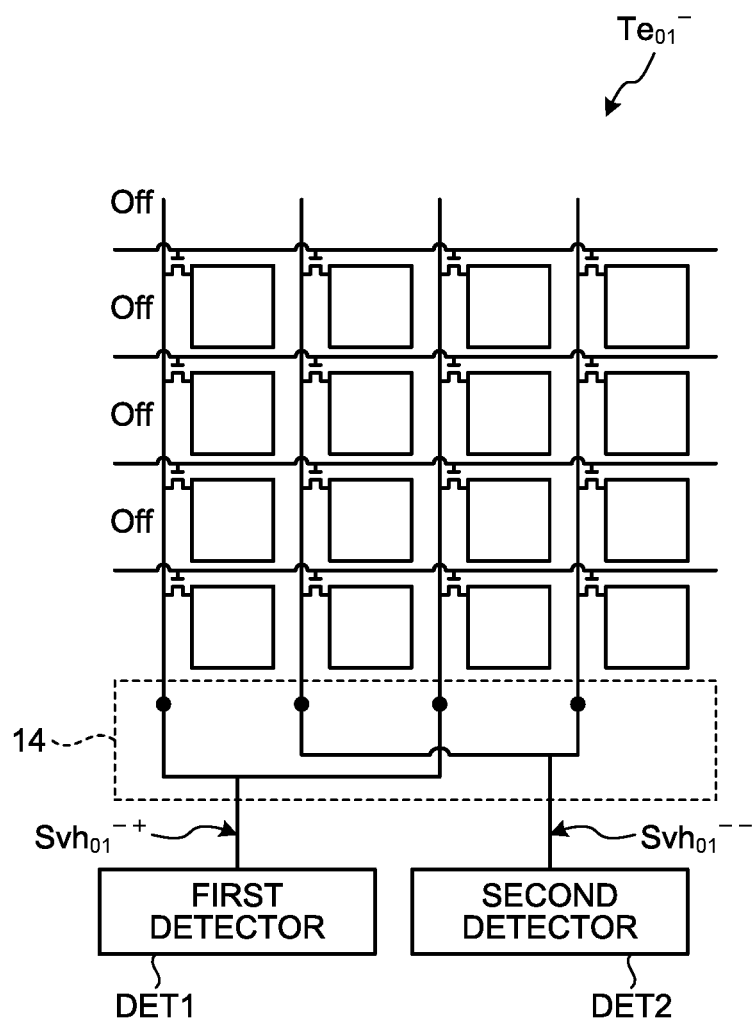

FIG. 22A illustrates a plus sign selection operation $Te_{00}{}^+$ of the first detection operation, and FIG. 22B illustrates a minus sign selection operation $Te_{00}{}^-$ of the first detection operation. FIG. 22C illustrates a plus sign selection operation $Te_{01}{}^+$ of the second detection operation, and FIG. 22D illustrates a minus sign selection operation $Te_{01}{}^-$ of the second detection operation. In FIG. 22A, code division multiplex drive in the second direction $D_y$ is performed as follows: the detection electrodes 25 belonging to second detection electrode blocks BKNB(n), BKNB(n+1), BKNB(n+2), and BKNB(n+3) are selected as the detection electrodes 25 serving as a first selection target in the square matrix $H_v$ in Expression (2) corresponding to the elements "1" in the first row of the square matrix $H_v$.

The second detection electrode block BKNB(n) includes the detection electrodes 25 coupled to the gate line GCL(n). The second detection electrode block BKNB(n+1) includes the detection electrodes 25 coupled to the gate line GCL(n+1). The second detection electrode block BKNB(n+2) includes the detection electrodes 25 coupled to the gate line GCL(n+2). The second detection electrode block BKNB(n+3) includes the detection electrodes 25 coupled to the gate line GCL(n+3).

In FIG. 22A, the plus sign selection operation and the minus sign selection operation are simultaneously performed in code division multiplex drive in the first direction $D_x$. The detection electrodes 25 belonging to the first detection electrode blocks 25B(m), 25B(m+1), 25B(m+2), and 25B(m+3) are selected as the detection electrodes 25 serving as the first selection target in a square matrix $H_h$ in Expression (6) corresponding to the elements "1" in the first row of the square matrix $H_h$. The selected detection electrodes 25 are coupled to a first detector DET1 via the multiplexer 14. No detection electrode 25 is selected as the second selection target corresponding to an element "−1" of the square matrix $H_h$ because an element "−1" is not present in the first row of the square matrix $H_h$.

$$H_v = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (6)$$

The square matrix $H_h$ in Expression (6) is a Hadamard matrix and is a square matrix the elements of which are either "1" or "−1" and certain two different rows of which are an orthogonal matrix. The order of the square matrix $H_h$ is equal to the number of detection electrodes 25 included in the second detection electrode block BKNB(n), that is, four in the example illustrated in FIGS. 22A to 29D.

The first detector DET1 and a second detector DET2 illustrated in FIGS. 22A to 29D correspond to the voltage detector DET (refer to FIG. 6) in the basic principle of capacitance detection described above. The first detector DET1 and the second detector DET2, for example, are included in the detection signal amplifier 42 of the detector 40 illustrated in FIG. 1.

The signal obtained by integrating the detection signals of the detection electrodes 25 is output as a first detection signal $Svh_{00}{}^{++}$. A second detection signal $Svh_{00}{}^{+-}$ satisfies $Svh_{00}{}^{+-}=0$. A detection signal $Svh_{00}{}^+$ is calculated as the difference between the first detection signal $Svh_{00}{}^{++}$ and the second detection signal $Svh_{00}{}^{+-}$: $Svh_{00}{}^+=Svh_{00}{}^{++}-Svh_{00}{}^{+-}$.

In FIG. 22B, code division multiplex drive in the second direction $D_y$ is performed as follows: the detection electrodes 25 belonging to the second detection electrode blocks BKNB(n), BKNB(n+1), BKNB(n+2), and BKNB(n+3) are not selected as the second selection target corresponding to an element "−1" of the square matrix $H_v$ because an element "−1" is not present in the first row of the square matrix $H_v$.

A first detection signal $Svh_{00}{}^{-+}$ and a second detection signal $Svh_{00}{}^{--}$ satisfy $Svh_{00}{}^{-+}=Svh_{00}{}^{--}=0$. A detection signal $Svh_{00}{}^-$ is calculated as the difference between the first detection signal $Svh_{00}{}^{-+}$ and the second detection signal $Svh_{00}{}^{--}$: $Svh_{00}{}^-=Svh_{00}{}^{-+}-Svh_{00}{}^{--}$. A third detection signal $Svh_{00}$ in the first detection operation is calculated as the difference between the detection signal $Svh_{00}{}^+$ and the detection signal $Svh_{00}{}^-$.

In FIGS. 22C and 22D, the selection patterns in code division multiplex drive in the second direction $D_y$ are the same as those illustrated in FIGS. 22A and 22B. In code division multiplex drive in the first direction $D_x$, the detection electrodes 25 belonging to the first detection electrode blocks 25B(m) and 25B(m+2) are selected as the first selection target in the square matrix $H_h$ corresponding to the elements "1" in the second row of the square matrix $H_h$. The detection electrodes 25 belonging to the first detection electrode blocks 25B(m+1) and 25B(m+3) are selected as the second selection target in the square matrix $H_h$ corresponding to the elements "−1" in the second row of the square matrix $H_h$. In the plus sign selection operation $Te_{01}{}^+$ of the second detection operation illustrated in FIG. 22C, a detection signal $Svh_{01}{}^+$ is calculated by: $Svh_{01}{}^+=Svh_{01}{}^{++}-Svh_{01}{}^{+-}$. In the minus sign selection operation $Te_{01}{}^-$ of the second detection operation illustrated in FIG. 22D, a detection signal $Svh_{01}{}^-$ is calculated by: $Svh_{01}{}^-=Svh_{01}{}^{-+}-Svh_{01}{}^{--}$. A third detection signal $Svh_{01}$ in the second detection operation is calculated as the difference between the detection signal $Svh_{01}{}^+$ and the detection signal $Svh_{01}{}^-$.

Figure 23A:
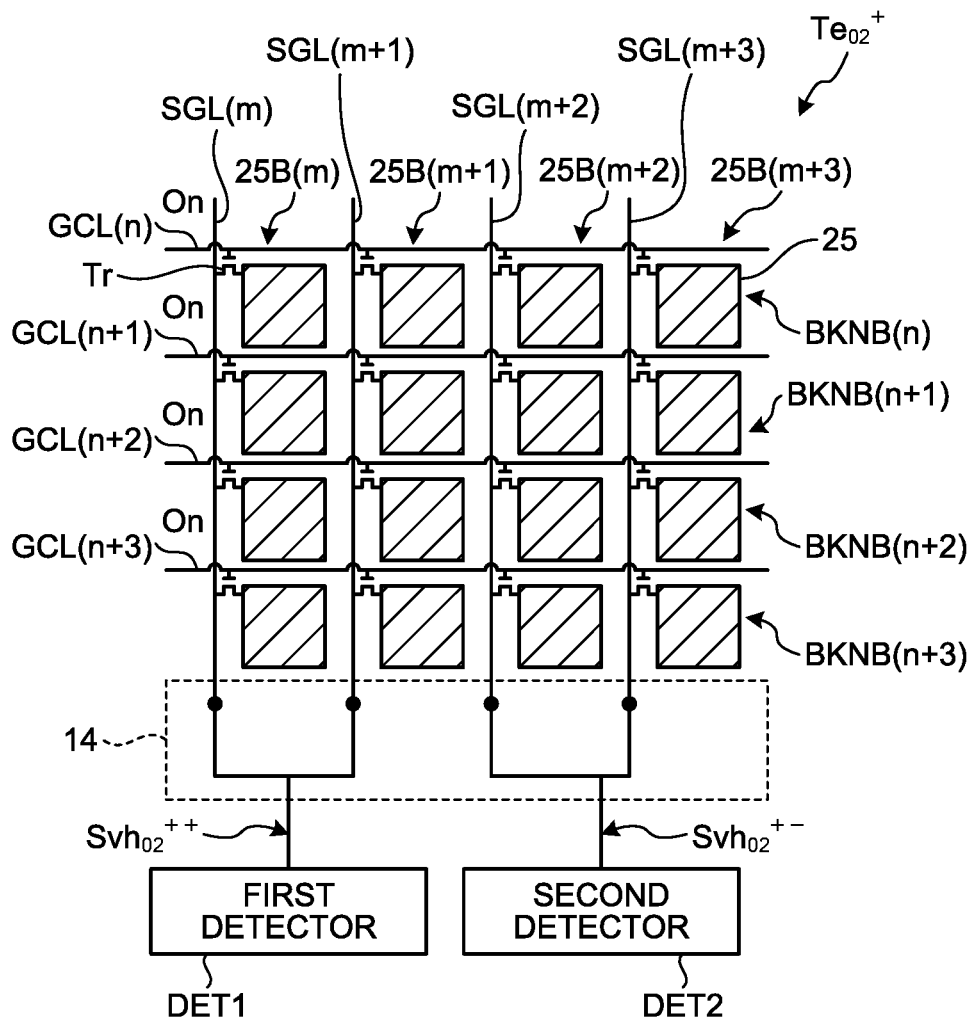
FIGS. 23A to 23D are diagrams for explaining an example of selection patterns of the first electrodes selected as a selection target in a third detection operation and a fourth detection operation.
Figure 23A:
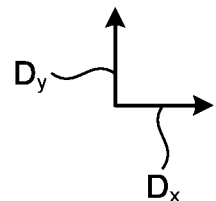
Figure 23B:
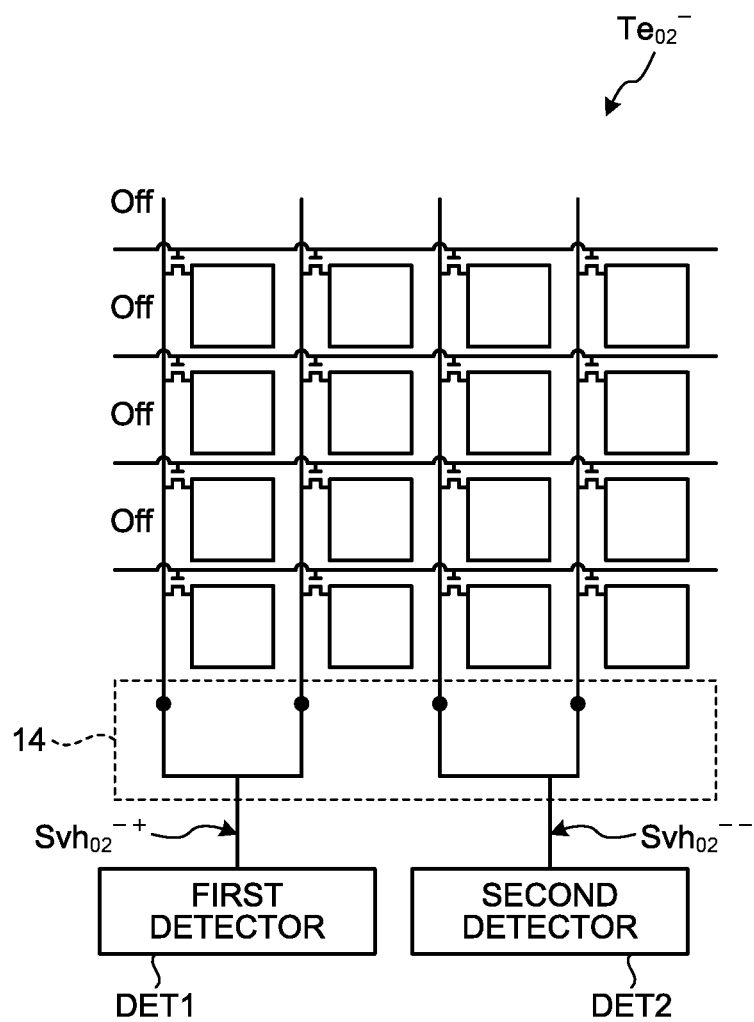
Figure 23B:
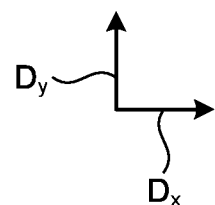
Figure 23C:
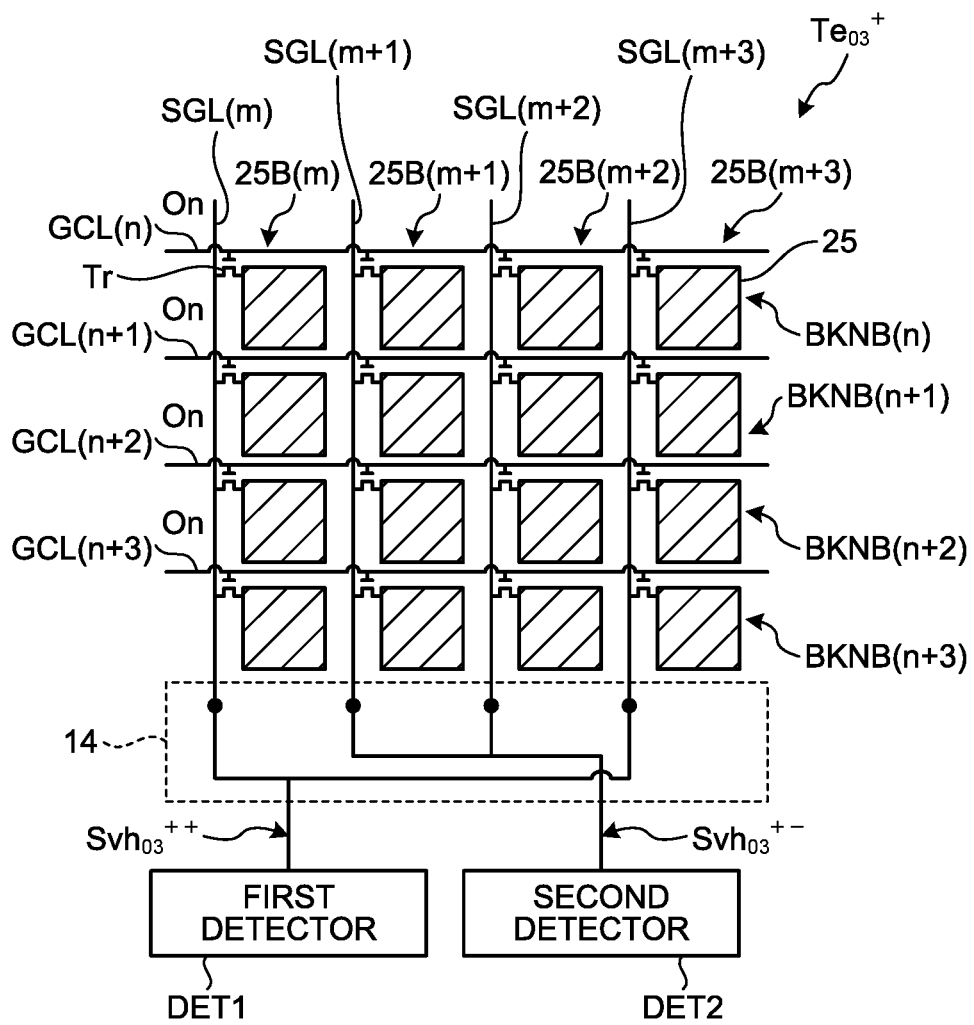
Figure 23C:
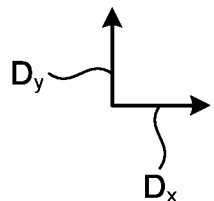
Figure 23D:
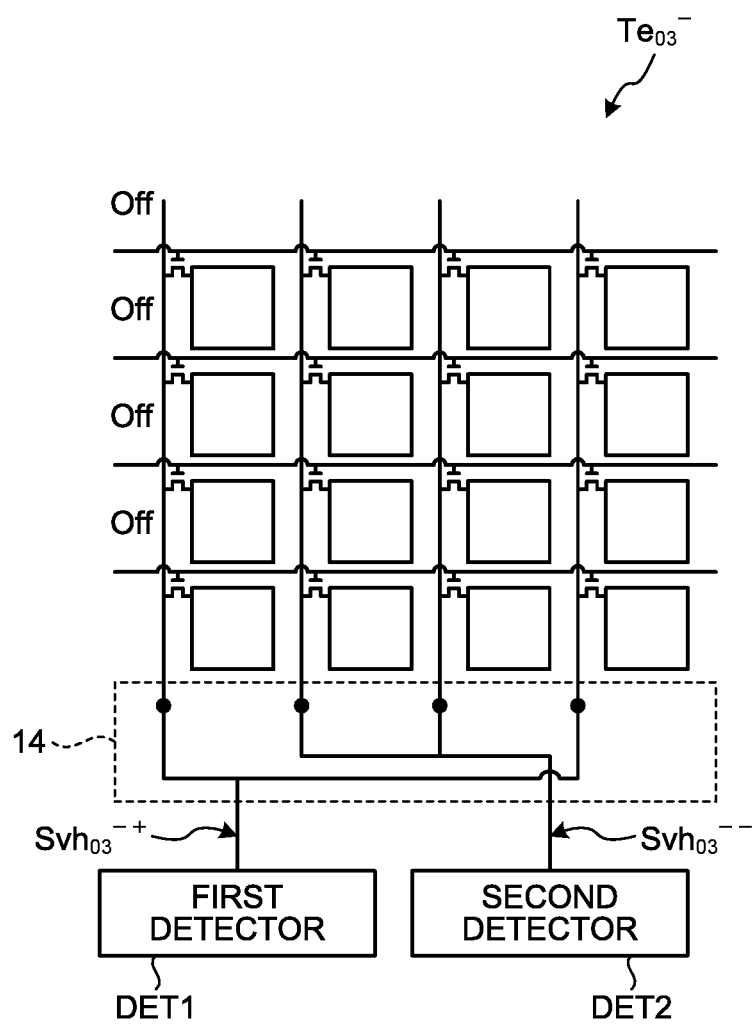
Figure 23D:
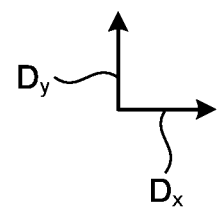

FIG. 23A illustrates a plus sign selection operation $Te_{02}{}^+$ of the third detection operation, and FIG. 23B illustrates a minus sign selection operation $Te_{02}{}^-$ of the third detection operation. FIG. 23C illustrates a plus sign selection operation $Te_{03}^+$ of the fourth detection operation, and FIG. 23D illustrates a minus sign selection operation $Te_{03}^-$ of the fourth detection operation. In FIGS. 23A to 23D, code division multiplex drive in the second direction $D_y$ is performed in the same manner as that illustrated in FIGS. 22A to 22D. In other words, the detection electrodes 25 serving as the first selection target in the square matrix $H_v$ and the detection electrodes 25 serving as the second selection target in the square matrix $H_v$ are selected corresponding to the elements "1" in the first row of the square matrix $H_v$.

In FIGS. 23A and 23B, code division multiplex drive in the first direction $D_x$ is performed as follows: the detection electrodes 25 belonging to the first detection electrode blocks 25B(m) and 25B(m+1) are selected as the first selection target in the square matrix $H_h$ corresponding to the elements "1" in the third row of the square matrix $H_h$. The detection electrodes 25 belonging to the first detection electrode blocks 25B(m+2) and 25B(m+3) are selected as the second selection target in the square matrix $H_h$ corresponding to the elements "−1" in the third row of the square matrix $H_h$. In the plus sign selection operation $Te_{02}^+$ of the third detection operation illustrated in FIG. 23A, a detection signal $Svh_{02}^+$ is calculated by: $Svh_{02}^+ = Svh_{02}^{++} - Svh_{02}^{+-}$. In the minus sign selection operation $Te_{02}^-$ of the third detection operation illustrated in FIG. 23B, a detection signal $Svh_{02}^-$ is calculated by: $Svh_{02}^- = Svh_{02}^{-+} - Svh_{02}^{--}$. A third detection signal $Svh_{02}$ in the third detection operation is calculated as the difference between the detection signal $Svh_{02}^+$ and the detection signal $Svh_{02}^-$.

In FIGS. 23C and 23D, code division multiplex drive in the first direction $D_x$ is performed as follows: the detection electrodes 25 belonging to the first detection electrode blocks 25B(m) and 25B(m+3) are selected as the first selection target in the square matrix $H_h$ corresponding to the elements "1" in the fourth row of the square matrix $H_h$. The detection electrodes 25 belonging to the first detection electrode blocks 25B(m+1) and 25B(m+2) are selected as the second selection target in the square matrix $H_h$ corresponding to the elements "−1" in the fourth row of the square matrix $H_h$. In the plus sign selection operation $Te_{03}^+$ of the fourth detection operation illustrated in FIG. 23C, a detection signal $Svh_{03}^+$ is calculated by: $Svh_{03}^{+=Svh}{}_{03}^{++} - Svh_{03}^{+-}$. In the minus sign selection operation $Te_{03}^-$ of the fourth detection operation illustrated in FIG. 23D, a detection signal $Svh_{03}^-$ is calculated by: $Svh_{03}^- = Svh_{03}^{-+} - Svh_{03}^{--}$. A third detection signal $Svh_{03}$ in the fourth detection operation is calculated as the difference between the detection signal $Svh_{03}^+$ and the detection signal $Svh_{03}^-$.

Figure 24A:
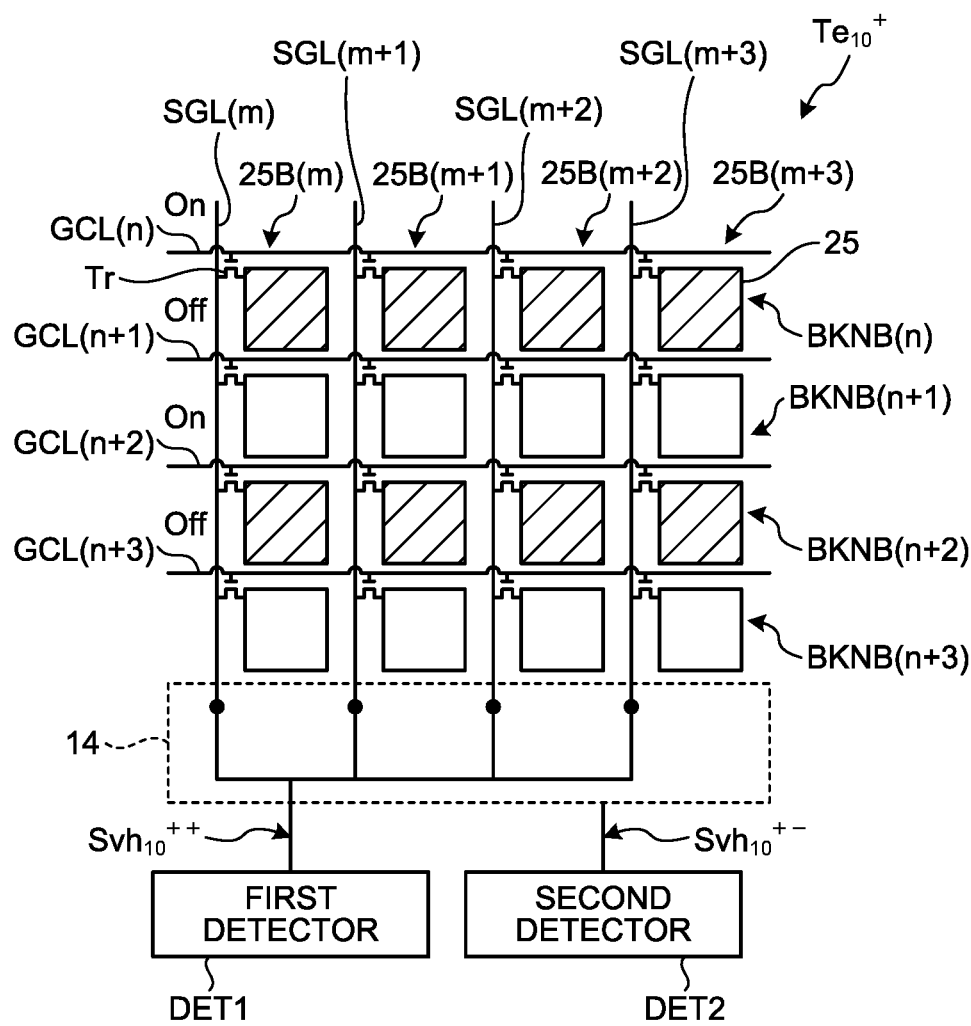
FIGS. 24A to 24D are diagrams for explaining an example of selection patterns of the first electrodes selected as a selection target in a fifth detection operation and a sixth detection operation.
Figure 24A:
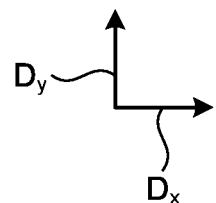
Figure 24B:
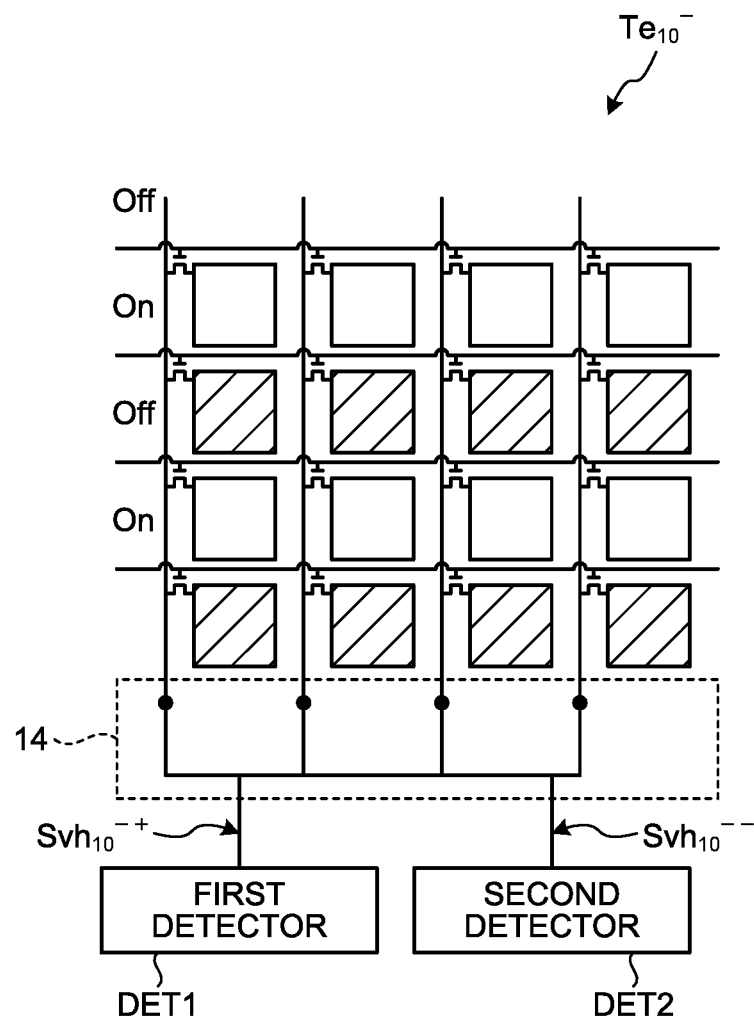
Figure 24B:
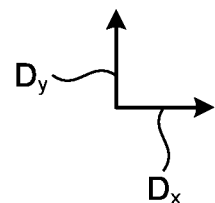
Figure 24C:
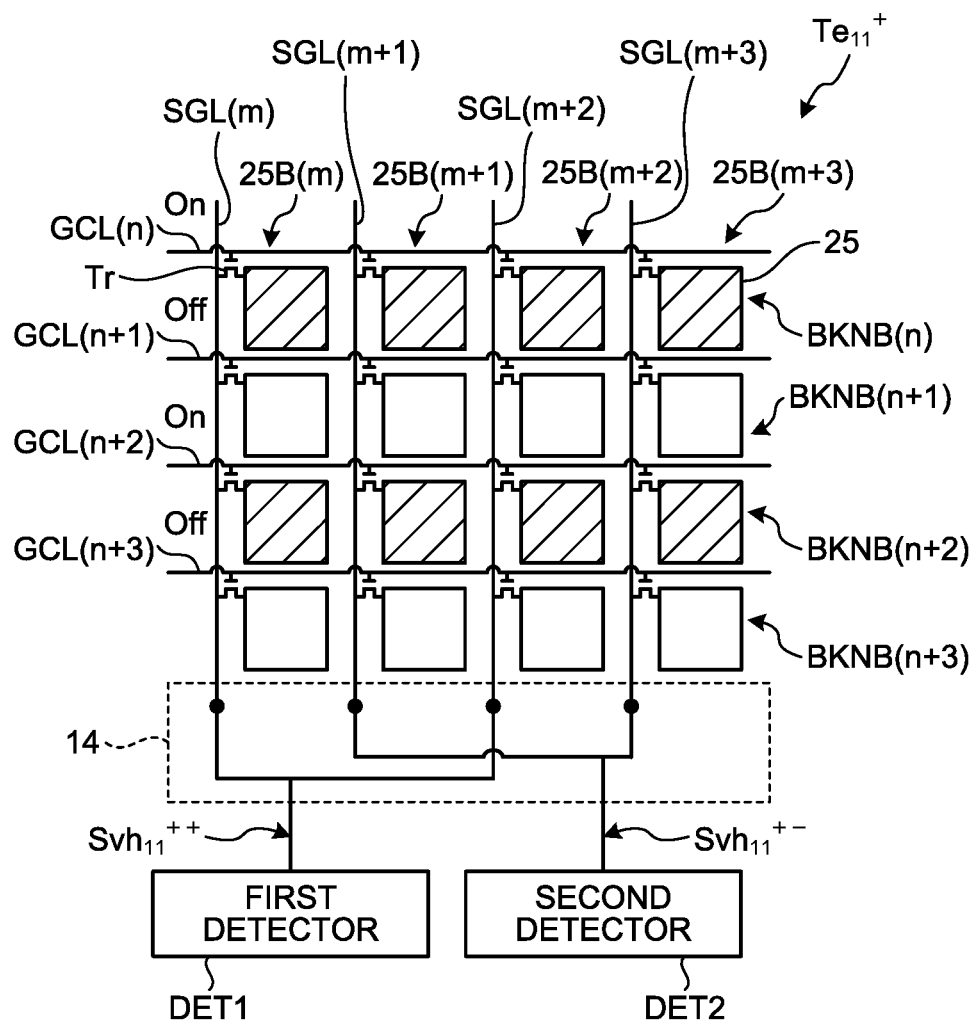
Figure 24C:
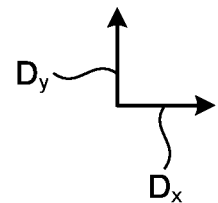
Figure 24D:
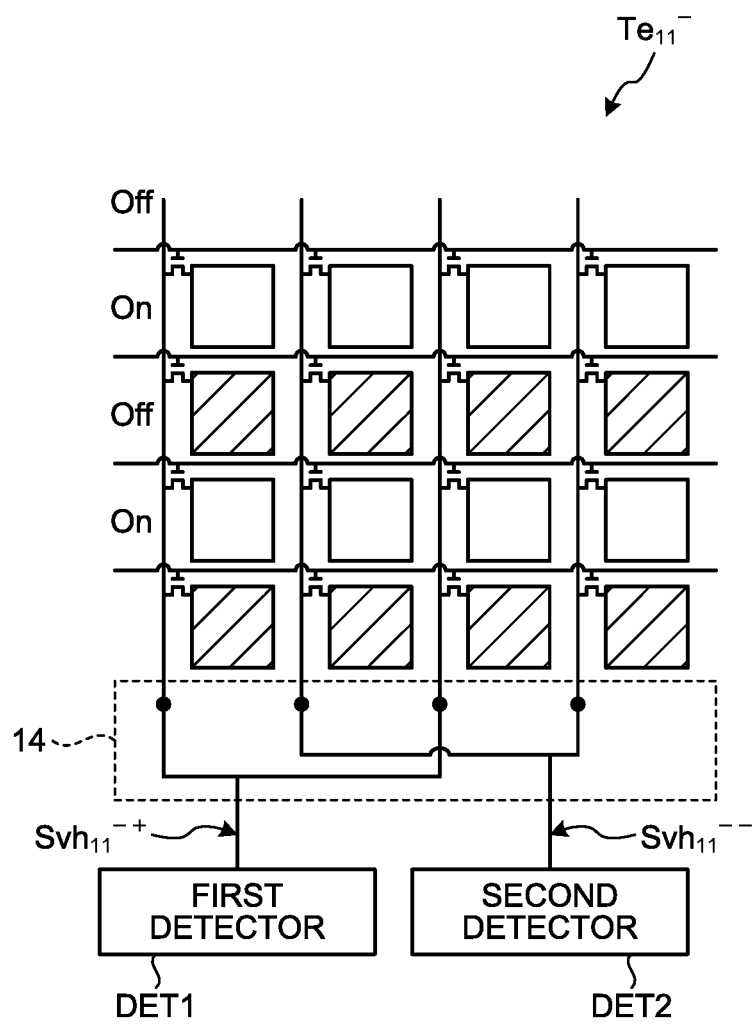
Figure 24D:
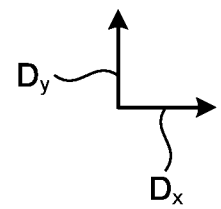
Figure 25A:
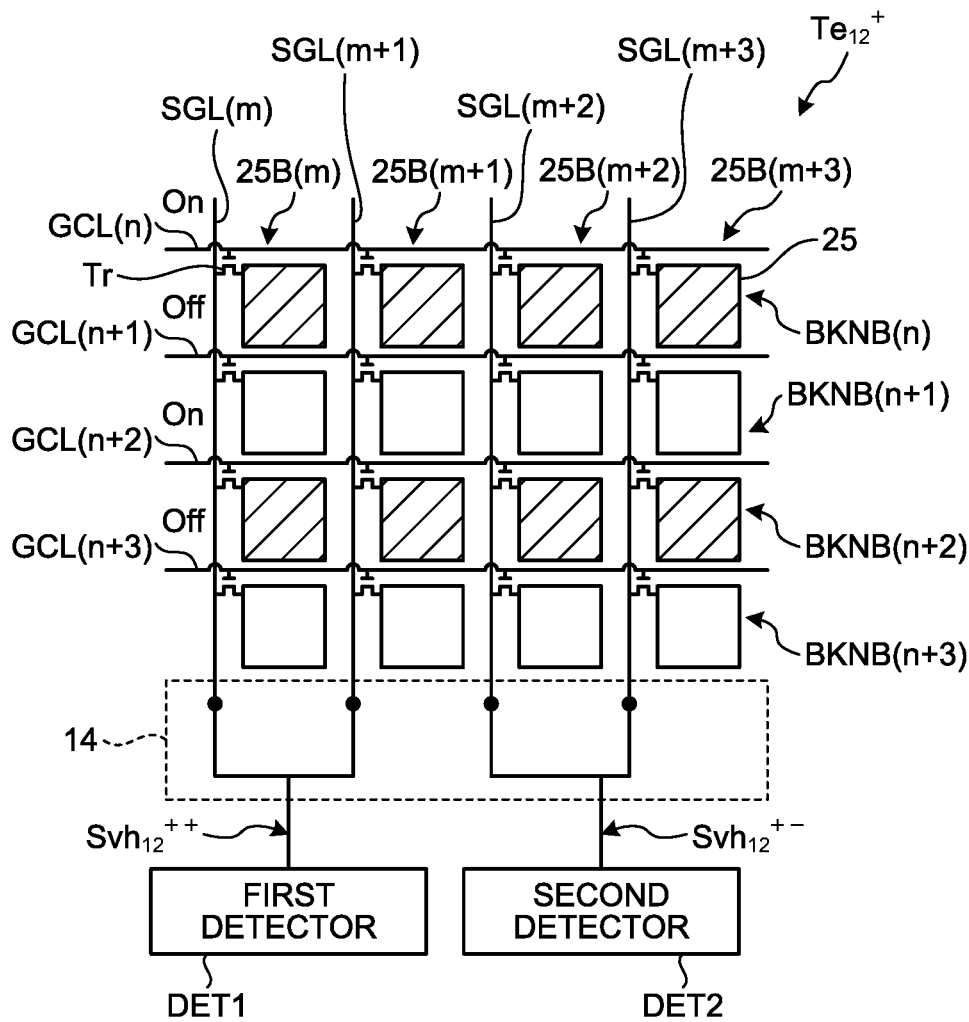
FIGS. 25A to 25D are diagrams for explaining an example of selection patterns of the first electrodes selected as a selection target in a seventh detection operation and an eighth detection operation.
Figure 25A:
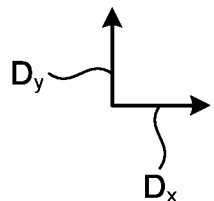
Figure 25B:
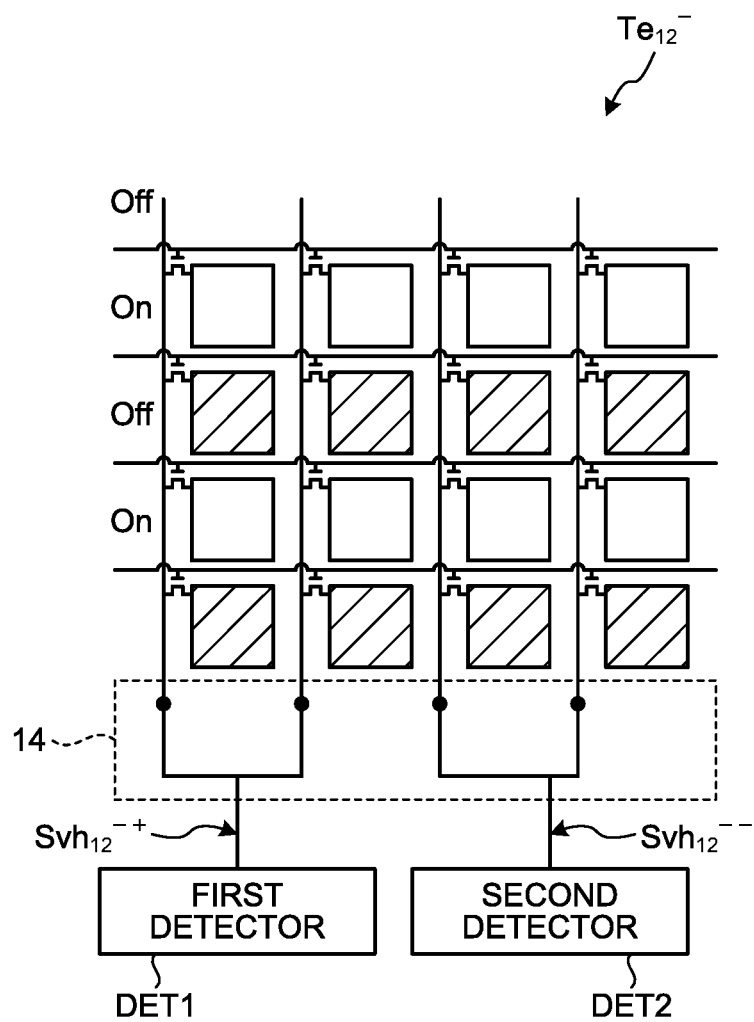
Figure 25B:
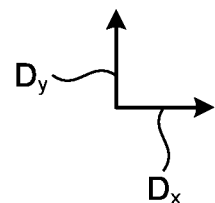
Figure 25C:
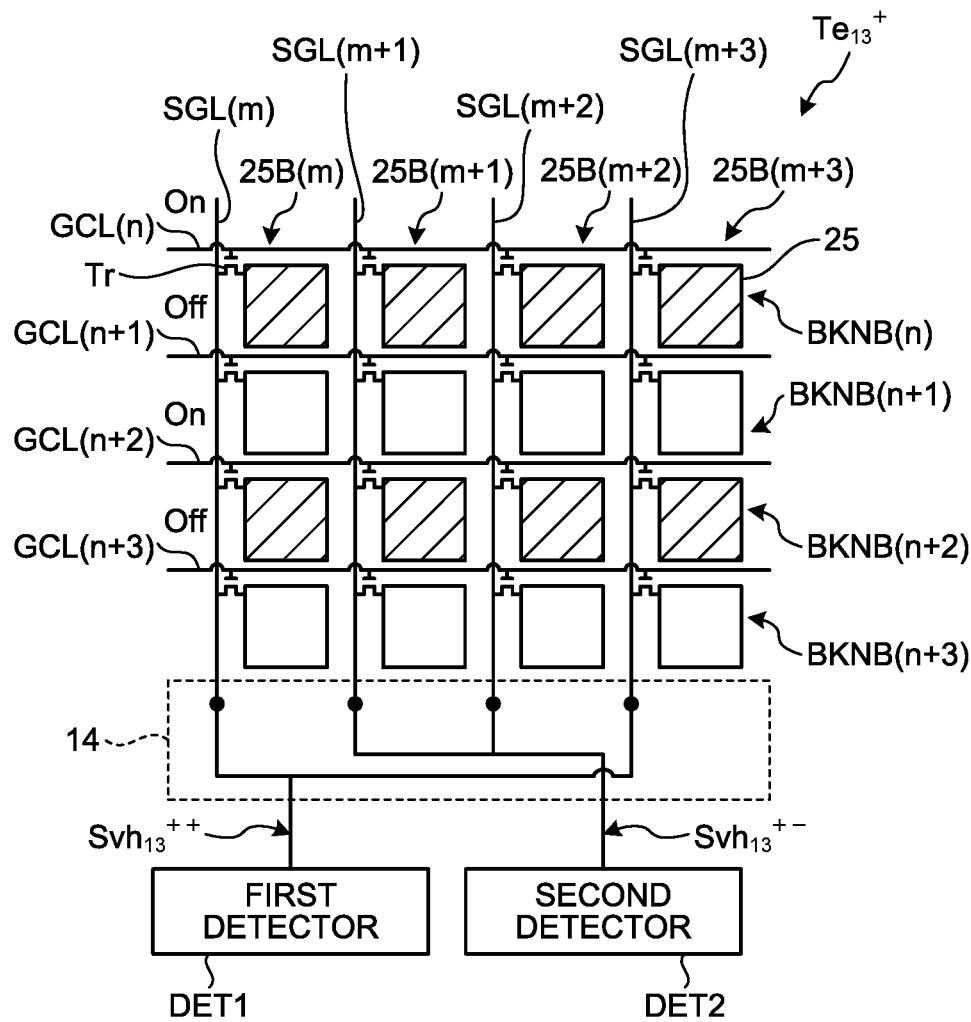
Figure 25C:
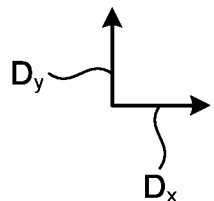
Figure 25D:
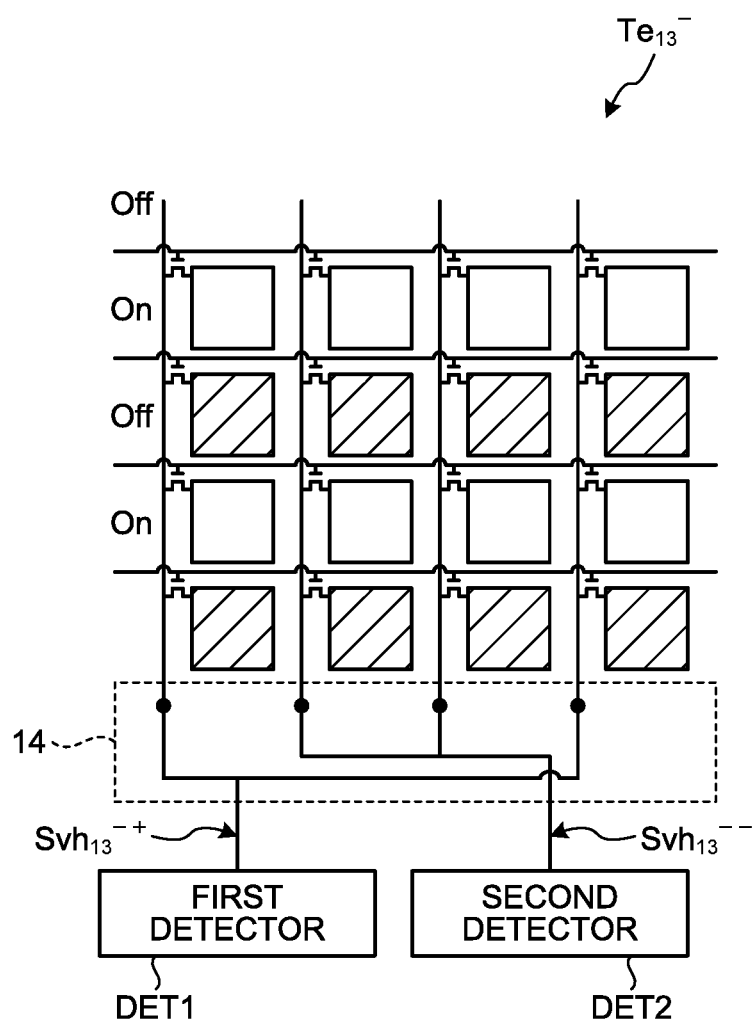
Figure 25D:
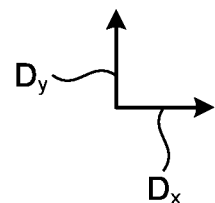

FIG. 24A illustrates a plus sign selection operation $Te_m^+$ of the fifth detection operation, and FIG. 24B illustrates a minus sign selection operation $Te_m^-$ of the fifth detection operation. FIG. 24C illustrates a plus sign selection operation $Te_{11}^+$ of the sixth detection operation, and FIG. 24D illustrates a minus sign selection operation $Te_n^-$ of the sixth detection operation. FIG. 25A illustrates a plus sign selection operation $Te_{12}^+$ of the seventh detection operation, and FIG. 25B illustrates a minus sign selection operation $Te_{12}^-$ of the seventh detection operation. FIG. 25C illustrates a plus sign selection operation $Te_n^+$ of the eighth detection operation, and FIG. 25D illustrates a minus sign selection operation $Te_n^-$ of the eighth detection operation.

As illustrated in FIGS. 24A to 24D and 25A to 25D, in code division multiplex drive in the first direction $D_x$ in the fifth to the eighth detection operations, the detection electrodes 25 serving as the first selection target in the square matrix $H_h$ and the second selection target in the square matrix $H_h$ are selected in the same manner as illustrated in FIGS. 22A to 22D and FIGS. 23A to 23D.

In the plus sign selection operation $Te_{10}^+$ of the fifth detection operation illustrated in FIG. 24A, the detection electrodes 25 belonging to the second detection electrode blocks BKNB(n) and BKNB(n+2) are selected as the detection electrodes 25 serving as the first selection target in the square matrix corresponding to the elements "1" in the second row of the square matrix $H_v$. The detection electrodes 25 belonging to the first detection electrode blocks 25B(m), 25B(m+1), 25B(m+2) and 25B(m+3) are selected as the detection electrodes 25 serving as the first selection target in the square matrix $H_h$ corresponding to the elements "1" in the first row of the square matrix $H_h$. In the plus sign selection operation $Te_{10}^+$ of the fifth detection operation illustrated in FIG. 24A, a detection signal $Svh_{10}^+$ is calculated by: $Svh_{10}^{+=Svh}{}_{10}^{++} - Svh_{10}^{+-}$.

In the minus sign selection operation $Te_m^-$ of the fifth detection operation illustrated in FIG. 24B, the detection electrodes 25 belonging to the second detection electrode blocks BKNB(n+1) and BKNB(n+3) are selected as the detection electrodes 25 serving as the second selection target in the square matrix $H_v$ corresponding to the elements "−1" in the second row of the square matrix $H_v$. In the minus sign selection operation $Te_{10}^-$ of the fifth detection operation illustrated in FIG. 24B, a detection signal $Svh_{10}^-$ is calculated by: $Svh_{10}^- = Svh_{10}^{-+} - Svh_{10}^{--}$. A third detection signal $Svh_{10}$ in the fifth detection operation is calculated as the difference between the detection signal $Svh_{10}^+$ and the detection signal $Svh_{10}^-$.

In the sixth detection operation illustrated in FIGS. 24C and 24D, the selection patterns in code division multiplex drive in the second direction $D_y$ are the same as those illustrated in FIGS. 24A and 24B. In code division multiplex drive in the first direction $D_x$, the detection electrodes 25 belonging to the first detection electrode blocks 25B(m) and 25B(m+2) are selected as the first selection target in the square matrix $H_h$ corresponding to the elements "1" in the second row of the square matrix $H_h$. The detection electrodes 25 belonging to the first detection electrode blocks 25B(m+1) and 25B(m+3) are selected as the second selection target in the square matrix $H_h$ corresponding to the elements "−1" in the second row of the square matrix $H_h$. In the plus sign selection operation $Te_{11}^+$ of the sixth detection operation illustrated in FIG. 24C, a detection signal $Svh_{11}^+$ is calculated by: $Svh_{11}^{+=Svh}{}_{11}^{++} - Svh_{11}^{+-}$. In the minus sign selection operation $Te_{11}^-$ of the sixth detection operation illustrated in FIG. 24D, a detection signal $Svh_{11}^-$ is calculated by: $Svh_{11}^- = Svh_{11}^{-+} - Svh_{11}^{--}$. A third detection signal $Svh_{11}$ in the sixth detection operation is calculated as the difference between the detection signal $Svh_{11}^+$ and the detection signal $Svh_{11}^-$.

In the seventh detection operation illustrated in FIGS. 25A and 25B, the selection patterns in code division multiplex drive in the second direction $D_y$ are the same as those illustrated in FIGS. 24A and 24B. In code division multiplex drive in the first direction $D_x$ in the seventh detection operation, the detection electrodes 25 belonging to the first detection electrode blocks 25B(m) and 25B(m+1) are selected as the first selection target in the square matrix $H_h$ corresponding to the elements "1" in the third row of the square matrix $H_h$. The detection electrodes 25 belonging to the first detection electrode blocks 25B(m+2) and 25B(m+3) are selected as the second selection target in the square matrix $H_h$ corresponding to the elements "−1" in the third row of the square matrix $H_h$.

In the plus sign selection operation $Te_{12}^+$ of the seventh detection operation illustrated in FIG. 25A, a detection signal $Svh_{12}^+$ is calculated by: $Svh_{12}^+=Svh_{12}^{++}-Svh_{12}^{+-}$. In the minus sign selection operation $Te_{12}^-$ of the seventh detection operation illustrated in FIG. 25B, a detection signal $Svh_{12}^-$ is calculated by: $Svh_{12}^-=Svh_{12}^{-+}-Svh_{12}^{--}$. A third detection signal $Svh_{12}$ in the seventh detection operation is calculated as the difference between the detection signal $Svh_{12}^+$ and the detection signal $Svh_{12}^-$.

In the eighth detection operation illustrated in FIGS. 25C and 25D, the selection patterns in code division multiplex drive in the second direction $D_y$ are the same as those illustrated in FIGS. 24A and 24B. In code division multiplex drive in the first direction $D_x$ in the eighth detection operation, the detection electrodes 25 belonging to the first detection electrode blocks 25B(m) and 25B(m+3) are selected as the first selection target in the square matrix $H_h$ corresponding to the elements "1" in the fourth row of the square matrix $H_h$. The detection electrodes 25 belonging to the first detection electrode blocks 25B(m+1) and 25B(m+2) are selected as the second selection target in the square matrix $H_h$ corresponding to the elements "−1" in the fourth row of the square matrix $H_h$.

In the plus sign selection operation $Te_{13}^+$ of the eighth detection operation illustrated in FIG. 25C, a detection signal $Svh_{12}^+$ is calculated by: $Svh_{13}^+=Svh_{13}^{++}-Svh_{13}^{+-}$. In the minus sign selection operation $Te_{13}^-$ of the eighth detection operation illustrated in FIG. 25D, a detection signal $Svh_{13}^-$ is calculated by: $Svh_{12}^-=Svh_{13}^{-+}-Svh_{13}^{--}$. A third detection signal $Svh_{13}$ in the eighth detection operation is calculated as the difference between the detection signal $Svh_{12}^+$ and the detection signal $Svh_{13}^-$.

Figure 26A:
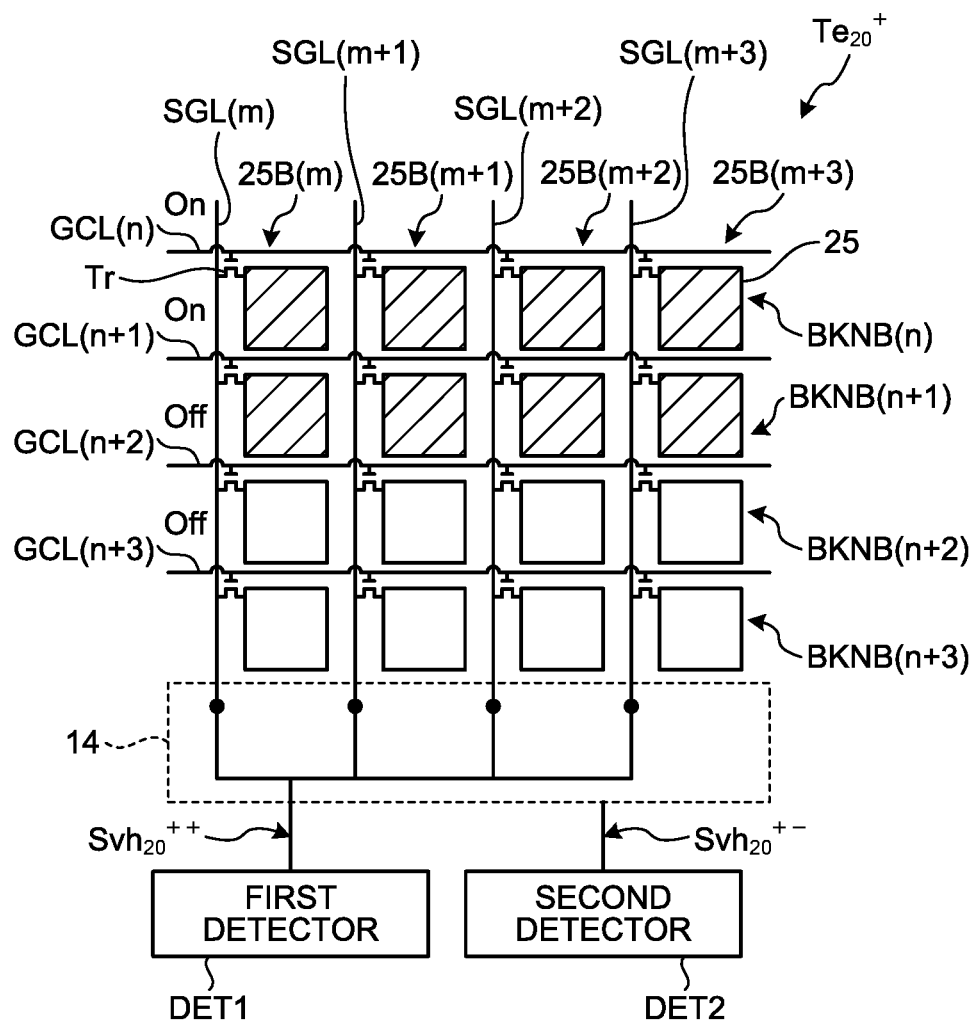
FIGS. 26A to 26D are diagrams for explaining an example of selection patterns of the first electrodes selected as a selection target in a ninth detection operation and a tenth detection operation.
Figure 26B:
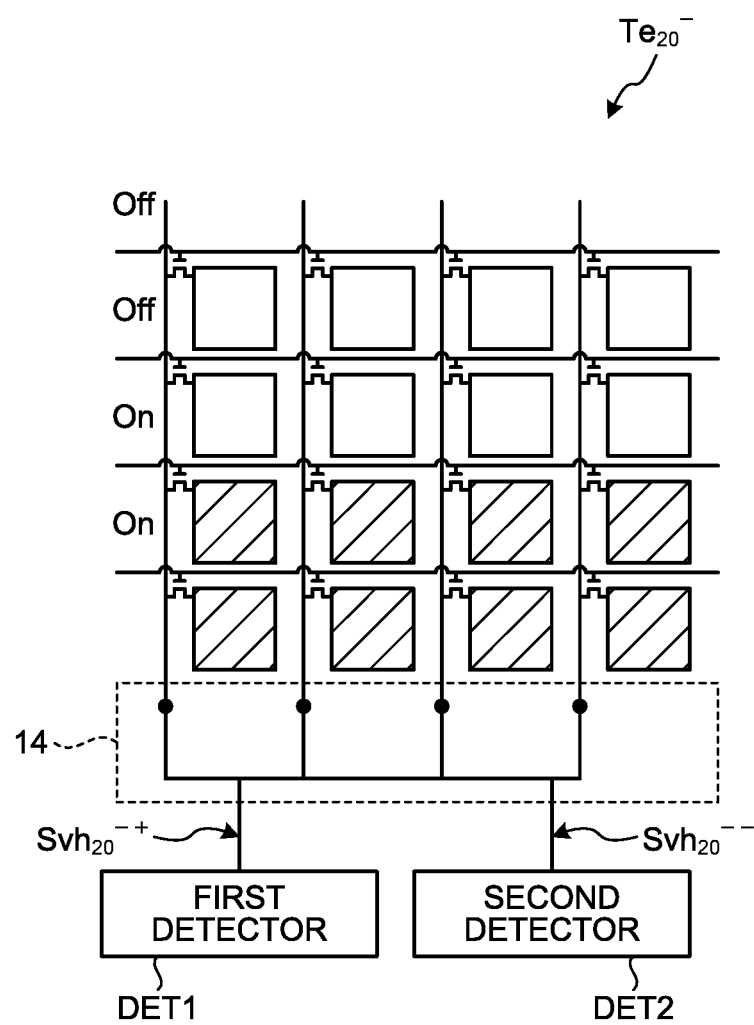
Figure 26B:
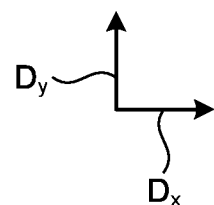
Figure 26C:
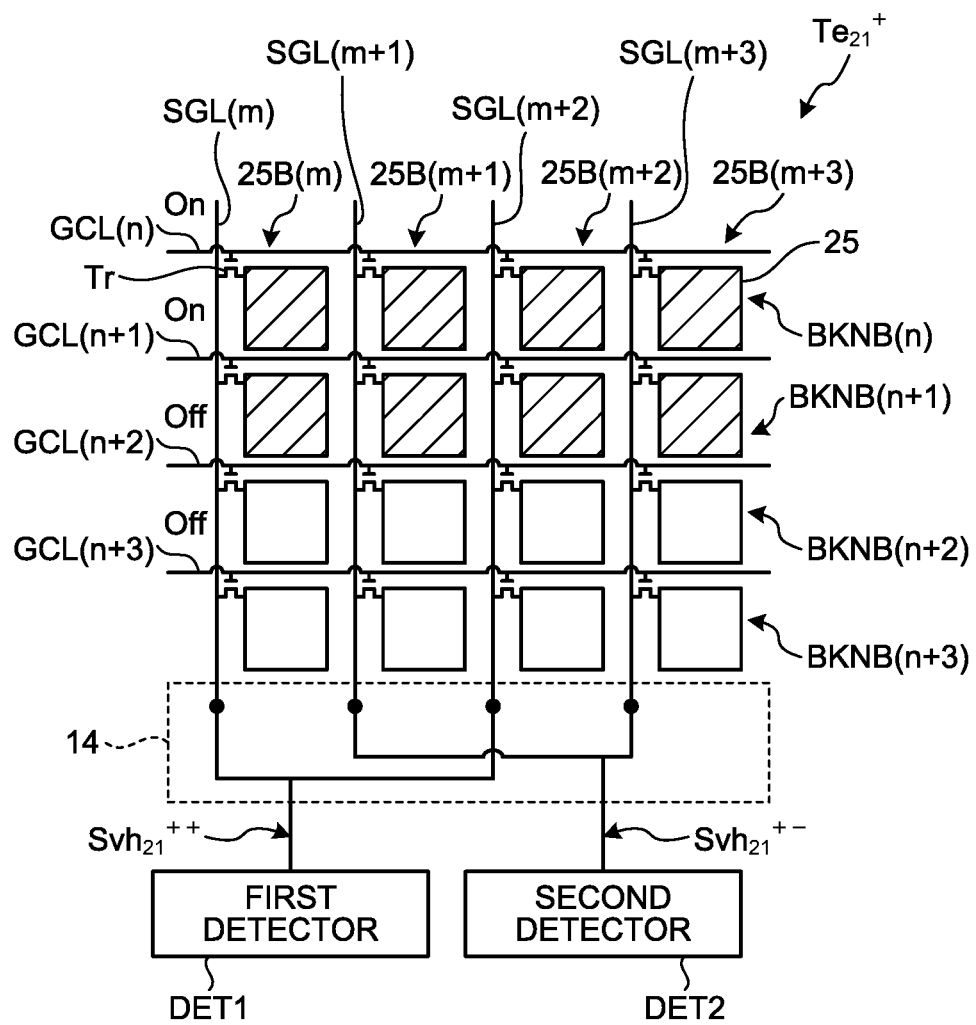
Figure 26C:
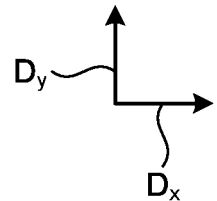
Figure 26D:
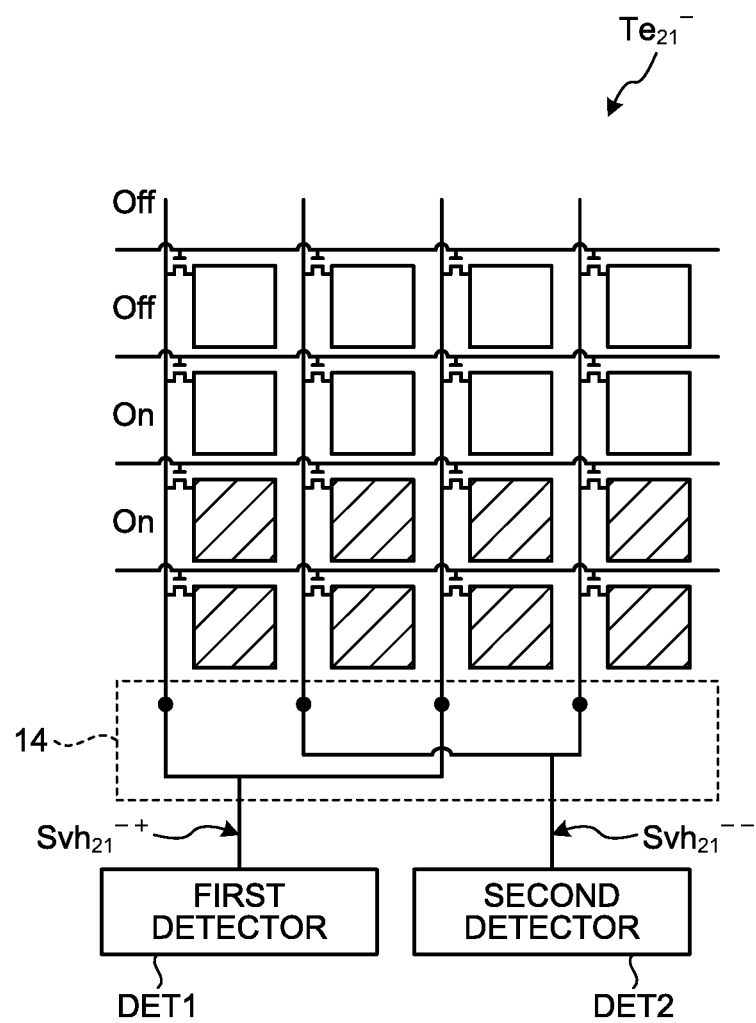
Figure 27A:
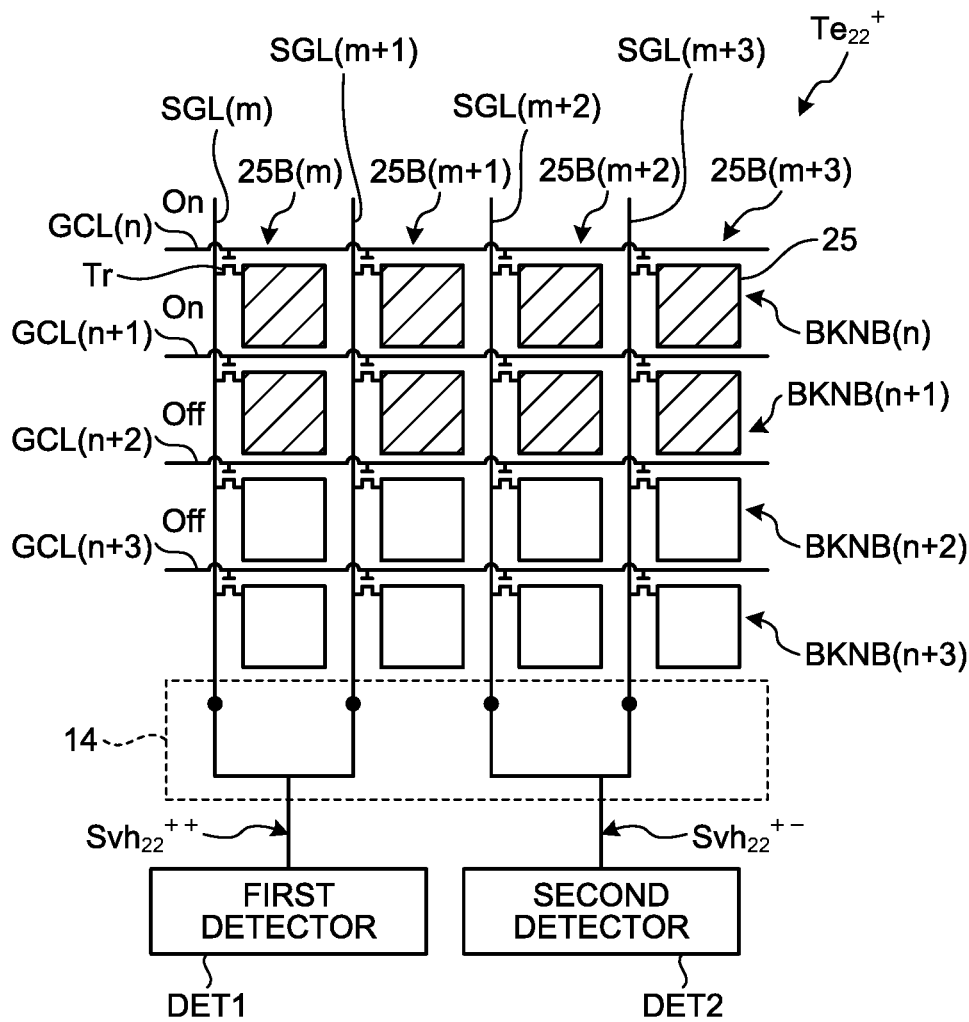
FIGS. 27A to 27D are diagrams for explaining an example of selection patterns of the first electrodes selected as a selection target in an eleventh detection operation and a twelfth detection operation.
Figure 27A:
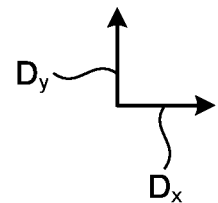
Figure 27B:
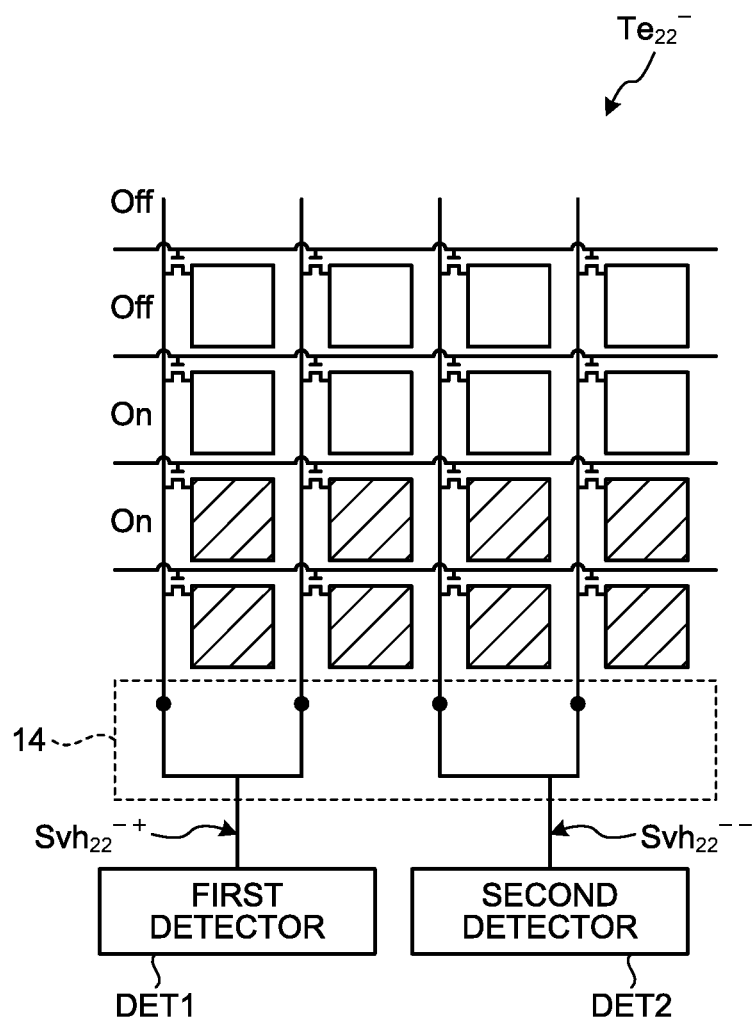
Figure 27B:
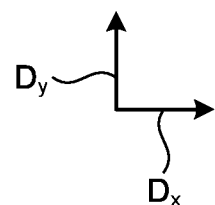
Figure 27C:
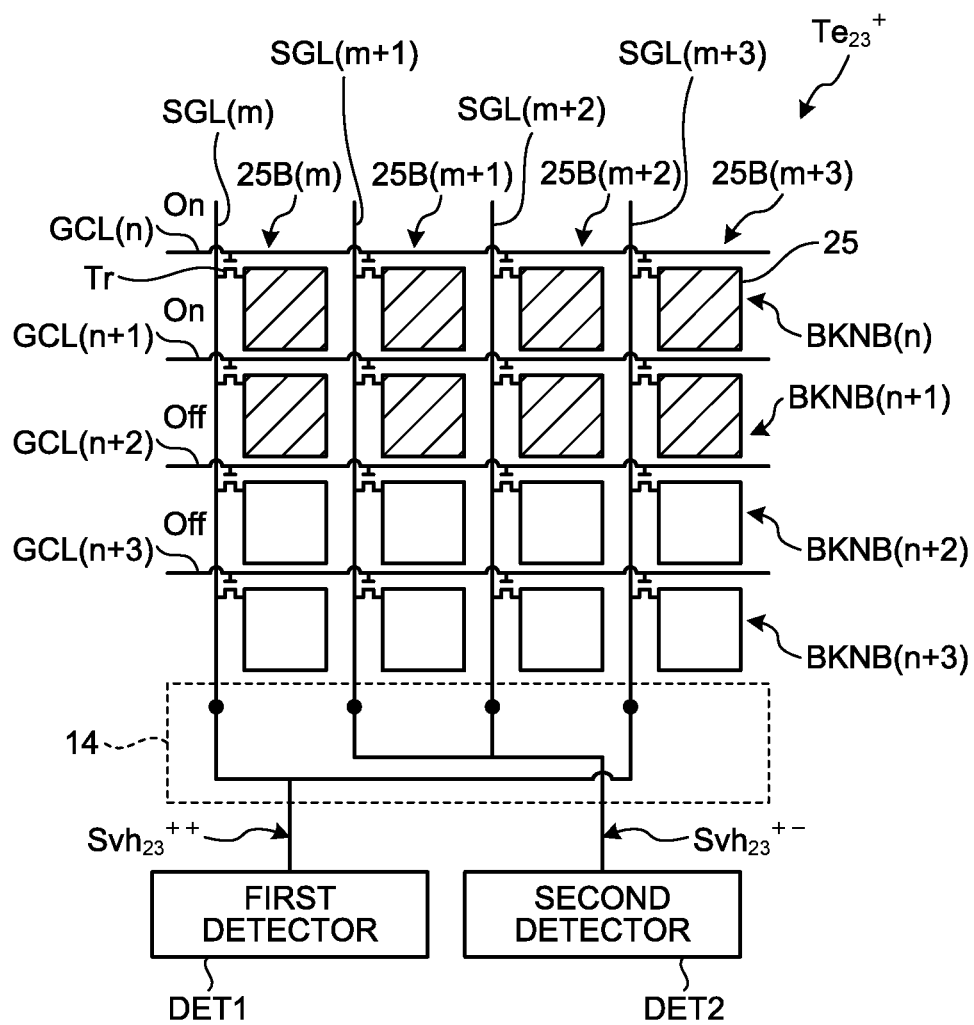
Figure 27C:
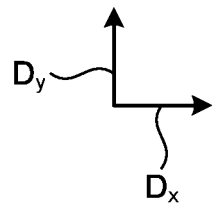
Figure 27D:
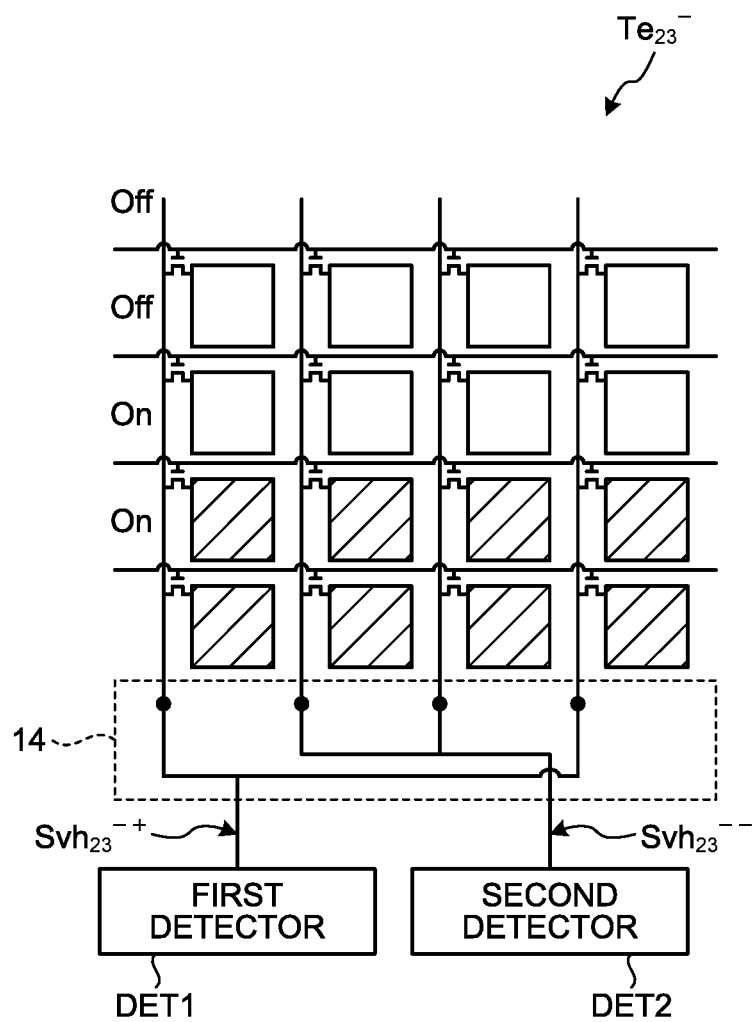
Figure 27D:
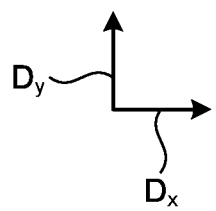

FIG. 26A illustrates a plus sign selection operation $Te_{20}^+$ of the ninth detection operation, and FIG. 26B illustrates a minus sign selection operation $Te_{20}^-$ of the ninth detection operation. FIG. 26C illustrates a plus sign selection operation $Te_{21}^+$ of the tenth detection operation, and FIG. 26D illustrates a minus sign selection operation $Te_{21}^-$ of the tenth detection operation. FIG. 27A illustrates a plus sign selection operation $Te_{22}^+$ of the eleventh detection operation, and FIG. 27B illustrates a minus sign selection operation $Te_{23}^-$ of the eleventh detection operation. FIG. 27C illustrates a plus sign selection operation $Te_{23}^+$ of the twelfth detection operation, and FIG. 27D illustrates a minus sign selection operation $Te_{23}^-$ of the twelfth detection operation.

As illustrated in FIGS. 26A to 26D and 27A to 27D, in code division multiplex drive in the first direction $D_x$ in the ninth to the twelfth detection operations, the detection electrodes 25 serving as the first selection target in the square matrix $H_h$ and the second selection target in the square matrix $H_h$ are selected in the same manner as illustrated in FIGS. 22A to 22D and FIGS. 23A to 23D.

In the plus sign selection operation $Te_{20}^+$ of the ninth detection operation illustrated in FIG. 26A, the detection electrodes 25 belonging to the second detection electrode blocks BKNB(n) and BKNB(n+1) are selected as the detection electrodes 25 serving as the first selection target in the square matrix $H_v$ corresponding to the elements "1" in the third row of the square matrix $H_v$. The detection electrodes 25 belonging to the first detection electrode blocks 25B(m), 25B(m+1), 25B(m+2) and 25B(m+3) are selected as the detection electrodes 25 serving as the first selection target in the square matrix $H_h$ corresponding to the elements "1" in the first row of the square matrix $H_h$. In the plus sign selection operation $Te_{20}^+$ of the ninth detection operation illustrated in FIG. 26A, a detection signal $Svh_{20}^+$ is calculated by: $Svh_{20}^{+=Svh}{}_{20}^{++}-Svh_{20}^{+-}$.

In the minus sign selection operation $Te_{20}^-$ of the ninth detection operation illustrated in FIG. 26B, the detection electrodes 25 belonging to the second detection electrode blocks BKNB(n+2) and BKNB(n+3) are selected as the detection electrodes 25 serving as the second selection target in the square matrix corresponding to the elements "−1" in the third row of the square matrix $H_v$. In the minus sign selection operation $Te_{20}^-$ of the ninth detection operation illustrated in FIG. 26B, a detection signal $Svh_{20}^-$ is calculated by: $Svh_{20}^-=Svh_{20}^{-+}-Svh_{20}^{--}$. A third detection signal $Svh_{20}$ in the ninth detection operation is calculated as the difference between the detection signal $Svh_{20}^+$ and the detection signal $Svh_{20}^-$.

In the tenth detection operation illustrated in FIGS. 26C and 26D, the selection patterns in code division multiplex drive in the second direction $D_y$ are the same as those illustrated in FIGS. 26A and 26B. In code division multiplex drive in the first direction $D_x$, the detection electrodes 25 belonging to the first detection electrode blocks 25B(m) and 25B(m+2) are selected as the first selection target in the square matrix $H_h$ corresponding to the elements "1" in the second row of the square matrix $H_h$. The detection electrodes 25 belonging to the first detection electrode blocks 25B(m+1) and 25B(m+3) are selected as the second selection target in the square matrix $H_h$ corresponding to the elements "−1" in the second row of the square matrix $H_h$. In the plus sign selection operation $Te_{21}^+$ of the tenth detection operation illustrated in FIG. 26C, a detection signal $Svh_{21}^+$ is calculated by: $Svh_{21}^+=Svh_{21}^{++}-Svh_{21}^{+-}$. In the minus sign selection operation $Te_{21}^-$ of the tenth detection operation illustrated in FIG. 26D, a detection signal $Svh_{21}^-$ is calculated by: $Svh_{21}^-=Svh_{21}^{-+}-Svh_{21}^{--}$. A third detection signal $Svh_{21}$ in the tenth detection operation is calculated as the difference between the detection signal $Svh_{21}^+$ and the detection signal $Svh_{21}^-$.

In the eleventh detection operation illustrated in FIGS. 27A and 27B, the selection patterns in code division multiplex drive in the second direction $D_y$ are the same as those illustrated in FIGS. 26A and 26B. In code division multiplex drive in the first direction $D_x$ in the eleventh detection operation, the detection electrodes 25 belonging to the first detection electrode blocks 25B(m) and 25B(m+1) are selected as the first selection target in the square matrix $H_h$ corresponding to the elements "1" in the third row of the square matrix $H_h$. The detection electrodes 25 belonging to the first detection electrode blocks 25B(m+2) and 25B(m+3) are selected as the second selection target in the square matrix $H_h$ corresponding to the elements "−1" in the third row of the square matrix $H_h$.

In the plus sign selection operation $Te_{22}^+$ of the eleventh detection operation illustrated in FIG. 27A, a detection signal $Svh_{22}^+$ is calculated by: $Svh_{22}^+=Svh_{22}^{++}-Svh_{22}^{+-}$. In the minus sign selection operation $Te_{22}^-$ of the eleventh detection operation illustrated in FIG. 27B, a detection signal $Svh_{22}^-$ is calculated by: $Svh_{22}^-=Svh_{22}^{-+}-Svh_{22}^{--}$. A third detection signal $Svh_{22}$ in the eleventh detection operation is calculated as the difference between the detection signal $Svh_{22}^+$ and the detection signal $Svh_{22}^-$.

In the twelfth detection operation illustrated in FIGS. 27C and 27D, the selection patterns in code division multiplex drive in the second direction $D_y$ are the same as those illustrated in FIGS. 26A and 26B. In code division multiplex drive in the first direction $D_x$ in the twelfth detection operation, the detection electrodes 25 belonging to the first detection electrode blocks 25B(m) and 25B(m+3) are selected as the first selection target in the square matrix $H_h$ corresponding to the elements "1" in the fourth row of the square matrix $H_h$. The detection electrodes 25 belonging to the first detection electrode blocks 25B(m+1) and 25B(m+2) are selected as the second selection target in the square matrix $H_h$ corresponding to the elements "−1" in the fourth row of the square matrix $H_h$.

In the plus sign selection operation $Te_{23}{}^+$ of the twelfth detection operation illustrated in FIG. 27C, a detection signal $Svh_{23}{}^+$ is calculated by: $Svh_{23}{}^+ = Svh_{23}{}^{++} - Svh_{23}{}^{+-}$. In the minus sign selection operation $Te_{23}{}^-$ of the twelfth detection operation illustrated in FIG. 27D, a detection signal $Svh_{23}{}^-$ is calculated by: $Svh_{23}{}^- = Svh_{23}{}^{-+} - Svh_{23}{}^{--}$. A third detection signal $Svh_{23}$ in the twelfth detection operation is calculated as the difference between the detection signal $Svh_{23}{}^+$ and the detection signal $Svh_{23}{}^-$.

Figure 28A:
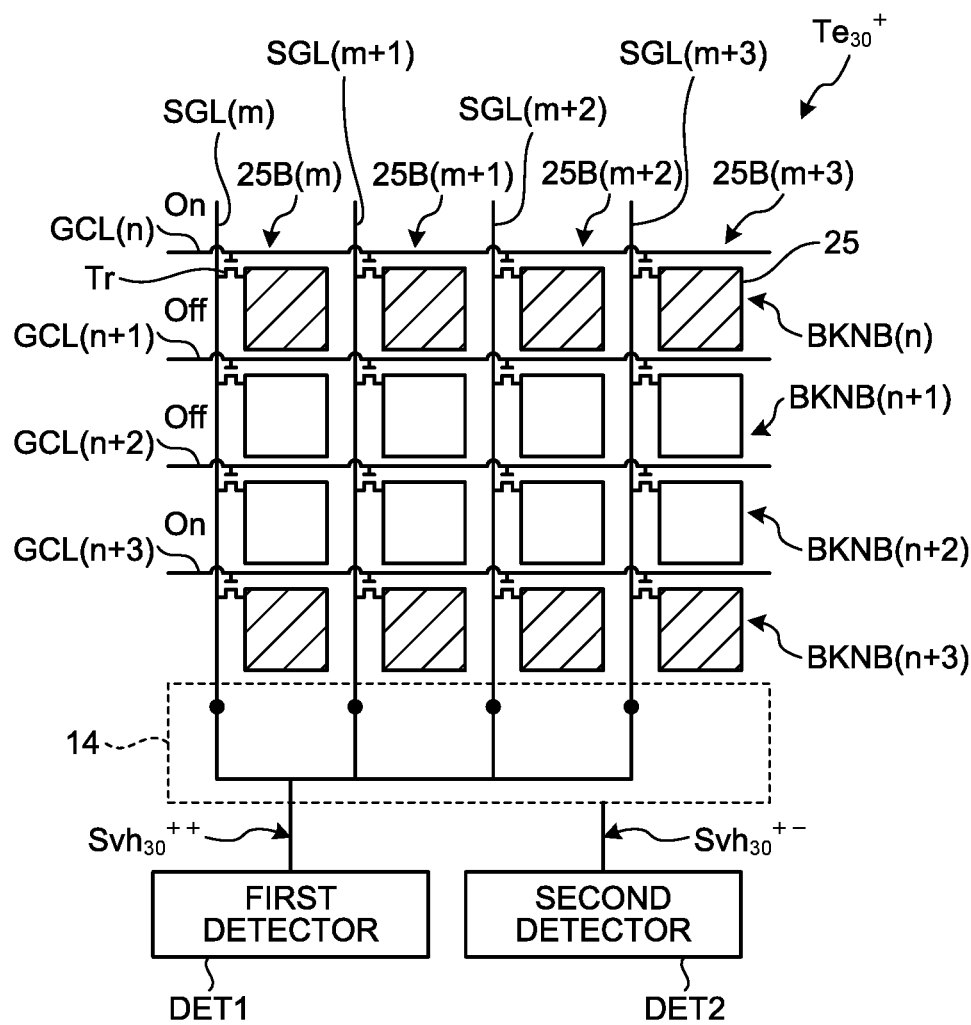
FIGS. 28A to 28D are diagrams for explaining an example of selection patterns of the first electrodes selected as a selection target in a thirteenth detection operation and a fourteenth detection operation.
Figure 28A:
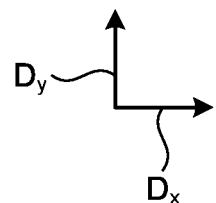
Figure 28B:
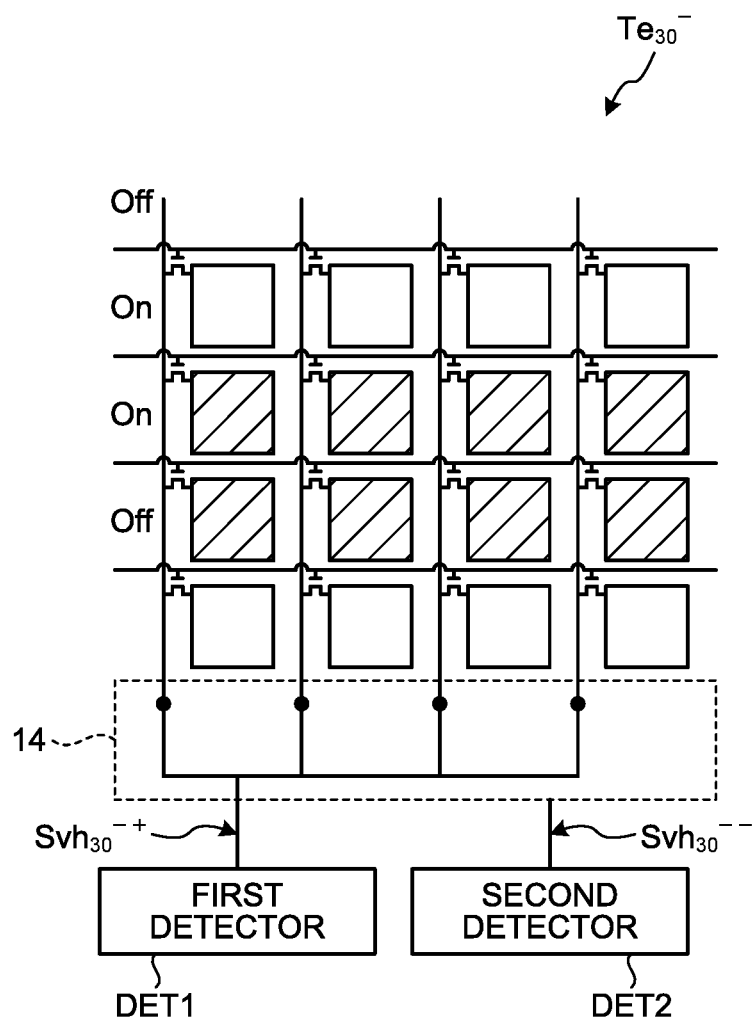
Figure 28B:
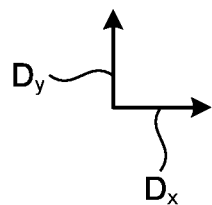
Figure 28C:
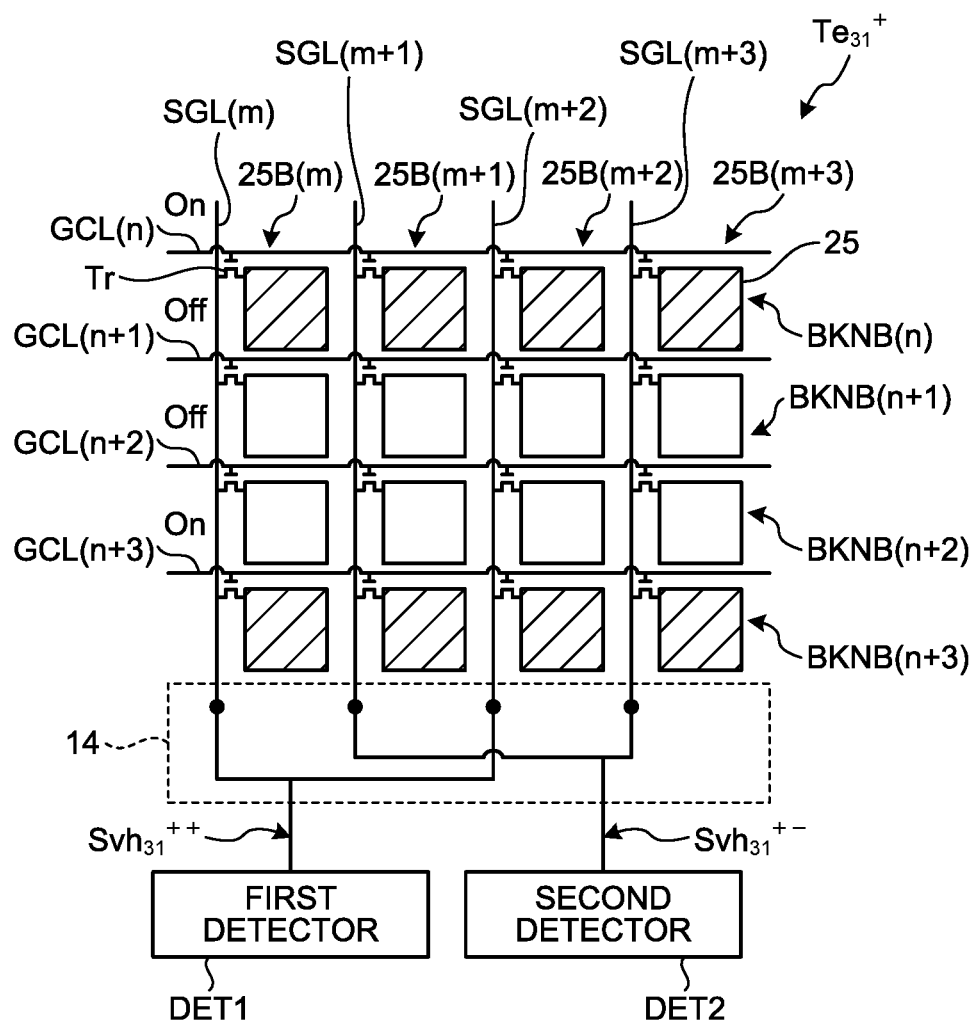
Figure 28C:
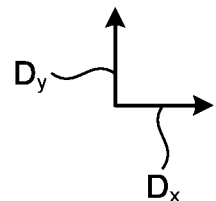
Figure 28D:
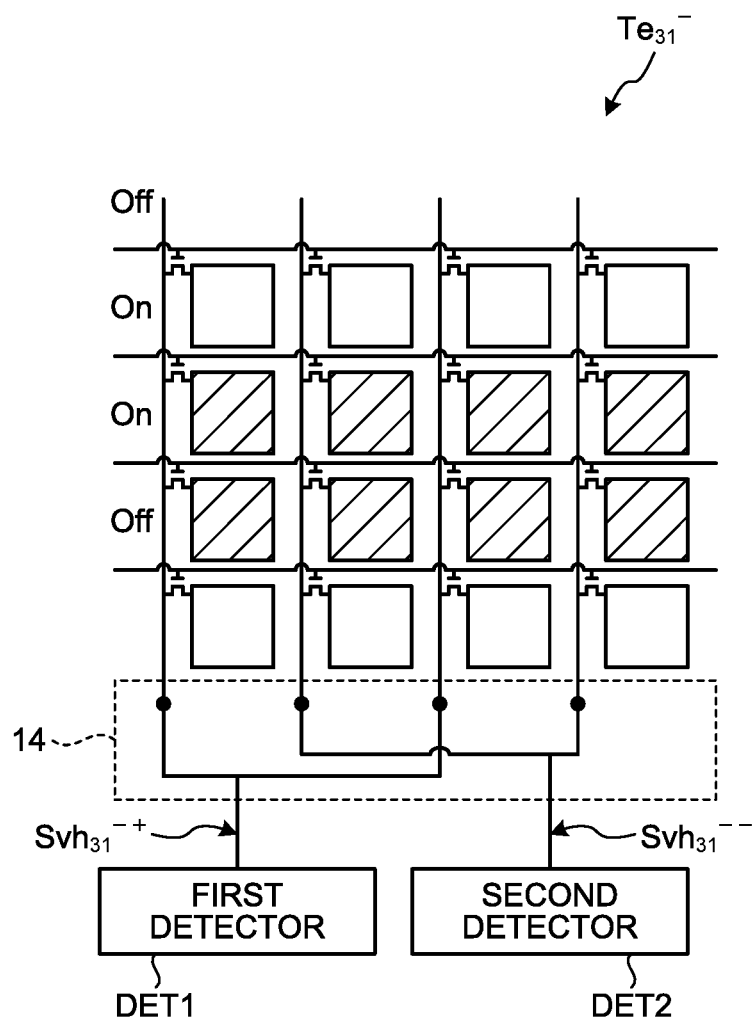
Figure 28D:
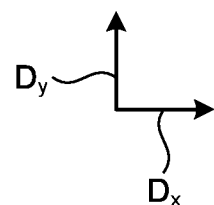
Figure 29A:
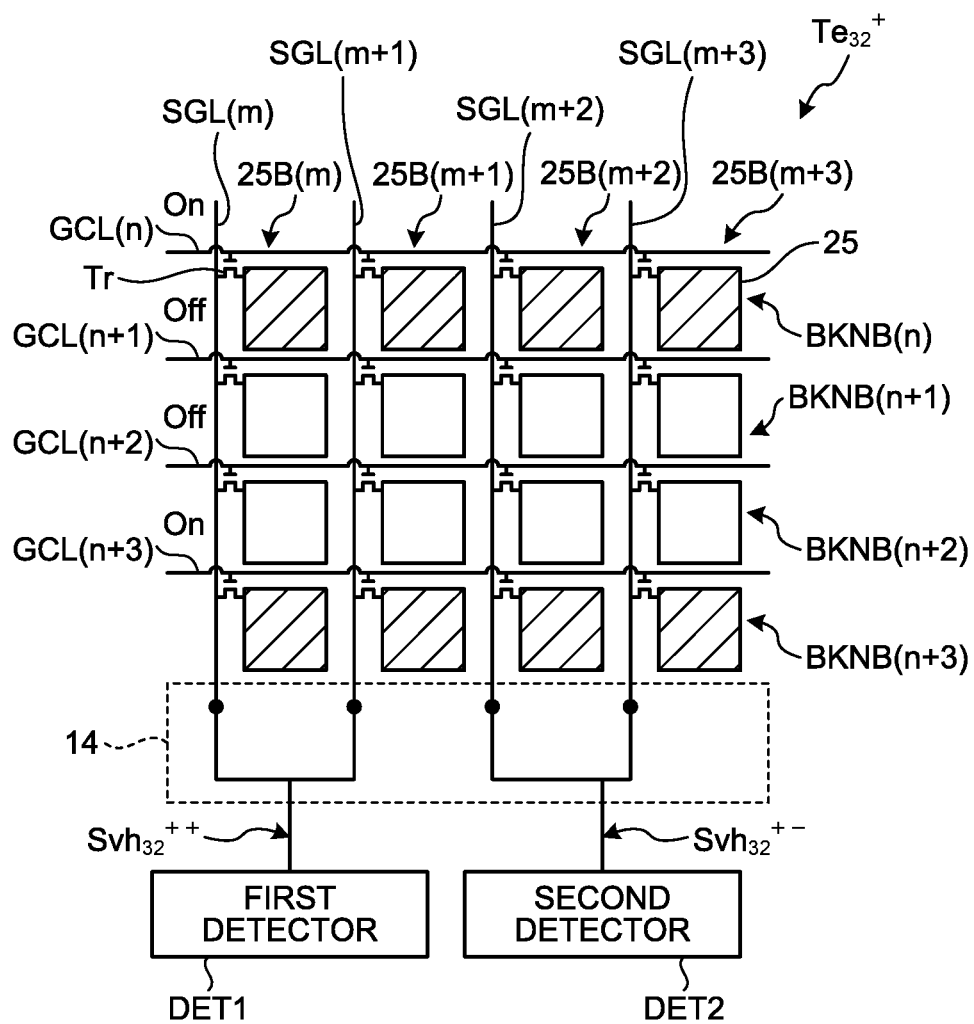
FIGS. 29A to 29D is a diagram for explaining an example of selection patterns of the first electrodes selected as a selection target in a fifteenth detection operation and a sixteenth detection operation.
Figure 29A:
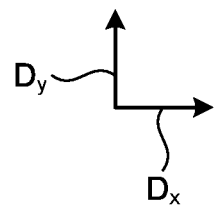
Figure 29B:
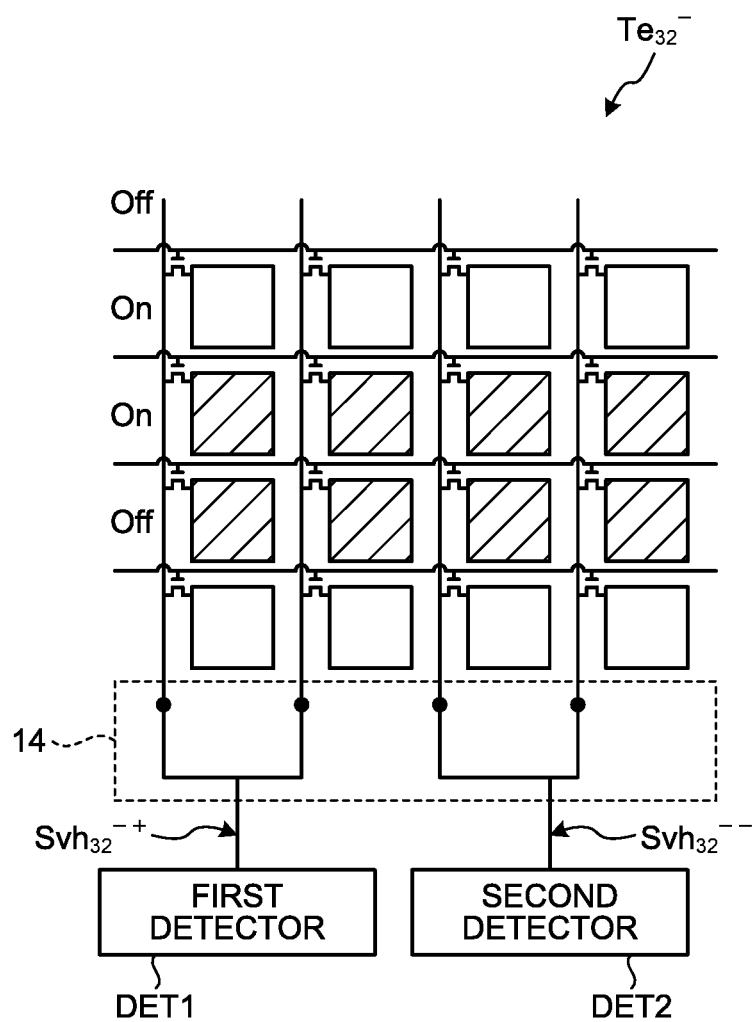
Figure 29B:
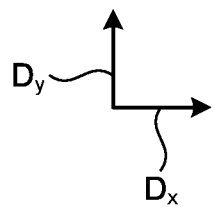
Figure 29C:
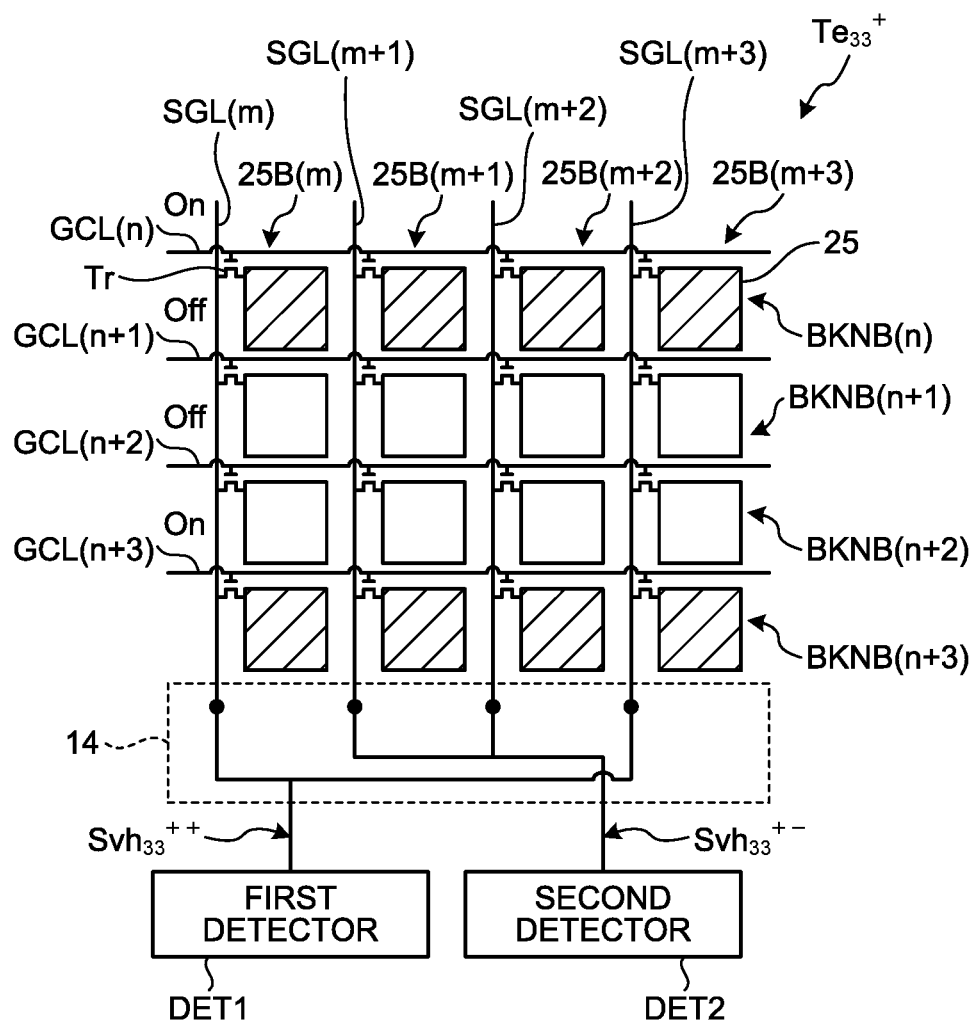
Figure 29C:
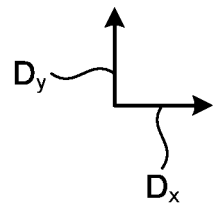
Figure 29D:
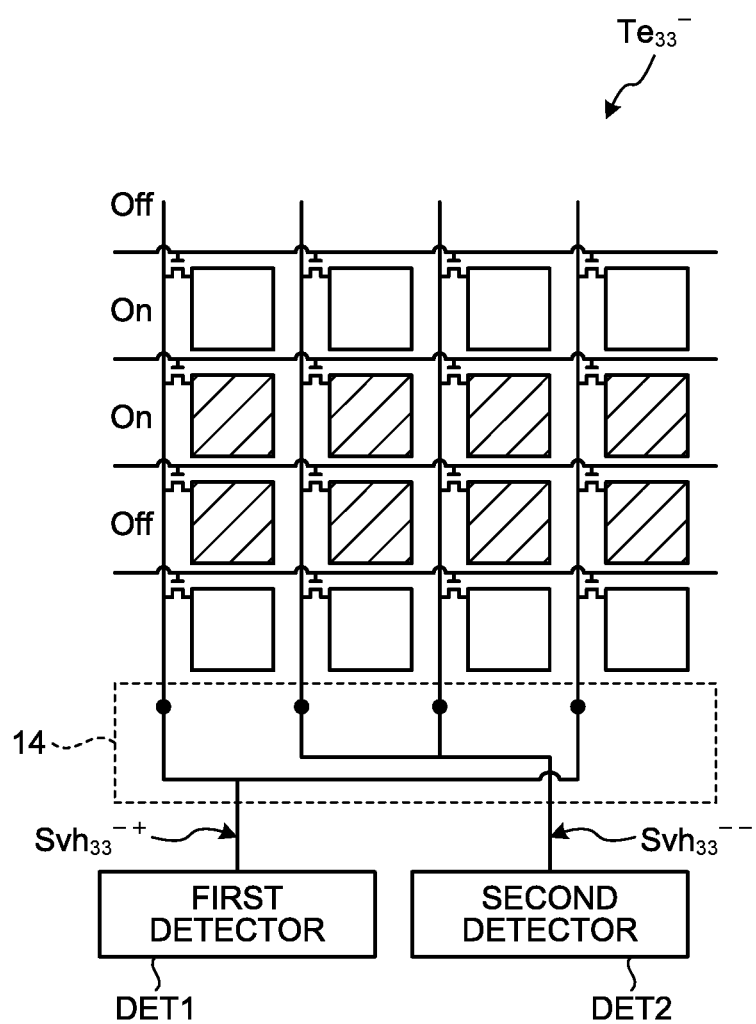
Figure 29D:
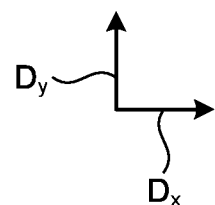

FIG. 28A illustrates a plus sign selection operation $Te_{30}{}^+$ of the thirteenth detection operation, and FIG. 28B illustrates a minus sign selection operation $Te_{30}{}^-$ of the thirteenth detection operation. FIG. 28C illustrates a plus sign selection operation $Te_{31}{}^+$ of the fourteenth detection operation, and FIG. 28D illustrates a minus sign selection operation $Te_{31}{}^-$ of the fourteenth detection operation. FIG. 29A illustrates a plus sign selection operation $Te_{32}{}^+$ of the fifteenth detection operation, and FIG. 29B illustrates a minus sign selection operation $Te_{32}{}^-$ of the fifteenth detection operation. FIG. 29C illustrates a plus sign selection operation $Te_{33}{}^+$ of the sixteenth detection operation, and FIG. 29D illustrates a minus sign selection operation $Te_{33}{}^-$ of the sixteenth detection operation.

As illustrated in FIGS. 28A to 28D and 29A to 29D, in code division multiplex drive in the first direction $D_x$ in the thirteenth to the sixteenth detection operations, the detection electrodes 25 serving as the first selection target in the square matrix $H_h$ and the second selection target in the square matrix $H_h$ are selected in the same manner as illustrated in FIGS. 22A to 22D and FIGS. 23A to 23D.

In the plus sign selection operation $Te_{30}{}^+$ of the thirteenth detection operation illustrated in FIG. 28A, the detection electrodes 25 belonging to the second detection electrode blocks BKNB(n) and BKNB(n+3) are selected as the detection electrodes 25 serving as the first selection target in the square matrix $H_v$ corresponding to the elements "1" in the fourth row of the square matrix $H_v$. The detection electrodes 25 belonging to the first detection electrode blocks 25B(m), 25B(m+1), 25B(m+2) and 25B(m+3) are selected as the detection electrodes 25 serving as the first selection target in the square matrix $H_h$ corresponding to the elements "1" in the first row of the square matrix $H_h$. In the plus sign selection operation $Te_{30}{}^+$ of the thirteenth detection operation illustrated in FIG. 28A, a detection signal $Svh_{30}{}^+$ is calculated by: $Svh_{30}{}^+ = Svh_{30}{}^{++} - Svh_{30}{}^{+-}$.

In the minus sign selection operation $Te_{30}{}^-$ of the thirteenth detection operation illustrated in FIG. 28B, the detection electrodes 25 belonging to the second detection electrode blocks BKNB(n+1) and BKNB(n+2) are selected as the detection electrodes 25 serving as the second selection target in the square matrix corresponding to the elements "−1" in the fourth row of the square matrix $H_v$. In the minus sign selection operation $Te_{30}{}^-$ of the thirteenth detection operation illustrated in FIG. 28B, a detection signal $Svh_{30}{}^-$ is calculated by: $Svh_{30}{}^- = Svh_{30}{}^{-+} - Svh_{30}{}^{--}$. A third detection signal $Svh_{30}$ in the thirteenth detection operation is calculated as the difference between the detection signal $Svh_{30}{}^+$ and the detection signal $Svh_{30}{}^-$.

In the fourteenth detection operation illustrated in FIGS. 28C and 28D, the selection patterns in code division multiplex drive in the second direction $D_y$ are the same as those illustrated in FIGS. 28A and 28B. In code division multiplex drive in the first direction $D_x$, the detection electrodes 25 belonging to the first detection electrode blocks 25B(m) and 25B(m+2) are selected as the first selection target in the square matrix $H_h$ corresponding to the elements "1" in the second row of the square matrix $H_h$. The detection electrodes 25 belonging to the first detection electrode blocks 25B(m+1) and 25B(m+3) are selected as the second selection target in the square matrix $H_h$ corresponding to the elements "−1" in the second row of the square matrix $H_h$. In the plus sign selection operation $Te_{31}{}^+$ of the fourteenth detection operation illustrated in FIG. 28C, a detection signal $Svh_{31}{}^+$ is calculated by: $Svh_{31}{}^+ = Svh_{31}{}^{++} - Svh_{31}{}^{+-}$. In the minus sign selection operation $Te_{31}{}^-$ of the fourteenth detection operation illustrated in FIG. 28D, a detection signal $Svh_{31}{}^-$ is calculated by: $Svh_{31}{}^- = Svh_{31}{}^{-+} - Svh_{31}{}^{--}$. A third detection signal $Svh_{31}$ in the fourteenth detection operation is calculated as the difference between the detection signal $Svh_{31}{}^+$ and the detection signal $Svh_{31}{}^-$.

In the fifteenth detection operation illustrated in FIGS. 29A and 29B, the selection patterns in code division multiplex drive in the second direction $D_y$ are the same as those illustrated in FIGS. 28A and 28B. In code division multiplex drive in the first direction $D_x$ in the fifteenth detection operation, the detection electrodes 25 belonging to the first detection electrode blocks 25B(m) and 25B(m+1) are selected as the first selection target in the square matrix $H_h$ corresponding to the elements "1" in the third row of the square matrix $H_h$. The detection electrodes 25 belonging to the first detection electrode blocks 25B(m+2) and 25B(m+3) are selected as the second selection target in the square matrix $H_h$ corresponding to the elements "−1" in the third row of the square matrix $H_h$.

In the plus sign selection operation $Te_{32}{}^+$ of the fifteenth detection operation illustrated in FIG. 29A, a detection signal $Svh_{32}{}^+$ is calculated by: $Svh_{32}{}^+ = Svh_{32}{}^{++} - Svh_{32}{}^{+-}$. In the minus sign selection operation $Te_{32}{}^-$ of the fifteenth detection operation illustrated in FIG. 29B, a detection signal $Svh_{32}{}^-$ is calculated by: $Svh_{32}{}^- = Svh_{32}{}^{-+} - Svh_{32}{}^{--}$. A third detection signal $Svh_{32}$ in the fifteenth detection operation is calculated as the difference between the detection signal $Svh_{32}{}^+$ and the detection signal $Svh_{32}{}^-$.

In the sixteenth detection operation illustrated in FIGS. 29C and 29D, the selection patterns in code division multiplex drive in the second direction $D_y$ are the same as those illustrated in FIGS. 28A and 28B. In code division multiplex drive in the first direction $D_x$ in the sixteenth detection operation, the detection electrodes 25 belonging to the first detection electrode blocks 25B(m) and 25B(m+3) are selected as the first selection target in the square matrix $H_h$ corresponding to the elements "1" in the fourth row of the square matrix $H_h$. The detection electrodes 25 belonging to the first detection electrode blocks 25B(m+1) and 25B(m+2) are selected as the second selection target in the square matrix $H_h$ corresponding to the elements "−1" in the fourth row of the square matrix $H_h$.

In the plus sign selection operation $Te_{33}{}^+$ of the sixteenth detection operation illustrated in FIG. 29C, a detection signal $Svh_{33}{}^+$ is calculated by: $Svh_{33}{}^+ = Svh_{33}{}^{++} = Svh_{33}{}^{+-}$. In the minus sign selection operation $Te_{33}{}^-$ of the sixteenth detection operation illustrated in FIG. 29D, a detection signal $Svh_{33}{}^-$ is calculated by: $Svh_{33}{}^- = Svh_{33}{}^{-+} - Svh_{33}{}^{--}$. A third detection signal $Svh_{33}$ in the sixteenth detection operation is calculated as the difference between the detection signal $Svh_{33}{}^+$ and the detection signal $Svh_{33}{}^-$.

As described above, the signal arithmetic processor 44 (refer to FIG. 2) performs the first to the sixteenth detection operations, thereby calculating data of 16 detection signals Svh. The data of the detection signals Svh are stored in the storage 48. The coordinate extractor 45 (refer to FIG. 2) receives the data of the detection signals Svh from the storage 48 and performs decoding on the data based on Expression (7).

$$Sid = H_v \times Svh \times H_h \quad (7)$$

Sid indicates signals resulting from decoding and is a matrix corresponding to the detection electrodes 25 illustrated in FIGS. 22A to 29D. $H_v$ is a square matrix in Expression (2) and is a transformation matrix in the second direction $D_y$. $H_h$ is a square matrix in Expression (6) and is a transformation matrix in the first direction $D_x$. The coordinate extractor 45 (refer to FIG. 1) performs decoding, thereby acquiring the detection signals of the detection electrodes included in the first detection electrode block 25B(m) or the second detection electrode block BKNB(n). The coordinate extractor 45 can calculate the two-dimensional coordinates of a finger or the like in contact with or in proximity to the detection device 100 based on the signal Sid resulting from decoding. By performing decoding based on the detection signal obtained by integrating the detection signals of the detection electrodes 25, the detection device of this embodiment can also provide signal intensity of 16 times the signal intensity obtained in time division multiplex drive, without raising the voltage of the signal values at respective nodes.

The detection device of this embodiment performs the plus sign selection operation and the minus sign selection operation successively, thereby increasing the noise resistance. To measure the four detection signals in a time division manner in the first detection operation illustrated in FIGS. 22A to 22D, for example, the detection device of this embodiment preferably measures the first detection signal $Svh_{00}^{++}$, the second detection signal $Svh_{00}^{+-}$, the first detection signal $Svh_{00}^{-+}$, and the second detection signal $Svh_{00}^{--}$ in this order. This mechanism shortens the interval between the detection time for the first selection target and detection time for the second selection target in the square matrix $H_h$, thereby cancelling the noise components in the detection signals. Alternatively, the detection device of this embodiment may measure the four detection signals in the order of the first detection signal $Svh_{00}^{++}$, the first detection signal $Svh_{00}^{-+}$, the second detection signal $Svh_{00}^{+-}$, and the second detection signal $Svh_{00}^{--}$. This mechanism shortens the interval between the detection time for the first selection target and the detection time for the second selection target in the square matrix $H_v$, thereby cancelling the noise components in the detection signals. Still alternatively, the detection device of this embodiment may perform the plus sign selection operation successively a plurality of times and then perform the minus sign selection operation. The order of the detection operations illustrated in FIGS. 22A to 29D may be appropriately modified.

Third Embodiment

Figure 30:
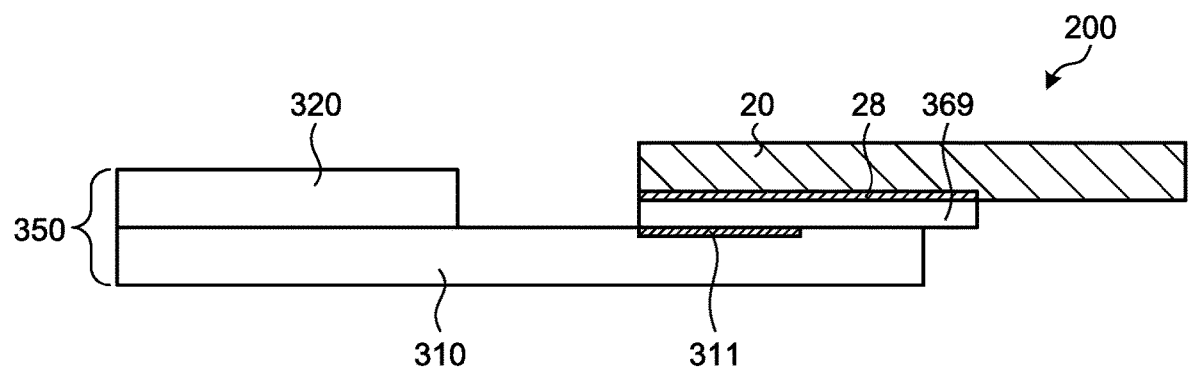
FIG. 30 is a schematic diagram of an exemplary configuration of an electronic apparatus according to a third embodiment.

FIG. 30 is a schematic diagram of an exemplary configuration of an electronic apparatus according to a third embodiment of the present invention. As illustrated in FIG. 30, an electronic apparatus 200 according to the third embodiment includes the detection device 100 (refer to FIG. 3) described in the first embodiment or the second embodiment and a liquid crystal display 350 coupled to the detection device 100, for example. The liquid crystal display 350 includes a TFT substrate 310, a counter substrate 320, and a liquid crystal layer. The TFT substrate 310 is provided with thin-film transistors (TFTs) and other components. The liquid crystal layer (not illustrated) is disposed between the TFT substrate 310 and the counter substrate 320. In this example, the TFT substrate 310 includes a pad electrode 311. The pad electrode 311 is coupled to a pad electrode 28 of the first circuit substrate 20 via an ACF 369, for example. Alternatively, the TFT substrate 310 may be coupled to the insulating substrate 10 via one or more of the first circuit substrate 20, a circuit substrate (not illustrated), and wiring (not illustrated).

With this configuration, the electronic apparatus 200 with a detection function can transmit the result of detection of a fingerprint or the like performed by the detection device 100 to the liquid crystal display 350. The electronic apparatus 200 can turn on and off the power supply of the liquid crystal display 350 based on the result of detection of a fingerprint or the like performed by the detection device 100 or display the detection result on the liquid crystal display 350. The electronic apparatus 200 includes the detection device 100. Consequently, the electronic apparatus 200 can increase the detection sensitivity to an external object (e.g., the finger Fin).

While the third embodiment describes the liquid crystal display 350 as a coupled device coupled to the detection device, the coupled device is not limited to the liquid crystal display. The coupled device may be an organic electroluminescence (EL) display, for example. Alternatively, the coupled device may be a device other than a display.

While exemplary embodiments according to the present invention have been described, the embodiments are not intended to limit the invention. The contents disclosed in the embodiments are given by way of example only, and various modifications may be made without departing from the spirit of the invention. Appropriate changes made without departing from the spirit of the invention naturally fall within the scope of the invention.

The detection device and the electronic apparatus according to the present aspect may have the following aspects, for example.

(1) A detection device comprising:
   an insulating substrate including a plurality of detection electrodes;
   a transmission conductor disposed adjacent to the detection electrodes;
   a drive signal generator coupled to the transmission conductor; and
   a detector coupled to the detection electrodes, wherein
   the drive signal generator generates a detection drive signal and supplies the detection drive signal to the transmission conductor, and
   the detector detects a detection signal corresponding to a change in capacitance in the detection electrodes.

(2) The detection device according to (1), wherein
   the insulating substrate includes a base,
   a first surface of the base is provided with the detection electrodes, and
   the height of the transmission conductor from the first surface is higher than the height of the detection electrodes from the first surface.

(3) The detection device according to (1) or (2), wherein the detection electrodes are arrayed in a first direction and a second direction intersecting the first direction.

(4) The detection device according to (2) or (3), further comprising:
   a coupling circuit configured to couple the detection electrodes to the detector and uncouple the detection electrodes from the detector, wherein the coupling circuit performs a first selection operation of causing detection electrodes serving as a first selection target out of the detection electrodes to be coupled to the detector and causing detection electrodes serving as a second selection target, which are not included in the first selection target, to be uncoupled from the detector, and the coupling circuit performs, at a timing different from a timing of the first selection operation, a second selection operation of causing the detection electrodes serving as the first selection target to be uncoupled from the detector and causing the detection electrodes serving as the second selection target to be coupled to the detector.

(5) The detection device according to (4), wherein the coupling circuit performs the first selection operation and the second selection operation on a detection electrode block basis, the detection electrode block including more than one of the detection electrodes.

(6) The detection device according to (4) or (5), wherein the coupling circuit determines the detection electrodes serving as the first selection target and the detection electrodes serving as the second selection target based on plus and minus signs of a Hadamard matrix.

(7) The detection device according to (6), wherein the detector calculates a detection signal output from each of the detection electrodes based on a first detection signal obtained by integrating detection signals output from the detection electrodes serving as the first selection target and on a second detection signal obtained by integrating detection signals output from the detection electrodes serving as the second selection target.

(8) The detection device according to any one of (4) to (7), wherein the coupling circuit performs the first selection operation and the second selection operation successively.

(9) The detection device according to any one of (1) to (8), further comprising:
a capacitance detection conductor disposed adjacent to the detection electrodes.

(10) The detection device according to any one of (4) to (8), further comprising:
a capacitance detection conductor disposed adjacent to the detection electrodes;
a first circuit substrate coupled to the insulating substrate; and
an analog front end provided to the first circuit substrate, wherein
the detection electrodes are coupled to the analog front end via the coupling circuit, and
the capacitance detection conductor is coupled to the analog front end not via the coupling circuit.

(11) The detection device according to (9) or (10), wherein capacitance of the capacitance detection conductor is smaller than capacitance of the transmission conductor.

(12) The detection device according to any one of (9) to (11), wherein the capacitance detection conductor is disposed between the detection electrodes and the transmission conductor.

(13) The detection device according to any one of (9) to (12), wherein
the drive signal generator supplies, when a capacitance value of the capacitance detection conductor is equal to or larger than a preset value, the drive signal to the transmission conductor, and
the drive signal generator does not supply, when the capacitance value of the capacitance detection conductor is smaller than the preset value, the drive signal to the transmission conductor.

(14) The detection device according to any one of (1) to (13), wherein the detection electrodes are arrayed in a row direction and a column direction.

(15) The detection device according to any one of (1) to (14), wherein the transmission conductor has a ring shape surrounding the detection electrodes.

(16) The detection device according to any one of (1) to (14), wherein the transmission conductor has a shape lacking a part of a ring surrounding the detection electrodes.

(17) An electronic apparatus comprising:
a detection device; and
a coupled device coupled to the detection device,
wherein the detection device includes
an insulating substrate including a plurality of detection electrodes,
a transmission conductor disposed a the detection electrodes,
a drive signal generator coupled to the transmission conductor, and
a detector coupled to the detection electrodes,
wherein the drive signal generator generates a detection drive signal and supplies the detection drive signal to the transmission conductor, and
wherein the detector detects a detection signal corresponding to a change in capacitance in the detection electrodes.

(18) The electronic apparatus according to (17), wherein
the insulating substrate includes a base,
a first surface of the base is provided with the detection electrodes, and
the height of the transmission conductor from the first surface is higher than the height of the detection electrodes from the first surface.

(19) The electronic apparatus according to (17) or (18), wherein the detection electrodes are arrayed in a first direction and a second direction intersecting the first direction.

(20) The electronic apparatus according to (18) or (19), further comprising:
a coupling circuit configured to couple the detection electrodes to the detector and uncouple the detection electrodes from the detector, wherein
the coupling circuit performs a first selection operation of causing detection electrodes serving as a first selection target out of the detection electrodes to be coupled to the detector and causing detection electrodes serving as a second selection target, which are not included in the first selection target, to be uncoupled from the detector, and
the coupling circuit performs, at a timing different from a timing of the first selection operation, a second selection operation of causing the detection electrodes serving as the first selection target to be uncoupled from the detector and causing the detection electrodes serving as the second selection target to be coupled to the detector.

(21) The electronic apparatus according to (20), wherein the coupling circuit performs the first selection operation and the second selection operation on a detection electrode block basis, the detection electrode block including more than one of the detection electrodes.

(22) The electronic apparatus according to (20) or (21), wherein the coupling circuit determines the detection electrodes serving as the first selection target and the detection electrodes serving as the second selection target based on plus and minus signs of a Hadamard matrix.

(23) The electronic apparatus according to (22), wherein the detector calculates a detection signal output from each of the detection electrodes based on a first detection signal obtained by integrating detection signals output from the detection electrodes serving as the first selection target and on a second detection signal obtained by integrating detection signals output from the detection electrodes serving as the second selection target.

(24) The electronic apparatus according to any one of (20) to (23), wherein the coupling circuit performs the first selection operation and the second selection operation successively.

(25) The electronic apparatus according to any one of (17) to (24), further comprising:
a capacitance detection conductor disposed adjacent to the detection electrodes.

(26) The electronic apparatus according to any one of (20) to (24), further comprising:
a capacitance detection conductor disposed adjacent to the detection electrodes;
a first circuit substrate coupled to the insulating substrate; and
an analog front end provided to the first circuit substrate, wherein
the detection electrodes are coupled to the analog front end via the coupling circuit, and
the capacitance detection conductor is coupled to the analog front end not via the coupling circuit.

(27) The electronic apparatus according to (25) or (26), wherein capacitance of the capacitance detection conductor is smaller than capacitance of the transmission conductor.

(28) The electronic apparatus according to any one of (25) to (27), wherein the capacitance detection conductor is disposed between the detection electrodes and the transmission conductor.

(29) The electronic apparatus according to any one of (25) to (28), wherein
the drive signal generator supplies, when a capacitance value of the capacitance detection conductor is equal to or larger than a preset value, the drive signal to the transmission conductor, and
the drive signal generator does not supply, when the capacitance value of the capacitance detection conductor is smaller than the preset value, the drive signal to the transmission conductor.

(30) The electronic apparatus according to any one of (17) to (29), wherein the detection electrodes are arrayed in a row direction and a column direction.

(31) The electronic apparatus according to any one of (17) to (30), wherein the transmission conductor has a ring shape surrounding the detection electrodes.

(32) The electronic apparatus according to any one of (17) to (30), wherein the transmission conductor has a shape lacking a part of a ring surrounding the detection electrodes.

(33) The electronic apparatus according to any one of (17) to (32), wherein the coupled device is a liquid crystal display or an organic EL display.

What is claimed is:

1. A detection device comprising:
an insulating substrate including a plurality of detection electrodes;
a transmission conductor disposed adjacent to the detection electrodes;
a drive signal generator coupled to the transmission conductor; and
a detector coupled to the detection electrodes, wherein
the drive signal generator generates a detection drive signal and supplies the detection drive signal to the transmission conductor,
the detector detects a detection signal corresponding to a change in capacitance in the detection electrodes,
the insulating substrate includes a base,
a first surface of the base is provided with the detection electrodes,
the transmission conductor is disposed so as to surround the detection electrodes and so as not to overlap the detection electrodes,
the thickness of the transmission conductor is greater than the thickness of the detection electrodes surrounded by the transmission conductor, and
the height of the transmission conductor from the first surface is greater than the height, from the first surface, of all of the detection electrodes surrounded by the transmission conductor.

2. The detection device according to claim 1, wherein the detection electrodes are arrayed in a first direction and a second direction intersecting the first direction.

3. The detection device according to claim 1, further comprising:
a coupling circuit configured to couple the detection electrodes to the detector and uncouple the detection electrodes from the detector, wherein
the coupling circuit performs a first selection operation of causing detection electrodes serving as a first selection target out of the detection electrodes to be coupled to the detector and causing detection electrodes serving as a second selection target, which are not included in the first selection target, to be uncoupled from the detector, and
the coupling circuit performs, at a timing different from a timing of the first selection operation, a second selection operation of causing the detection electrodes serving as the first selection target to be uncoupled from the detector and causing the detection electrodes serving as the second selection target to be coupled to the detector.

4. The detection device according to claim 3, wherein the coupling circuit performs the first selection operation and the second selection operation on a detection electrode block basis, the detection electrode block including more than one of the detection electrodes.

5. The detection device according to claim 3, wherein the coupling circuit determines the detection electrodes serving as the first selection target and the detection electrodes serving as the second selection target based on plus and minus signs of a Hadamard matrix.

6. The detection device according to claim 5, wherein the detector calculates a detection signal output from each of the detection electrodes based on a first detection signal obtained by integrating detection signals output from the detection electrodes serving as the first selection target and on a second detection signal obtained by integrating detection signals output from the detection electrodes serving as the second selection target.

7. The detection device according to claim 3, wherein the coupling circuit performs the first selection operation and the second selection operation successively.

8. The detection device according to claim 1, further comprising:
a capacitance detection conductor disposed adjacent to the detection electrodes.

9. The detection device according to claim 3, further comprising:
a capacitance detection conductor disposed adjacent to the detection electrodes;
a first circuit substrate coupled to the insulating substrate; and
an analog front end provided to the first circuit substrate, wherein the detection electrodes are coupled to the analog front end via the coupling circuit, and the capacitance detection conductor is coupled to the analog front end not via the coupling circuit.

10. The detection device according to claim 8, wherein capacitance of the capacitance detection conductor is smaller than capacitance of the transmission conductor.

11. The detection device according to claim 8, wherein the capacitance detection conductor is disposed between the detection electrodes and the transmission conductor.

12. The detection device according to claim 8, wherein the drive signal generator supplies, when a capacitance value of the capacitance detection conductor is equal to or larger than a preset value, the drive signal to the transmission conductor, and the drive signal generator does not supply, when the capacitance value of the capacitance detection conductor is smaller than the preset value, the drive signal to the transmission conductor.

13. The detection device according to claim 1, wherein the detection electrodes are arrayed in a row direction and a column direction.

14. The detection device according to claim 1, wherein the transmission conductor has a ring shape surrounding the detection electrodes.

15. The detection device according to claim 1, wherein the transmission conductor has a shape lacking a part of a ring surrounding the detection electrodes.

16. The detection device according to claim 1, further comprising an insulating protective layer that covers the detection electrodes, wherein the transmission conductor is disposed so as to surround the detection electrodes and the insulating protective layer and so as not to overlap the detection electrodes and the insulating protective layer, the thickness of the transmission conductor is greater than the thicknesses of all of the detection electrodes and the insulating protective layer surrounded by the transmission conductor, and the height of the transmission conductor from the first surface is greater than the heights, from the first surface, of all of the detection electrodes and the insulating protective layer surrounded by the transmission conductor.

* * * * *